US007751066B2

(12) United States Patent
Iwasaki

(10) Patent No.: US 7,751,066 B2
(45) Date of Patent: Jul. 6, 2010

(54) PROJECTOR AND THREE-DIMENSIONAL INPUT APPARATUS USING THE SAME

(75) Inventor: Takeo Iwasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 263 days.

(21) Appl. No.: 11/957,215

(22) Filed: Dec. 14, 2007

(65) Prior Publication Data

US 2008/0123109 A1 May 29, 2008

Related U.S. Application Data

(63) Continuation of application No. PCT/JP2006/311192, filed on Jun. 5, 2006.

(30) Foreign Application Priority Data

Jun. 14, 2005 (JP) ............................. 2005-173095
Jun. 14, 2005 (JP) ............................. 2005-173279

(51) Int. Cl.
*G01B 11/30* (2006.01)
(52) U.S. Cl. .................. 356/610; 250/550; 250/559.22; 382/285; 356/376
(58) Field of Classification Search ......... 356/601–613; 250/559.22, 550; 382/154, 285; 348/207.99, 348/208.99
See application file for complete search history.

(56) References Cited

U.S. PATENT DOCUMENTS 4,657,394 A * 4/1987 Halioua ....................... 356/604
4,687,326 A * 8/1987 Corby, Jr. ................... 356/5.01
5,784,098 A * 7/1998 Shoji et al. ..................... 348/45
6,493,095 B1 * 12/2002 Song et al. ................... 356/603
6,600,168 B1 * 7/2003 Geng ..................... 250/559.22
7,382,471 B2 * 6/2008 Franke et al. ............... 356/604
2003/0112507 A1 * 6/2003 Divelbiss et al. ............ 359/464
2004/0189957 A1 * 9/2004 Shpizel ........................ 353/97

FOREIGN PATENT DOCUMENTS

JP          2003042736 A       2/2003

OTHER PUBLICATIONS

International Search Report for corresponding PCT Application, mailed Aug. 29, 2007.

* cited by examiner

*Primary Examiner*—Tarifur R. Chowdhury
*Assistant Examiner*—Isiaka O Akanbi
(74) *Attorney, Agent, or Firm*—Baker Botts L.L.P.

(57) ABSTRACT

An apparatus is disclosed for projecting patterned electromagnetic waves onto an object. This apparatus includes: an electromagnetic-wave source; a modulating element allowing at least part of an electromagnetic wave incoming from the source to be modulated; and a selector for allowing a selected one of angular components of an electromagnetic wave outgoing from the modulating element, to pass through the selector. The modulating element is shaped to include at least one pair of two portions having different surface shapes. One of the two portions allows one of the angular components which has a radiant angle characteristic that achieves a predetermined entrance numerical aperture, to go out as a component which will be selected by the selector. The other allows one of the angular components which has a radiant angle characteristic that does not achieve the entrance numerical aperture, to go out as a component which will not be selected by the selector.

21 Claims, 24 Drawing Sheets

PROJECTOR AND THREE-DIMENSIONAL INPUT APPARATUS USING THE SAME

CROSS-REFERENCE TO RELATED APPLICATIONS

The present application is based on and claims the benefit of priority from Japanese Patent Applications No. 2005-173095 filed Jun. 14, 2005 and No. 2005-173279 filed Jun. 14, 2005, and International Application No. PCT/JP2006/311192 filed Jun. 5, 2006, the contents of which are incorporated herein by reference in their entirety.

This application is a continuation application of International Application No. PCT/JP2006/311192 filed Jun. 5, 2006, now pending, which was published in Japanese under PCT Article 21(2).

BACKGROUND OF THE INVENTION

1. Field of the Invention

The invention relates generally to techniques of projecting patterned electromagnetic waves (e.g., patterned light) onto an object.

2. Description of the Related Art

There are already employed techniques of projecting patterned electromagnetic waves onto an object. See, for example, Japanese Patent Application Publication No. 2003-42736. The projecting techniques are utilized for projecting a precise pattern onto an object such as a semiconductor device board, for optically measuring the planar shape or solid shape of an object, and for other purposes.

A projecting device for projecting patterned electromagnetic waves onto an object is generally configured to include an electromagnetic wave source, a transformer for transforming an electromagnetic wave emitted from the electromagnetic wave source into a patterned electromagnetic wave, and an optical system for projecting the patterned electromagnetic wave emitted from the transformer, onto the object.

An exemplary version of such a projecting device is a projector for projecting patterned light as an example of patterned electromagnetic waves, onto an object. This projector is generally configured to include a light source, an optical transformer for transforming light emitted from the light source into patterned light, and an optical system for projecting the patterned light emitted from the optical transformer, onto an object.

The patterned light is generated to define, for example, a stripe configuration made up of alternating bright portions and dark portions. To this end, a conventional version of the optical transformer is made in the form of a photomask for spatially-periodically masking light emitted from the light source.

The photomask is fabricated to form an array in which light-transmissive portions corresponding to bright portions of the patterned light, and light-occluding portions corresponding to dark portions of the patterned light alternate. In general, the light-transmissive portions are in the form of air openings. Thus, a conventional photomask is provided for spatially-selectively transmitting or blocking light emitted from a light source, to thereby transform the light emitted from the light source into patterned light.

As a result, the above-described projecting technique can be employed for an exemplary purpose of projecting patterned light onto an object using the above-described photomask, to thereby optically measure the shape of the object. In this example, the shape of the object can be measured at an increasing level of resolution as the spatial interval of bright portions and dark portions arrayed in the patterned light, that is to say, the distance between adjacent ones of pattern lines forming the patterned light is shortened.

In addition, there is, in some cases, a need for improving the preciseness of the shape of patterned light to be used for projection, for satisfaction of an ultimate desire for improving the quality of projection by a projector for projecting precise patterned light, or an ultimate desire for improving the accuracy of measurement by a measuring device for optically measuring the planar shape or the solid shape of an object, by projecting patterned light onto the object. In these cases, there is a need for fabricating a photomask with increased precision.

BRIEF SUMMARY OF THE INVENTION

There exists a technique that should be referred to as, for example, metal film formation, which is one of conventional techniques for use in fabricating a fine photomask with high precision. In practice of the metal film formation technique, first, an overall surface of a flat plate such as a glass plate is coated with a metal film such as a chrome film, and next, for forming air openings as optical transmissive portions, an electron beam is locally applied to the metal film in a pre-selected application pattern, by an electron beam lithography, to thereby locally remove material from the metal film so as to reflect the application pattern.

There exists a technique that should be referred to as, for example, screen printing, which is one of conventional techniques of fabricating a fine photomask with high precision. The screen print technique allows a pattern corresponding to patterned light to be generated, to be formed by stencil printing, on the surface of a flat plate such as a glass plate.

The above-described metal film formation technique, however, requires precise and continuous application of an electron beam, with an increase in hourly cost required for manufacturing the photomask, an increase in a time required for manufacturing the photomask, etc., which foster an increase in the total cost of the photomask.

In addition, the above-described screen printing allows a photomask to be formed with maximum shape-precision of tens micron meters, resulting in the creation of difficulty in improving the shape precision of the photomask.

BRIEF SUMMARY OF THE INVENTION

In general, the invention relates to techniques of projecting patterned electromagnetic waves on an object, using a transformer for transforming an electromagnetic wave emitted from an electromagnetic-wave source into patterned electromagnetic waves, which transformer is configured to have an improved structure suitable for manufacturing the transformer at a reduced cost and with improved precision.

According to some aspects of the invention, a projecting apparatus for use in projecting patterned electromagnetic waves onto an object is provided.

The projecting apparatus is configured to include:

an electromagnetic-wave source;

an electromagnetic-wave modulating element allowing at least part of an electromagnetic wave incoming from the electromagnetic-wave source to be modulated, by angular modulation or change of electromagnetic-radiant-power distribution per solid angle, and to go out; and a selector adapted to allow a selected one of a plurality of angular components of an electromagnetic wave outgoing from the electromagnetic-wave modulating element, to pass through the selector, the selected angular components having a radiant angle characteristic that achieves a predetermined entrance numerical aperture.

In this regard, the electromagnetic-wave modulating element may be configured to modulate the incoming electromagnetic wave, by relying on a surface shape of the electromagnetic-wave modulating element.

The electromagnetic-wave modulating element may be shaped to include at least one pair of two portions having different surface shapes, which portions are alternately arrayed in a direction in which the electromagnetic-wave modulating element extends.

One of the two portions may allow one of the plurality of angular components which has a radiant angle characteristic that achieves the entrance numerical aperture, to go out as a selected electromagnetic-wave component which will be selected by the selector, while the other may allow one of the plurality of angular components which has a radiant angle characteristic that does not achieve the entrance numerical aperture, to go out as a non-selected electromagnetic-wave component which will not be selected by the selector.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

General Overview

Figure 1:
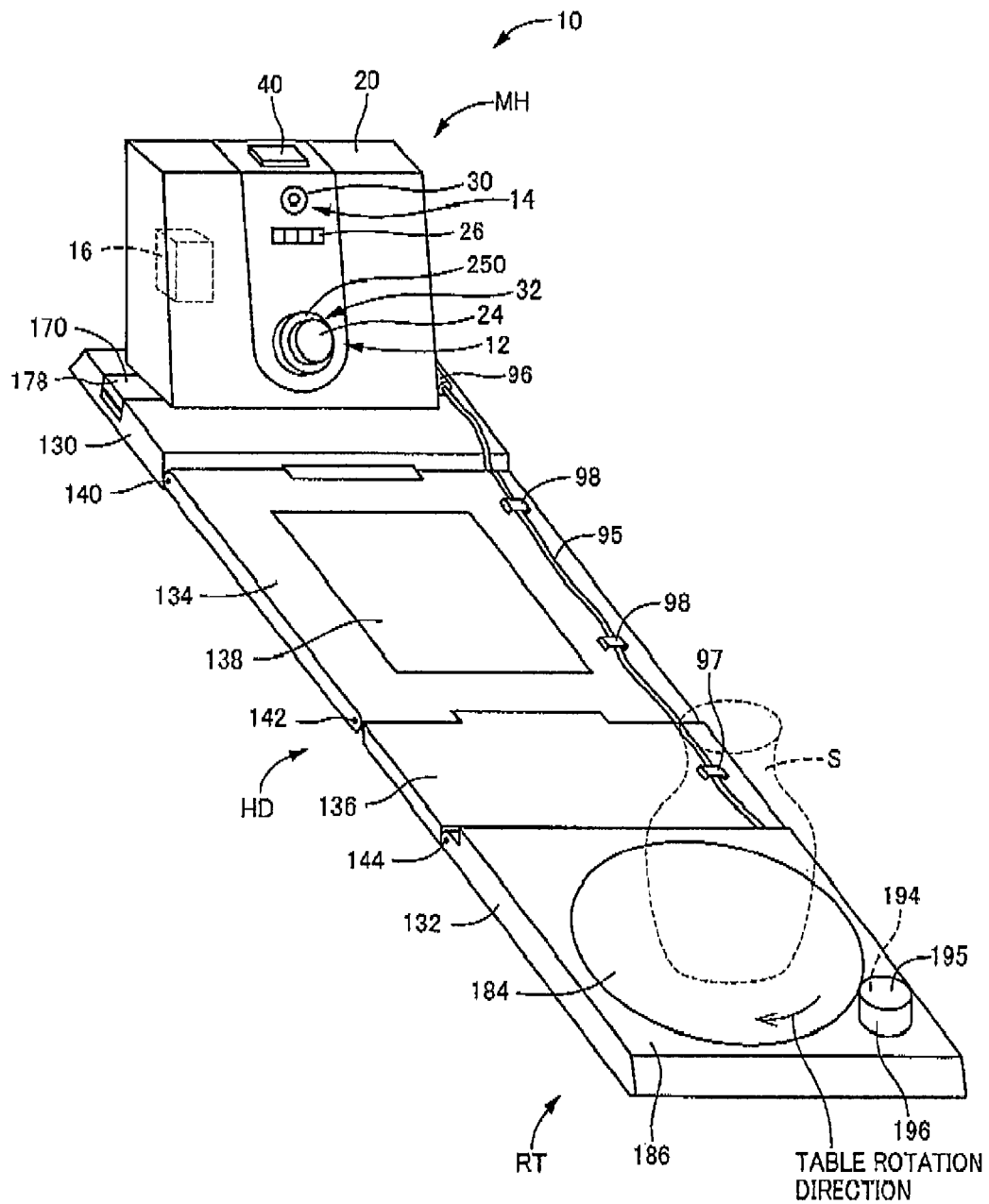
FIG. 1 is a perspective view illustrating the exterior of a 3-D input device 10 in an extended state, which is constructed according to a first illustrative embodiment of the present invention.

According to a first aspect of the invention, there is provided a projecting apparatus for use in projecting patterned light onto an object, comprising:

a light source;

modulating optics allowing at least part of incoming light from the light source to be modulated, by angular modulation or change of luminance distribution, and to go out; and an optical system adapted to allow a selected one of a plurality of angular components of light outgoing from the modulating optics, to pass through the optical system, the selected angular component having a radiant angle characteristic that achieves a predetermined entrance numerical aperture, wherein the modulating optics is configured to optically modulate the incoming light, by relying on a surface shape of the modulating optics, the modulating optics is shaped to include at least one pair of two portions having different surface shapes, which portions are alternately arrayed in a direction in which the modulating optics extends, and one of the two portions allows one of the plurality of angular components which has a radiant angle characteristic that achieves the entrance numerical aperture, to go out as a passed-through optical component which will pass through the optical system, while the other allows one of the plurality of angular components which has a radiant angle characteristic that does not achieve the entrance numerical aperture, to go out as a non-passed-through optical component which will not pass through the optical system.

In this projecting apparatus, the above-described optical transformer, which is adapted to transform light incoming from a light source into patterned light, is in the form of modulating optics configured to perform an optical action, such as transmission or reflection, for at least part of light incoming from the light source, so that light outgoing from the modulating optics can be modulated with respect the angle or the luminance distribution. In this regard, the term "luminance" is defined as a measurement obtained by observing a principle one of modulation positions from the outside. The modulating optics, in operation, optically modulates light incoming from the light source, by relying on a surface shape of the modulating optics.

The modulating optics, although may be configured to extend so as to intersect with respect to the light incoming from the light source, may be alternatively configured not to extend so as to intersect with respect to the light incoming from the light source. Even in the latter case, the modulating optics is configured to emit the light incoming from the light source, so that at least part of the incoming light can be modulated with respect to the angle or the luminance distribution.

In this regard, when the term "intersect with respect to the incoming light" is used to mean perpendicularly intersecting with the incoming light, if the modulating optics does not extend so as to intersect with respect to the incoming light, then there will arise two possibilities that the modulating optics intersects with the incoming light non-perpendicularly, and that the modulating optics is in parallel to the incoming light.

When, however, the term "intersect with respect to the incoming light" is used to mean intersecting with respect to the incoming light, whether perpendicularly or not, if the modulating optics does not extend so as to intersect with respect to the incoming light, then there will arise only a possibility that the modulating optics is in parallel to the incoming light.

In addition, an exemplary version of the modulating optics, when disposed not to extend so as to intersect with respect to the incoming light (e.g., when the modulating optics defines its electromagnetic field of the incoming light from the modulating optics which is disposed in a plane generally including a direction in which the incoming light travels, or space including a certain plane and its periphery), may be configured to modulate an electromagnetic wave (i.e., the general term of all the light).

A representative example of the above-described exemplary version of the modulating optics is an acousto-optical element. This element is neither configured to have at least one pair of two portions having different surface-shapes, nor configured to have the two portions so as to be alternately arrayed.

In the projecting apparatus according to the first aspect of the invention, the modulating optics is used together with the optical system. As described above, the optical system is adapted to allow a selected one of a plurality of angular components of light outgoing from the modulating optics, to pass through the optical system. The selected angular component has a radiant angle characteristic that achieves the predetermined entrance numerical aperture.

On the other hand, the modulating optics is shaped to include at least one pair of two portions having different surface-shapes. Those portions are alternately arrayed in a direction in which the modulating optics extends.

One of the two portions allows one of the plurality of angular components which has a radiant angle characteristic or property that achieves the entrance numerical aperture, to go out as a passed-through optical component which will pass through the optical system. On the other hand, the other allows one of the plurality of angular components which has a radiant angle characteristic or property that does not achieve the entrance numerical aperture, to go out as a non-passed-through optical component which will not pass through the optical system.

Thus, in this projecting apparatus, optical action relying on the surface shape of the modulating optics, and the angular-selective light-transmission occurring in the optical system cooperatively allows light incoming from the light source to be transformed into patterned light and projected onto an object.

In this projecting apparatus, the modulating optics, which is featured by optically modulating light by relying on the surface shape of the modulating optics, is different from the aforementioned photomask with respect to the structure and the principle for generating patterned light. The photomask, having a light transmissive portion and a light occluding portion, spatially-selectively transmits or blocks light incoming from the light source.

As a result, this modulating optics, when employed as the aforementioned optical transformer, would make it inessential to form, for example, air openings, in order to fabricate the optical transformer, as opposed to when a photomask is alternatively employed as the optical transformer.

More specifically, the modulating optics included in the projecting apparatus according to the first aspect of the invention can be fabricated by, for example, imparting a particular shape (e.g., a shape having alternating raised and recessed portions) to the surface of the modulating optics.

For imparting a particular shape to the surface of the modulating optics, a process can be employed of pressing a metal mold onto the surface of a material for the modulating optics, to thereby imprint a reversed shape of the metal mold on the surface of the material for the modulating optics. This process can be implemented with greater ease than when the above-mentioned photomask is fabricated, because of no need for implementing a relatively complicated work like local removal of material.

The projecting apparatus according to the first aspect of the invention, because of the employment of the modulating optics which is structured suitably for fine and precisely fabricating the modulating optics itself, would make it easier to simplify the fabrication process of the modulating optics. This facilitates mass production of the modulating optics and eventually fabrication cost saving for the modulating optics.

In this regard, the term "optical action" includes, for example, refraction, reflection, diffraction, scattering, etc. These phenomena of refraction, reflection and diffraction are classified into deflection in a narrow sense, and therefore, can be categorized into optical action of angularly modulating incoming light. The phenomenon of scattering can be categorized into optical action of modulating incoming light by changing luminance distribution.

Scattering, however, is common to refraction, reflection and diffraction, because they all share the same phenomena which diverts a portion of incoming light which is used for generating a dark potion of patterned light, away from the optical system. For this reason, scattering can be categorized into optical action (i.e., deflection in a broad sense) of angularly modulating incoming light, as well.

According to a second aspect of the invention, there is provided a projecting apparatus for use in projecting patterned electromagnetic waves onto an object, comprising:

an electromagnetic-wave source;

an electromagnetic-wave modulating element allowing at least part of an electromagnetic wave incoming from the electromagnetic-wave source to be modulated, by angular modulation or change of electromagnetic-radiant-power distribution per solid angle, and to go out; and a selector adapted to allow a selected one of a plurality of angular components of an electromagnetic wave outgoing from the electromagnetic-wave modulating element, to pass through the selector, the selected angular component having a radiant angle characteristic that achieves a predetermined entrance numerical aperture, wherein the electromagnetic-wave modulating element is configured to modulate the incoming electromagnetic wave, by relying on a surface shape of the electromagnetic-wave modulating element, the electromagnetic-wave modulating element is shaped to include at least one pair of two portions having different surface shapes, which portions are alternately arrayed in a direction in which the electromagnetic-wave modulating element extends, and one of the two portions allows one of the plurality of angular components which has a radiant angle characteristic that achieves the entrance numerical aperture, to go out as a selected electromagnetic-wave component which will be selected by the selector, while the other allows one of the plurality of angular components which has a radiant angle characteristic that does not achieve the entrance numerical aperture, to go out as a non-selected electromagnetic-wave component which will not be selected by the selector.

This projecting apparatus according to the second aspect of the invention would achieve basically the same functions and effects as those of the projecting apparatus according to the first aspect of the invention.

This projecting apparatus according to the second aspect of the invention would allow electromagnetic patterns to be projected onto an object, for any kind of an electromagnetic wave, such as, not only light, but also an X-ray or a radio wave.

An exemplary one of practical industrial applications of this projecting apparatus is medical services. In this example, an X-ray is selected as an electromagnetic wave to be used for projection, and an intensity-distribution pattern of an X-ray is locally projected onto a patient's body which serves as an object. In this example, precise projection of 2- or 3-D X-ray pattern onto a patient's body becomes easier, facilitating more effective X-ray treatment for the patient.

Another example of practical industrial applications of this projecting apparatus is printing (i.e., image formation). In this example, a radio wave is selected as an electromagnetic wave to be used for projection. In this example, a device (more specifically, a 2-D printer for generating 2-D images, for example) which is for use in forming a latent image pattern using an electric filed, and then generating an n-D image perceptible to human beings and robots, by image development, can be made as an embodiment of the projecting apparatus according to the second aspect of the invention, at a reduced manufacturing cost.

The term "electromagnetic wave" used in the second aspect of the invention includes an X-ray, ultraviolet light, visible light, infrared light, a radio wave, etc. An example of the "electromagnetic wave" is a terahertz wave (i.e., an electromagnetic wave with frequencies between those of infrared light and a milli-wave), which can be modulated using, for example, a dielectric prism. In any way, the "electromagnetic wave" is adequate if it can undergo optical modulation by relying on the surface shape of the modulating optics.

According to a third aspect of the invention, there is provided a three-dimensional input apparatus for use in entering three-dimensional information of a subject, comprising:

a projecting device adapted to project a plurality of different light patterns onto the subject, in succession; and an image-capturing device adapted to capture images of the subject as the projecting device projects the plurality of light patterns onto the subject, in succession, wherein the projecting device is configured to include:

a light source;

a projection mechanism adapted to transform light incoming from the light source into a successively-selected one of the plurality of light patterns; and a projection optical system adapted to project the successively-selected light pattern which has outgone from the projection mechanism, onto the subject, wherein the projection mechanism is configured to include:

a housing;

a feed guide attached to the housing and extending across the light incoming from the light source;

a carriage guided movably by the feed guide;

a movable member held by the carriage and having an optical element allowing the plurality of light patterns to be generated using the incoming light from the light source; and a drive mechanism adapted to drive the carriage along the feed guide, wherein the optical element is configured to include modulating optics allowing at least part of incoming light from the light source to be modulated, by angular modulation or change of luminance distribution, and to go out, the projection optical system is configured to include a component-selector optical system adapted to allow a selected one of a plurality of angular components of light outgoing from the modulating optics, to pass through the component-selector optical system, the selected angular component having a radiant angle characteristic that achieves a predetermined entrance numerical aperture, the modulating optics is configured to optically modulate the incoming light, by relying on a surface shape of the modulating optics, the modulating optics is shaped to include at least one pair of two portions having different surface shapes, which portions are alternately arrayed in a direction in which the modulating optics extends, and one of the two portions allows one of the plurality of angular components which has a radiant angle characteristic that achieves the entrance numerical aperture, to go out as a passed-through optical component which will pass through the component-selector optical system, while the other allows one of the plurality of angular components which has a radiant angle characteristic that does not achieve the entrance numerical aperture, to go out as a non-passed-through optical component which will not pass through the component-selector optical system.

This 3-D input apparatus would achieve basically the same functions and effects as those of the projecting apparatus according to the first aspect of the invention, and basically the same functions and effects as those of the 3-D input apparatus according to mode (23) as will be described later.

ILLUSTRATIVE EMBODIMENTS

According to the invention, there are provided the following modes as illustrative embodiments of the invention.

These modes will be stated below so as to be sectioned and numbered, and so as to depend upon the other mode or modes, where appropriate. This is for a better understanding of some of a plurality of technical features and a plurality of combinations thereof disclosed in this description, and does not mean that the scope of these features and combinations is interpreted to be limited to the scope of the following modes of this invention.

That is to say, it should be interpreted that it is allowable to select the technical features which are stated in this description but which are not stated in the following modes, as the technical features of this invention.

Furthermore, stating each one of the modes of the invention in such a dependent form as to depend from the other mode or modes does not exclude the possibility that the technical features set forth in a dependent-form mode become independent of those set forth in the corresponding depended mode or modes and to be removed therefrom. It should be interpreted that the technical features set forth in a dependent-form mode are allowed to become independent, where appropriate.

(1) A projecting apparatus for use in projecting patterned light onto an object, comprising;

a light source;

modulating optics allowing at least part of incoming light from the light source to be optically modulated, by angular modulation or change of luminance distribution, and to go out; and an optical system adapted to allow a selected one of a plurality of angular components of light outgoing from the modulating optics, to pass through the optical system, the selected angular component having a radiant angle characteristic that achieves a predetermined entrance numerical aperture, wherein the modulating optics is configured to optically modulate the incoming light, by relying on a surface shape of the modulating optics, the modulating optics is shaped to include at least one pair of two portions having different surface shapes, which portions are alternately arrayed in a direction in which the modulating optics extends, and one of the two portions allows one of the plurality of angular components which has a radiant angle characteristic that achieves the entrance numerical aperture, to go out as a passed-through optical component which will pass through the optical system, while the other allows one of the plurality of angular components which has a radiant angle characteristic that does not achieve the entrance numerical aperture, to go out as a non-passed-through optical component which will not pass through the optical system.

(2) The projecting apparatus according to mode (1) wherein the modulating optics is disposed to extend across the incoming light.

(3) The projecting apparatus according to mode (1) or (2), wherein the modulating optics is of a transmissive type allowing the incoming light to transmit through the modulating optics.

(4) The projecting apparatus according to mode (1) or (2), wherein the modulating optics is of a reflective type allowing the incoming light to reflect away from the modulating optics.

(5) The projecting apparatus according to any one of modes (1)-(4), wherein one of the two portions is a portion for allowing light to travel straight, which portion has a surface perpendicular to the incoming light, to thereby allow the incoming light to go out without undergoing modulation by the surface, the other of the two portions is a portion for allowing light to be modulated, which portion has an oblique surface with respect to the incoming light, to thereby allow the incoming light to go out after undergoing modulation by the surface, and outgoing light from one of the portion for allowing light to travel straight and the portion for allowing light to be modulated is the passed-through optical component, while outgoing light from the other is the non-passed-through optical component.

(6) The projecting apparatus according to anyone of modes (1)-(4), wherein the two portions are two modulating areas which have surfaces oriented obliquely with respect to the incoming light, respectively, to thereby allow the incoming light to be modulated and go out, the two modulating areas have oblique surfaces having different orientation angles with respect to the incoming light, respectively, and have different radiant-angle-characteristics of outgoing light from the two modulating areas, respectively, and outgoing light from one of the two modulating areas is the passed-through optical component, while outgoing light from the other is the non-passed-through optical component.

(7) The projecting apparatus according to any one of modes (1)-(6), wherein at least one of the two portions is in the form of a roof prism.

(8) The projecting apparatus according to any one of modes (1)-(6), wherein at least one of the two portions is formed to have a surface shape physically causing random scattering.

(9) The projecting apparatus according to anyone of modes (1)-(6), wherein at least one of the two portions is in the form of a diffraction grating.

(10) The projecting apparatus according to any one of modes (1)-(9), wherein the light pattern includes at least two different light patterns, and the modulating optics is moved relative to the incoming light, to thereby project a successively-selected one of the at least two light patterns onto the object.

This projecting apparatus allows the same modulating optics to move relative to the incoming light, to thereby change which one of different kinds of light patterns to be projected onto the object. This allows the object to be digitally photographed a pattern-by-pattern basis, resulting in the creation of a plurality of photographs of the object, and allows, by reference to those photographs, 3-D information of the object to be generated.

In an example, for the 3-D information of the object to be generated, known space-coding technique is implemented for the plurality of photographs of the object, to thereby generate code information, per each light pattern, that is to say, per each photograph of the object. Based on the generated code-information, ID determination is made for each stripe border in each photograph of the object.

(11) The projecting apparatus according to any one of modes (1)-(10), wherein the two portions define a stripe pattern.

This projecting apparatus allows the modulating optics to emit patterned light of a stripe configuration. This projecting apparatus is for use in 2-D or 3-D projection. A typical example of this projecting apparatus is a 3-D input device for three-dimensionally projecting a striped light pattern onto an object.

(12) A projecting apparatus for use in projecting patterned electromagnetic waves onto an object, comprising:

an electromagnetic-wave source;

an electromagnetic-wave modulating element allowing at least part of an electromagnetic wave incoming from the electromagnetic-wave source to be modulated, by angular modulation or change of electromagnetic-radiant-power distribution per solid angle, and to go out; and a selector adapted to allow a selected one of a plurality of angular components of an electromagnetic wave outgoing from the electromagnetic-wave modulating element, to pass through the selector, the selected angular component having a radiant angle characteristic that achieves a predetermined entrance numerical aperture, wherein the electromagnetic-wave modulating element is configured to modulate the incoming electromagnetic wave, by relying on a surface shape of the electromagnetic-wave modulating element, the electromagnetic-wave modulating element is shaped to include at least one pair of two portions having different surface shapes, which portions are alternately arrayed in a direction in which the electromagnetic-wave modulating element extends, and one of the two portions allows one of the plurality of angular components which has a radiant angle characteristic that achieves the entrance numerical aperture, to go out as a selected electromagnetic-wave component which will be selected by the selector, while the other allows one of the plurality of angular components which has a radiant angle characteristic that does not achieve the entrance numerical aperture, to go out as a non-selected so electromagnetic-wave component which will not be selected by the selector.

(13) A three-dimensional input apparatus for use in entering three-dimensional information of a subject, comprising:

a projecting device adapted to project a plurality of different light patterns onto the subject, in succession; and an image-capturing device adapted to capture images of the subject as the projecting device projects the plurality of light patterns onto the subject, in succession, wherein the projecting device is configured to include:

a light source;

a projection mechanism adapted to transform light incoming from the light source into a successively-selected one of the plurality of light patterns; and a projection optical system adapted to project the successively-selected light pattern which has outgone from the projection mechanism, onto the subject, wherein the projection mechanism is configured to include:

a housing;

a feed guide attached to the housing and extending across the light incoming from the light source;

a carriage guided movably by the feed guide;

a movable member held by the carriage and having an optical element allowing the plurality of light patterns to be generated using the incoming light from the light source; and a drive mechanism adapted to drive the carriage along the feed guide, wherein the optical element is configured to include modulating optics allowing at least part of incoming light from the light source to be modulated, by angular modulation or change of luminance distribution, and to go out, the projection optical system is configured to include a component-selector optical system adapted to allow a selected one of a plurality of angular components of light outgoing from the modulating optics, to pass through the component-selector optical system, the selected angular component having a radiant angle characteristic that achieves a predetermined entrance numerical aperture, the modulating optics is configured to optically modulate the incoming light, by relying on a surface shape of the modulating optics, the modulating optics is shaped to include at least one pair of two portions having different surface shapes, which portions are alternately arrayed in a direction in which the modulating optics extends, and one of the two portions allows one of the plurality of angular components which has a radiant angle characteristic that achieves the entrance numerical aperture, to go out as a passed-through optical component which will pass through the component-selector optical system, while the other allows one of the plurality of angular components which has a radiant angle characteristic that does not achieve the entrance numerical aperture, to go out as a non-passed-through optical component which will not pass through the component-selector optical system.

(14) The three-dimensional input apparatus according to mode (13), wherein the optical element is configured to include a plurality of portions arrayed along the movable member and generating the plurality of light patterns, respectively, and the carriage is adapted to allow the optical element to move along a move plane disposed across the incoming light from the light source, the three-dimensional input apparatus further comprising an angular-position adjustment mechanism for use in adjusting an angular position of the optical element on the move plane.

This 3-D input apparatus would achieve basically the same functions and effects as those of the 3-D input apparatus according to mode (24) as will be described later.

(15) The three-dimensional input apparatus according to mode (14), wherein the angular-position adjustment mechanism is configured to include:

a support mechanism adapted to cause the carriage to support the movable member rotatably, with the movable member being confined to the move plane; and a rotation mechanism adapted to rotate the movable member relative to the carriage, with the movable member being confined to the move plane.

(16) The three-dimensional input apparatus according to mode (15), wherein the rotation mechanism is configured to include a screw mechanism configured to include a male screw having a centerline of rotation not normal to the move plane and a female screw threaded into the male screw, wherein a relative axial-position between the male screw and the female screw changes depending on an amount of relative rotation between the male screw and the female screw.

This 3-D input apparatus would achieve basically the same functions and effects as those of the 3-D input apparatus according to mode (26) as will be described later.

(17) The three-dimensional input apparatus according to any one of modes (13)-(16), wherein the feed guide is configured to include a primary guide attached to the housing and elongated to define an outer circumferential surface generally in the form of a cylindrical surface, and the carriage is slidably fitted onto the outer circumferential surface of the primary guide.

This 3-D input apparatus would achieve basically the same functions and effects as those of the 3-D input apparatus according to mode (27) as will be described later.

(18) The three-dimensional input apparatus according to any one of mode (17), wherein the carriage is fitted with the primary guide slidably and rotatably in opposite angular-directions around the primary guide, the feed guide further includes a secondary guide extending generally in parallel to the primary guide, the carriage is mechanically inhibited from rotating in a pre-selected one of the opposite angular-directions by selective engagement of the carriage with the secondary guide, and the optical element is disposed at the carriage in such a position relative to the carriage that allows the optical element to be oriented generally perpendicular to the incoming light from the light source, with the carriage being engaged with the secondary guide.

This 3-D input apparatus would achieve basically the same functions and effects as those of the 3-D input apparatus according to mode (28) as will be described later.

(19) The three-dimensional input apparatus according to any one of modes (13)-(18), further comprising:

a directing section disposed between the optical element and the projection optical system and adapted to direct outgoing light from a to-be-selected one of the plurality of portions of the optical element, to the projection optical system, in a dark box; and a window section disposed at the directing section so as to face directly the to-be-selected portion of the optical element and adapted to introduce outgoing light from the to-be-selected portion of the optical element into the directing section.

This 3-D input apparatus would achieve basically the same functions and effects as those of the 3-D input apparatus according to mode (29) as will be described later.

(20) The three-dimensional input apparatus according to mode (19), wherein the directing section extends from the projection optical system to near one of different faces of the optical element which is proximal to the projection optical system, and the window section is disposed at an area of the directing section which is proximal to the to-be-selected portion of the optical element.

(21) The three-dimensional input apparatus according to any one of modes (13)-(20), further comprising:

a directing section disposed between the light source and the optical element and adapted to direct outgoing light from the light source to a to-be-selected one of the plurality of portions of the optical element, in a dark box; and a window section disposed at the directing section so as to face directly the to-be-selected portion of the optical element and adapted to introduce outgoing light from the directing section into the to-be-selected portion of the optical element.

This 3-D input apparatus would achieve basically the same functions and effects as those of the 3-D input apparatus according to mode (31) as will be described later.

(22) The three-dimensional input apparatus according to mode (21), wherein the directing section extends from the light source to near one of different faces of the to-be-selected portion which is proximal to the light source, and the window section is disposed at an area of the directing section which is proximal to the to-be-selected portion of the optical element.

(23) A three-dimensional input apparatus for use in entering three-dimensional information of a subject, comprising:

a projecting device adapted to project a plurality of different light patterns onto the subject, in succession; and an image-capturing device adapted to capture images of the subject as the projecting device projects the plurality of light patterns onto the subject, in succession, wherein the projecting device is configured to include;

a light source for emitting light;

a projection mechanism adapted to transform light incoming from the light source into a successively-selected one of the plurality of light patterns; and a projection optical system adapted to project the successively-selected light pattern which has outgone from the projection mechanism, onto the subject, wherein the projection mechanism is configured to include:

a housing;

a feed guide attached to the housing and extending across the light incoming from the light source;

a carriage guided movably by the feed guide;

a movable member held by the carriage and having an optical element allowing the plurality of light patterns to be generated using the incoming light from the light source; and a drive mechanism adapted to drive the carriage along the feed guide.

The invention set forth in this mode relates generally to techniques of changing which one of different kinds of light patterns to be projected on a subject for entry of 3-D information of the subject, by indexing a movable member to different positions, which member includes an optical element for use in outputting different kinds of light patterns. The invention relates more specifically to improvements of techniques of indexing the movable member to different positions.

There is known a technique of optically entering 3-D information of a subject. An example of such a technique allows the subject to be digitally photographed, and 3-D information of the subject is measured by calculation based on the resulting photographs of the subject.

Typically, a 3-D input apparatus for implementing such a kind of technique is configured to include: (a) a projecting device adapted to project a plurality of different light patterns onto the subject, in succession; and (b) an image-capturing device adapted to capture images of the subject as the projecting device projects the plurality of light patterns onto the subject, in succession.

In such a 3-D input apparatus, the projecting device is generally configured to include: (c) a light source for emitting light; (d) a projection mechanism adapted to transform light incoming from the light source into a successively-selected one of the plurality of light patterns; and (e) a projection optical system adapted to project the successively-selected light pattern which has outgone from the projection mechanism, onto the subject.

The above-discussed Japanese Patent Application Publication No. 2003-42736 discloses an exemplary conventional 3-D input apparatus. In this exemplary conventional apparatus, the projection mechanism is configured to change which one of different kinds of light patterns to be projected on a subject, by indexing a linearly movable member to different positions, which includes a plurality of optical elements corresponding to a plurality of light patterns, respectively.

More specifically, this projection mechanism in the above-described exemplary conventional apparatus is configured to include a mask member (i.e., an exemplary linearly movable member) in which a plurality of strip patterns different in phase are arrayed in a stripe elongation direction, and a moving device for moving the mask member in the stripe elongation direction, in front of a light source.

In the exemplary conventional apparatus, each of the light patterns is in the form of a stripe having alternating bright portions and dark portions. To this end, the mask member is fabricated in the form of a photomask for spatially-selectively masking light incoming from the light source.

The photomask is fabricated such that light-transmissive portions corresponding to bright portions of patterned light, and light-occluding portions corresponding to dark portions of patterned light are alternately arrayed. In general, the light-transmissive portions are in the form of air openings. Thus, a conventional photomask is provided for spatially-selectively transmitting or blocking light emitted from a light source, to thereby transform the light emitted from the light source into patterned light.

There is a case where the thus-generated patterned light is projected onto a subject, to thereby optically measure 3-D information (e.g., a 3-D shape) of the subject. In this case, the 3-D information of the subject can be measured at an increasing level of resolution as the spatial interval of bright portions and dark portions arrayed in the patterned light, that is to say, the distance between adjacent ones of pattern lines forming the patterned light is shortened. The 3-D information of a subject can be measured with increasing accuracy, as the accuracy of the distance between adjacent pattern lines increases.

When, however, the movement of a mask member allows which one of different kinds of light patterns to be projected onto the subject, to be changed, like the above-stated exemplary conventional apparatus, even if the mask member has been precisely fabricated, if the mask member has been positioned with inadequate accuracy, then the 3-D information of the subject cannot be measured with high precision.

On the other hand, the above-discussed Japanese Patent Application Publication No. 2003-42736 fails to teach any specific configuration of the moving device, and also fails to teach that the measurement accuracy of the 3-D information of the subject depends on the positioning accuracy of the mask member by the moving device.

With the above-described circumstances in mind, the invention set forth in this mode has been made to provide a 3-D input apparatus adapted to change which one of different kinds of light patterns to be projected on a subject for entry of 3-D information of the subject, by indexing a movable member to different positions, which member includes an optical element for use in outputting different kinds of light patterns, with an ability of easily improving the positioning accuracy of the optical element.

In this 3-D input apparatus according to this mode, for changing which one of different light patterns to be projected onto the subject, there is indexed to different positions the movable member which includes the optical element for generating the plurality of light patterns. For the indexing of the movable member, the projection mechanism is adapted to move the movable member by carriage driving.

This projection mechanism, for achieving the carriage driving of the movable member, is configured to include the feed guide, which is attached to the housing and extending across the light incoming from the light source, and the carriage, which is guided movably by the feed guide.

In an example of the above-mentioned projection mechanism, the carriage may be slidably fitted onto the feed guide to achieve metal-to-metal contact with the feed guide. In this example, it is easier to minimize a clearance between the carriage and the feed guide, which is one of advantages that would result from the employment of the carriage driving.

For these reasons, the 3-D input apparatus according to this mode would facilitate the improvement of the accuracy with which the projection mechanism can position (move and stop) the movable member and the optical element at a desired location, resulting in easy improvement of the accuracy with which the 3-D information of a subject can be measured.

In this 3-D input apparatus, the optical element is configured to include an array of a plurality of portions which correspond to the plurality of different light patterns. The indexing of the optical element may be performed as sequential access in a direction of the array (e.g., a linear direction or a rotary direction) or as random access.

It is added that, when the wavelengths of the different light patterns are diversified, concurrent projection of the different light patterns onto the same subject does not affect the process of identifying the individual light patterns using the wavelength difference. Combination with this wavelength diversity, therefore, would allow the indexing of the optical element to be at least partially eliminated.

In this 3-D input apparatus according to this mode, the optical element may be flat-shaped or cylindrical. For a flat-shaped optical element, the indexing of the optical element is achieved by, for example, linear motion of the optical element, while, for a cylindrical optical element, the indexing of the optical element is achieved by, for example, rotary motion (e.g., curvilinear motion along an arc) of the optical element.

Further, in this 3-D input apparatus according to this mode, the optical element may be configured to include a plurality of sub-elements which generate their corresponding respective light patterns, independently of each other or one another, or may be configured, using a hologram in the form of a unitary optical device, to move an entrance position at which light incoming from a light source enters the hologram, by a drive mechanism, relative to the hologram, to thereby change the shape of a light pattern by the hologram, in succession.

An illustrative example of the 3-D input apparatus according to this mode may be configured, such that the projecting device is adapted to project a successively-selected one of the plurality of different light patterns onto a subject, and such that the image-capturing device is adapted to capture images of the subject as the projecting device projects the plurality of light patterns onto the subject, in succession.

In this illustrative example, further, the projecting device is configured to include: (a) a light source for emitting light; (b) a projection mechanism adapted to transform light incoming from the light source into a successively-selected one of the plurality of light patterns; and (c) a projection optical system adapted to project the successively-selected light pattern which has outgone from the projection mechanism, onto the subject.

In this illustrative example, still further, the projection mechanism is configured to include: (i) a housing; (ii) a feed guide attached to the housing and extending rectilinearly across the light incoming from the light source; (iii) a carriage guided rectilinearly movably by the feed guide; (iv) a linearly movable member held by the carriage and having a plurality of planar optical elements in a linear array along a moving direction of the carriage, which elements allow the plurality of light patterns to be generated, respectively, using the incoming light from the light source; and (v) a drive mechanism adapted to drive the carriage along the feed guide.

(24) The three-dimensional input apparatus according to mode (23), wherein the optical element is configured to include a plurality of portions arrayed along the movable member and generating the plurality of light patterns, respectively, and the carriage is adapted to allow the optical element to move along a move plane disposed across the incoming light from the light source, the three-dimensional input apparatus further comprising an angular-position adjustment mechanism for use in adjusting an angular position of the optical element on the move plane.

In this 3-D input apparatus, the optical element, which has the portions arrayed in the movable member along the move planer is moved along the move plane, to thereby change which one of different kinds of light patterns to be projected onto a subject.

In this 3-D input apparatus, further, there is adjustable the angular position of the optical element in the move plane, which element has the portions, that is to say, the rotation angle of the optical element (i.e., in-plane rotation angle) in a plane along the optical element.

This 3-D input apparatus, therefore, would make it easier not only to improve the accuracy with which the optical element is positioned in the moving direction of the carriage, but also to improve the accuracy with which the optical element is angularly positioned in the plane of the optical element.

(25) The three-dimensional input apparatus according to mode (24), wherein the angular-position adjustment mechanism is configured to include:

a support mechanism adapted to cause the carriage to support the movable member rotatable, with the movable member being confined to the move plane; and a rotation mechanism adapted to rotate the movable member relative to the carriage, with the movable member being confined to the move plane.

(26) The three-dimensional input apparatus according to mode (25), wherein the rotation mechanism configured to include a screw mechanism configured to include a male screw having a centerline of rotation not normal to the move plane and a female screw threaded into the male screw, wherein a relative axial-position between the male screw and the female screw changes depending on an amount of relative rotation between the male screw and the female screw.

This 3-D input apparatus allows the in-plane rotation angle of the optical element to be adjusted using the screw

(27) The three-dimensional input apparatus according to any one of modes (23)-(26), wherein the feed guide is configured to include a primary guide attached to the housing and elongated to define an outer circumferential surface generally in the form of a cylindrical surface, and the carriage is slidably fitted onto the outer circumferential surface of the primary guide.

In this 3-D input apparatus, the feed guide is configured to include a primary guide elongated to define an outer circumferential surface generally in the form of a cylindrical surface, and the carriage is slidably fitted onto the outer circumferential surface of the primary guide, to thereby achieve the carriage driving of the movable member.

In this 3-D input apparatus, the accuracy with which the carriage is positioned at any desired location depends on the shape accuracy of the primary guide, and the primary guide is shaped to define its outer circumferential surface generally in the form of a cylindrical surface.

On the other hand, when machining a material to show a desired shape, the machining accuracy of the material, in general, is affected by the desired shape of the material. More specifically, in an illustrative example in which a member has a circular cross section, the member can be machined with less complexity and easier improvement of the machining accuracy, than in an alternative example in which the member has been shaped differently.

It is added that a material can be machined with less complexity and easier improvement of the machining accuracy when the primary guide is shaped to extend straight, than when the primary guide is shaped to extend not straight.

This 3-D input apparatus according to this mode, because of the support of the carriage by the primary guide having its shape advantageous in readily improving the machining accuracy, would readily improve the accuracy with which the carriage is positioned at any desired location.

(28) The three-dimensional input apparatus according to any one of mode (27), wherein the carriage is fitted with the primary guide slidably and rotatably in opposite angular-directions around the primary guide, the feed guide further includes a secondary guide extending generally in parallel to the primary guide, the carriage is mechanically inhibited from rotating a pre-selected one of the opposite angular-directions by selective engagement of the carriage with the secondary guide, and the optical element is disposed at the carriage in such a position relative to the carriage that allows the optical element to be oriented generally perpendicular to the incoming light from the light source, with the carriage being engaged with the secondary guide.

In this 3-D input apparatus, the carriage, although slidably fitted onto the primary guide rotatably around the primary guide in opposite angular-directions, is selectively brought into engagement with the secondary guide disposed generally in parallel to the primary guide, to thereby physically prevent sliding rotation of the carriage in a selected one of the opposite angular-directions of the carriage.

Therefore, the optical element is moved along a locus limited to a single plane (i.e., a flat plane or a curved plane), as a result of the movement of the carriage along the primary guide.

In this 3-D input apparatus, further, the optical element is disposed in the carriage, so as to be situated to generally perpendicularly face the light incoming from the light source, during the engagement of the carriage with the secondary guide, that is to say, during the movement of the carriage along the primary guide.

In this 3-D input apparatus, therefore, during the movement of the carriage along the primary guide, the optical element is undesirably rotated around the primary guide from the desired position, with a reduced risk. This results in the improvement in the stability of the angle at which light incoming from the light source enters the optical element, irrespective of whether the movable member is placed in a stationary state or a moving state.

In this 3-D input apparatus, in a first example, the primary guide and the secondary guide are disposed on opposite sides interposing therebetween an optical axis of the light source, respectively, and, in a second example, the primary guide and the secondary guide are disposed together on the same side with respect to the optical axis of the light source.

In the second example, the primary guide and the secondary guide may be disposed to form an array in parallel to the optical axis of the light source. The layout in which the primary guide and the secondary guide are arranged is desirably determined for the purpose of, for example, minimizing the risk that the attitude of the movable member shown during rotation around the primary guide, is affected by the manufacturing error, the assembling error or the like occurring in the primary and secondary guides.

(29) The three-dimensional input apparatus according to any one of modes (23)-(28), further comprising:

a directing section disposed between the optical element and the projection optical system and adapted to direct outgoing light from a to-be-selected one of the plurality of portions of the optical element, to the projection optical system, in a dark box; and a window section disposed at the directing section so as to face directly the to-be-selected portion of the optical element and adapted to introduce outgoing light from the to-be-selected portion of the optical element into the directing section.

This 3-D input apparatus would readily allow only the outgoing light from a to-be-selected one of the plurality of portions of the optical element, to be introduced into the projection optical system with increased certainty, resulting in projection onto a subject. This 3-D input apparatus, therefore, would make it easier to generate desired light patterns on a subject with increased certainty, with influence of disturbance light being eliminated.

(30) The three-dimensional input apparatus according to mode (29), wherein the directing section extends from the projection optical system to near one of different faces of the optical element which is proximal to the projection optical system, and the window section is disposed at an area of the directing section which is proximal to the to-be-selected portion of the optical element.

(31) The three-dimensional input apparatus according to any one of modes (23)-(30), further comprising:

a directing section disposed between the light source and the optical element and adapted to direct outgoing light from the light source to a to-be-selected one of the plurality of portions of the optical element, in a dark box; and a window section disposed at the directing section so as to face directly the to-be-selected portion of the optical element and adapted to introduce outgoing light from the directing section into the to-be-selected portion of the optical element.

This 3-D input apparatus would readily allow only the light incoming from the light source to enter a to-be-selected one of the plurality of portions of the optical element, with increased certainty. This 3-D input apparatus, therefore, would make it easier to generate desired light patterns on a subject with increased certainty, with influence of disturbance light being eliminated.

(32) The three-dimensional input apparatus according to mode (31), wherein the directing section extends from the light source to near one of different faces of the to-be-selected portion which is proximal to the light source, and the window section is disposed at an area of the directing section which is proximal to the to-be-selected portion of the optical element.

Several presently preferred embodiments of the invention will be described in more detail by reference to the drawings in which like numerals are used to indicate like elements throughout.

FIG. 1 illustrates in a perspective view the exterior of a three-dimensional (3-D) input device 10 constructed in accordance with an illustrative embodiment of the present invention. This 3-D input device 10 is designed to project different striped light-patterns onto a subject S (object), digitally photograph the subject S, and, based on at least one resultant photograph of the subject S, perform signal processing for obtaining 3-D information and surface-color information of the subject S using a computer.

FIGS. 1-5 illustrate the exterior structure of the 3-D input device 10, while FIGS. 6-12 illustrate the interior structure of the 3-D input device 10. The exterior structure will be described below first, and then the interior structure.

As illustrated in FIG. 1, the 3-D input device 10 is configured to include a measurement head MH, a turntable unit RT and a holder HD.

The measurement head MH is provided for use in optically photographing the subject S, and measuring the 3-D shape and the surface-color of the subject S, based on at least one resultant photograph of the subject S.

The turntable unit RT is provided to allow the indexing rotation of the subject S with respect to the measurement head MH, which enables the measurement head MH to photograph the subject S per each indexing rotation of the subject S, to thereby allow the subject S to be photographed in a manner that the overall area of an exterior surface of the subject S is divided into a plurality of sub-areas.

The subject S is repeatedly photographed per each sub-area, resulting in the generation of a plurality of sub-images of the subject S. In this regard, the term "image" is interrupted to include not only a conventional 2-D image but also a 3-D image having the surface-color information and the 3-D shape information of a 3-D object.

The generated plurality of sub-images, after retrieval therefrom of respective sets of 3-D shape information on a sub-image-by-sub-image basis, are combined into a single stitched shape-image, by shape stitching. Then, sets of surface-color information (i.e., texture) of the plurality of sub-images that have been obtained for the subject S are mapped onto the stitched shape-image.

In addition to that, texture stitching is performed for seaming together a plurality of surface-colors indicated by the respective sets of surface-color information without causing any color difference between adjacent borders at the seams of the plurality of sub-images. The shape stitching and the texture stitching result in 3-D input data, that is to say, 3-D-shape-and-color data.

As illustrated in FIG. 1, the holder HD is provided such that the holder HD is attached to the measurement head MH, while the holder HD holds the turntable unit RT. The holder HD is self-transformable. More specifically, in the present embodiment, the holder HD is designed to be transformed by the folding motion.

The holder HD is configured to be selectively transformed, by the self-transformation, into an unfolded position in which the turntable unit RT is unfolded with respect to the measurement head MH, and into a folded position in which the turntable unit RT is folded with respect to the measurement head MH. Further, in the present embodiment, the holder HD is detachably attached to the measurement head MH.

Figure 2:
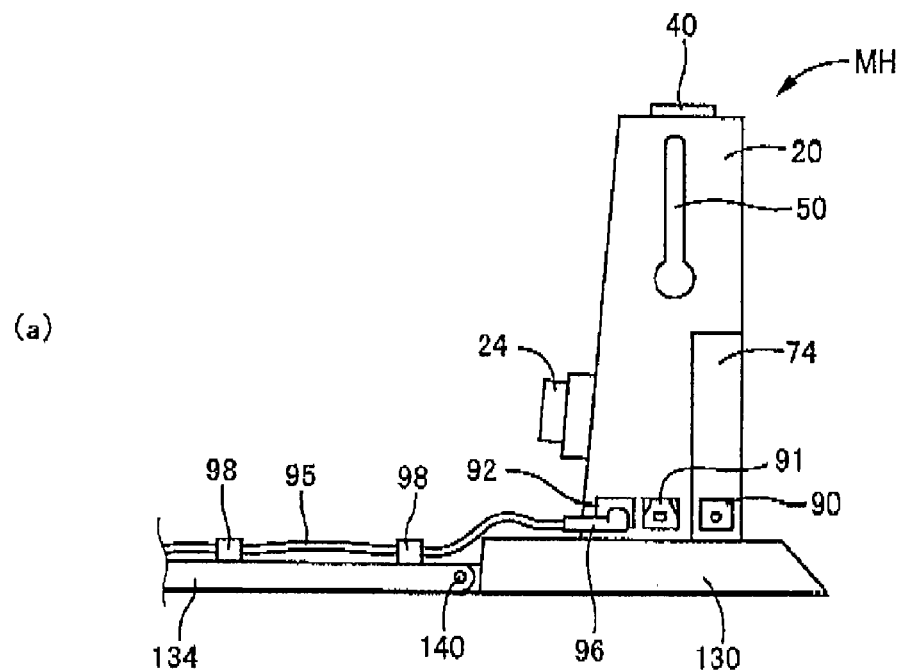
FIGS. 2(a) and 2(b) are a side view and a back view both of which in-part illustrate the 3-D input device 10 depicted in FIG. 1, in an extended state, respectively.
Figure 2:
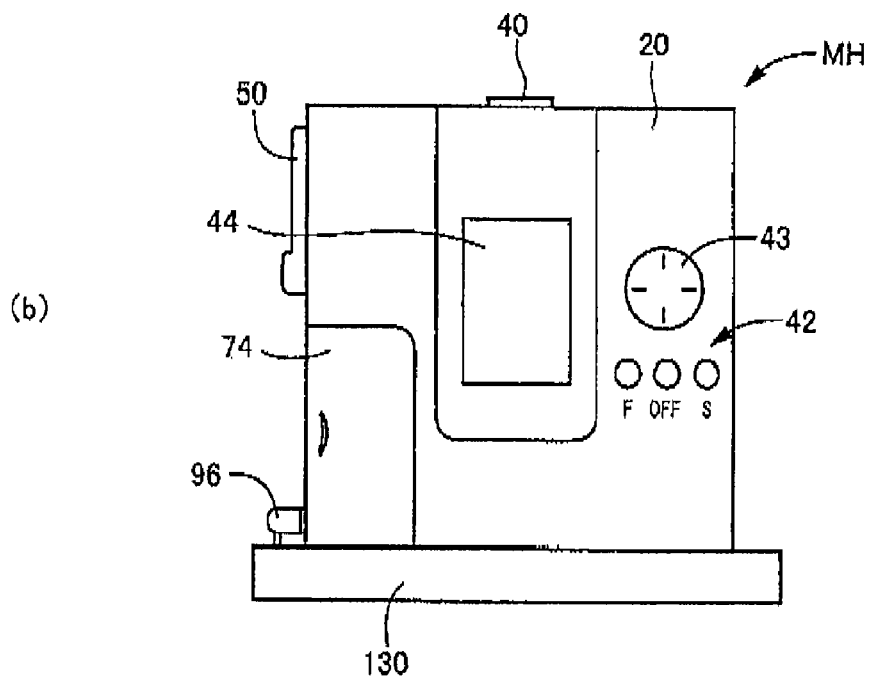

FIG. 1 is a perspective view illustrating the holder ED in an unfolded position, FIG. 2(*a*) is a side view partly illustrating the measurement head MH and the holder HD, both in an unfolded position, respectively, and FIG. 2(*b*) is a rear view illustrating the measurement head MH.

Figure 3:
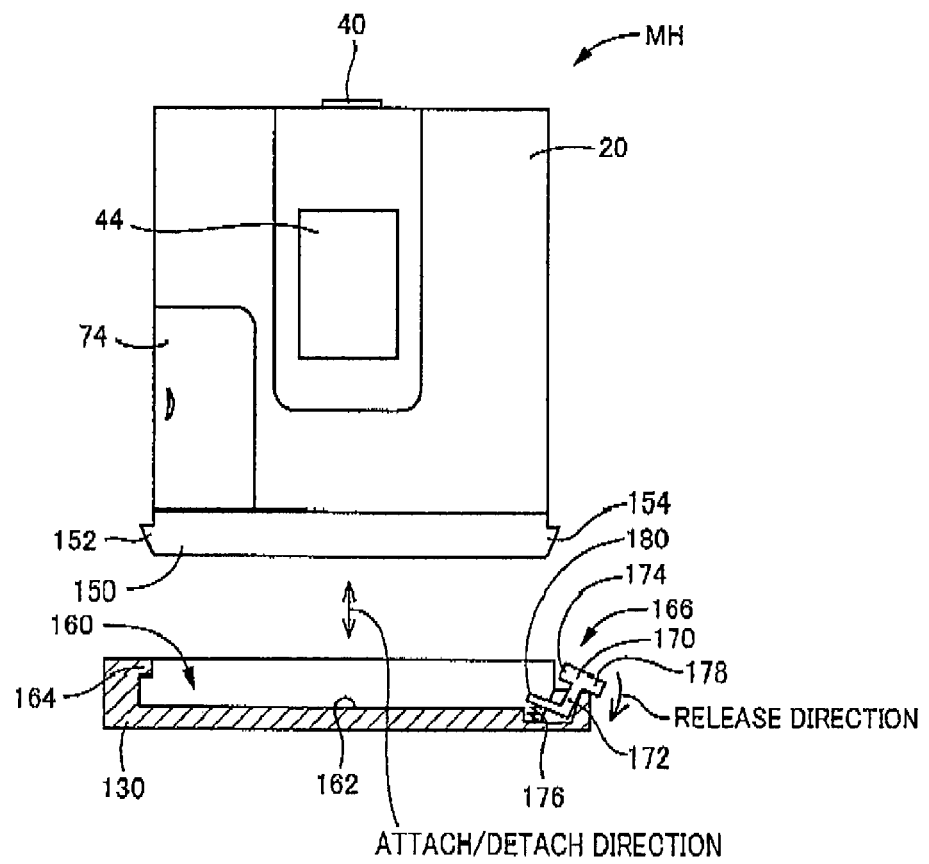
FIG. 3 is a partially sectional back view for explanation of an attachment mechanism for attaching together a measurement head MS and a head base 130 both depicted in FIG. 1.
Figure 4:
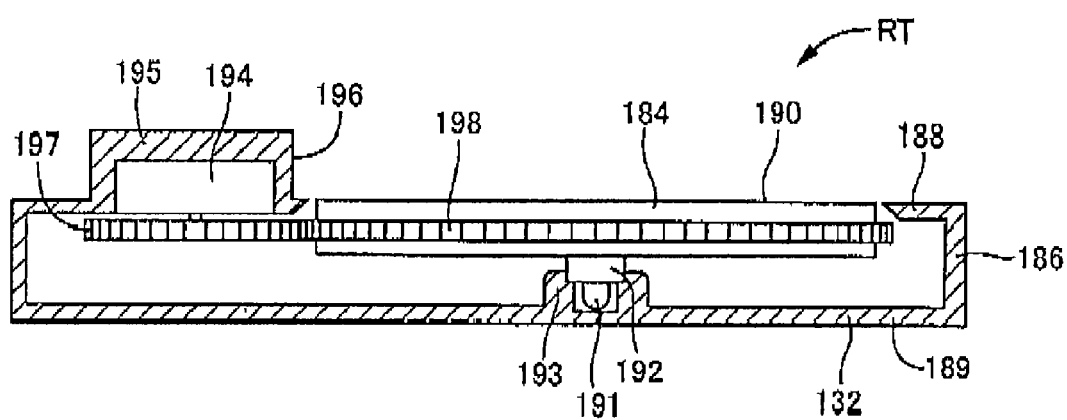
FIG. 4 is a sectional back view illustrating a turntable unit RT depicted in FIG. 1.

FIG. 3 is a rear view illustrating the measurement head MH in a detached position in which the measurement head MH is detached from the holder HD. FIG. 4 is a rear view illustrating the turntable RT in section.

Figure 5:
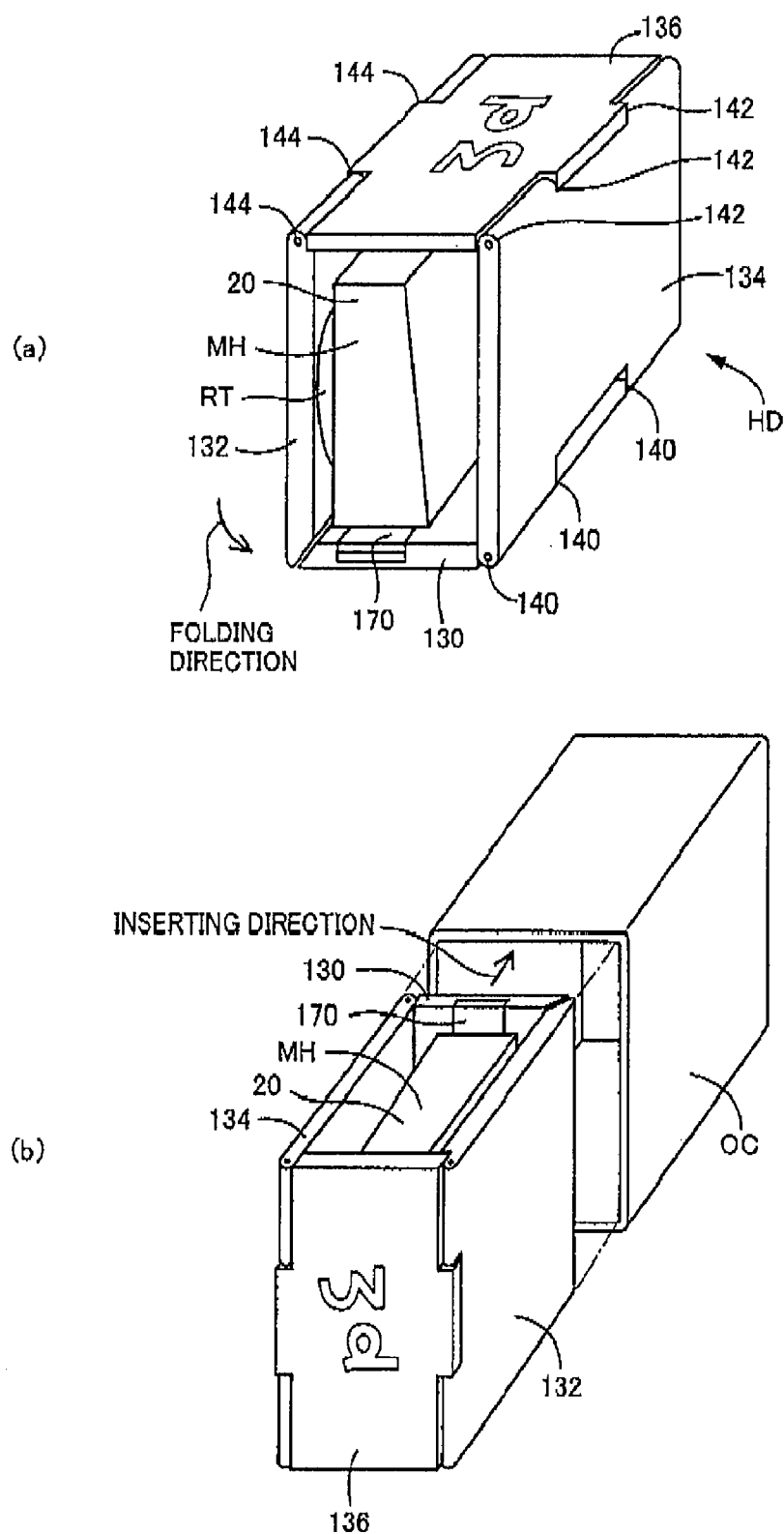
FIGS. 5(a) and 5(b) are a perspective view illustrating the 3-D input device 10 depicted in FIG. 1, in a retracted state, and a perspective view for explanation of how the 3-D input device 10 is being retracted into an outer case OC, respectively.

FIG. 5(*a*) is a perspective view illustrating the holder HD in a retracted position (i.e., in the folded position), together with the measurement head MH and the turntable unit RT. FIG. 5(*b*) is a perspective view illustrating how the holder HD in the folded position is retracted into an outer case OC acting as a carrying case, together with the measurement head MH and the turntable unit RT. The 3-D input device 10, when in the retracted position illustrated in FIG. 5(*b*), is easier for the user to carry or move.

As illustrated in FIG. 1, the measurement head MH is configured to include a projecting section 12 adapted to project patterned light onto the subject S, an image-capturing section 14 adapted to photograph the subject S, and a processing section 16 adapted to perform the signal processing for obtaining the 3-D information and the surface color information of the subject S. The projecting section 12, the image-capturing section 14 and the processing section 16 are all attached to a casing 20 of the measurement head MH, the casing 20 being generally in the form of a rectangular solid.

As illustrated in FIG. 1, on the casing 20, there are mounted a lens barrel 24 and a flash light 26 in a position allowing each one of the lens barrel 24 and the flash light 26 to be exposed partly at the front face of the casing 20. On this casing 20, an image-capture optical system 30 is also mounted which constitutes part of the image-capturing section 14, in a position allowing a portion of its lenses to be exposed at the front face of the casing 20. The image-capture optical system 30 receives, at its exposed portion, imaging light indicative of the subject S.

Figure 6:
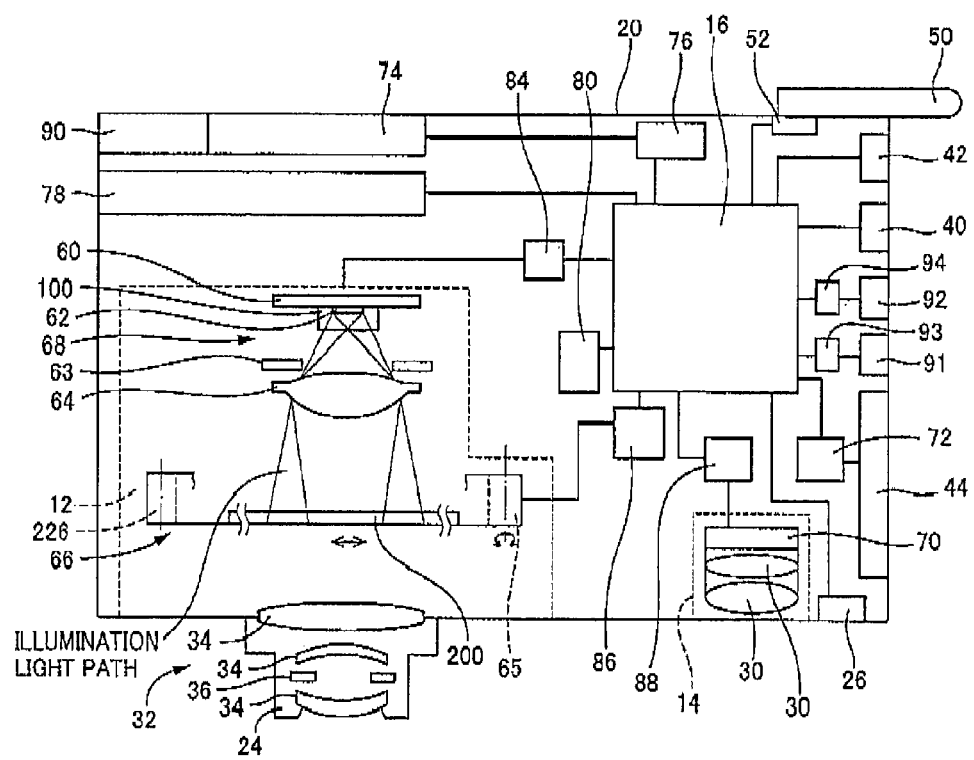
FIG. 6 is a sectional plan view illustrating the internal structure of the measurement head MH depicted in FIG. 1.

The lens barrel 24, as illustrated in FIG. 1, is protruded from the front face of the casing 20, while including therein, as illustrated in FIG. 6, a projection optical system 32 which constitutes part of the projecting section 12. The projection optical system 32 is configured to include a plurality of projection lenses 34 and an aperture stop 36.

This lens barrel 24 holds the projection optical system 32 in a lens barrel holder 250 entirely movably for focus adjustment, and additionally protects the projection optical system 32 from being damaged.

There is exposed at an exposed end face of the lens barrel 24, an outermost one of the plurality of projection lenses 34. The projection optical system 32 projects the patterned light from an outermost one of the projection lenses 34 toward the subject S, with the outermost projection lens 34 serving as a final-stage light-emitting surface.

The flash light 26, which acts as a light source to emit light to compensate for the shortage of light when photographing in a dark place, is constructed with a discharge tube filled with Xe gas, for example. Thus, this flash light 26 can be reused due to repeated electric discharges of a charger (not shown) built in the casing 20.

As illustrated in FIG. 1, a release button 40 is mounted on the casing 20 at its upper face. As illustrated in FIG. 2(b), there are also mounted on the casing 20 at its rear face, a mode selection switch 42 (which are comprised of three buttons in an example illustrated in FIG. 2(b)), a four-directional input key (i.e., cursor control key) 43 and a monitor LCD (Liquid Crystal Display) 44. The mode selection switch 42 and the four-directional input key 4S each constitute an example of a function button.

The release button 40 is manipulated by a user to activate the 3-D input device 10. This release button 40 is of a two-phase pushbutton type allowing this release button 40 to issue different commands between when the operational state of the user (i.e., depressed state of the user) is in a "half-depressed state" and when in a "fully-depressed state."

The operational state of the release button 40 is monitored by the processing section 16. Upon detection of the "half-depressed state" of the release button 40 by the processing section 16, well-known features of auto-focus (AF) and auto-exposure (AE) start to automatically adjust the lens focus, the aperture and the shutter speed.

In contrast, upon detection of the "fully-depressed state" of the release button 40 by the processing section 16, operations such as a photographing operation start.

The mode selection switches 42 are manipulated by a user to set a current operational mode of the 3-D input device 10 as one of various kinds of operational modes including a SLOW mode (denoted as "S" in FIG. 2(b)), a FAST mode (denoted as "F" in FIG. 2(b)) and an OFF mode (denoted as "OFF" in FIG. 2(b)), all of which will be described later on.

The operational state of the mode selection switches 42 is monitored by the processing section 16, and, upon detection of a current operational state of the mode selection switches 42 by the processing section 16, desired processing is performed in the 3-D input device 10 in an operational mode corresponding to the detected state of the mode selection switches 42.

The monitoring LCD 44, which is configured with a Liquid Crystal Display (LCD) being employed, displays desired images to a user in response to reception of an image signal from the processing section 16. This monitoring LCD 44 displays images indicative of the detected result of the 3-D shape of the subject S (i.e., stereoscopic-image), etc., for example.

As illustrated in FIG. 2, there is also mounted on the casing 20 an antenna 50 acting as an RF (Radio-Frequency) interface. The antenna 50 is, as illustrated in FIG. 6, connected to an RF driver 52. This antenna 50 transmits and receives data indicative of the subject S in the form of a stereoscopic image and other information, to and from an external interface, (not shown), via the RF driver 25 by wireless.

Then, a structure employed for the holder HD will be described in more detail by referring to FIG. 1.

The holder HD is constructed by disposing a plurality of plate-like members in a linear array and by foldably coupling them together. That is to say, this holder HD is constructed by hingedly coupling the plurality of plate-like members together such that the plurality of plate-like members form a linear array.

More specifically, the holder HD includes a plate-like head base 130 on which the measurement head MH is detachably mounted, a plate-like table base 132 mounted on the turntable unit RT, and first and second intervening bases 134 and 136 both of which take plate-like shapes and are interposed between the head base 130 and the table base 132. The head base 130, the table base 132, and the first and second intervening bases 134 and 136 together act as a plurality of plate-like members foldably coupled to each other.

As illustrated in FIG. 1, the measurement head MH takes the shape generally in the form of a rectangular solid elongated vertically, and, for relative dimensions of the measurement head MH between its upper and lower faces, and its front and rear faces, in comparison, all these faces are generally common in lateral dimension, while the front and rear faces are each longer in vertical dimension than the upper and lower faces.

On the other hand, when the holder HD is in the retracted position, although will be described in more detail later on by referring to FIG. 5, the head base 130 is attached to the lower face of the measurement head MH, the first intervening base 134 covers the front face of the measurement head MH, the second intervening base 136 covers the upper face of the measurement head MH, and the table base 132 covers the rear face of the measurement head MH. Therefore, the first intervening base 134 and the table base 132 are each longer in vertical dimension than the head base 130 and the second intervening base 136.

One of opposite faces of the first intervening base 134, which opposes the front face of the measurement head MH when the holder HD is in the retracted position, that is to say, which is exposed when the holder HD is in the unfolded position, is assigned an instruction-indicating face for indicating the instructions on how to operate the 3-D input device 10, etc. The instructions are carried on the instruction-indicating face, by sticker attachment, etc.

As illustrated in FIG. 1, the head base 130 and the first intervening base 134 are pivotably coupled together via a joint 140 having a common axis. The first and second intervening bases 134 and 136 are pivotably coupled together via a joint 142 having a common axis. The second intervening base 136 and the table base 132 are pivotably coupled together via a joint 144 having a common axis.

Then, a structure employed for allowing the measurement head MH to be detachably mounted on the head base 130 will be described by referring to FIGS. 1-3.

The measurement head MH is mounted on the head base 130 due to mechanical engagement with its upper face. As illustrated in FIG. 3, for achieving the mechanical engagement, a head-seated portion 150 is formed at the lower end portion of the measurement head MH at which the measurement head MH is engaged with the head base 130. This head-seated portion 150 has first and second engagement claws 152 and 154 acting as a pair of male engagement portions.

As illustrated in FIG. 3, these first and second engagement claws 152 and 154 are formed at a pair of positions, respectively, which are spaced apart from each other in the lateral direction of the measurement head MH, that is to say, the lateral direction of the head base 130, such that the first and second engagement claws 152 and 154 each extend in a back-and-forth direction of the measurement head MH, that is to say, the longitudinal direction of the head base 130.

In the present embodiment, positions of these first and second engagement claws 152 and 154 have been each selected so as to maximize the distance therebetween for maximizing the firmness with which the measurement head MH is fixedly attached to the head base 130.

As illustrated in FIG. 3, there is formed at the head base 130 a head receiving portion 160 which fixedly receives the head-seated portion 150 because of the mechanical engagement of the head receiving portion 160 with the head-seated portion 150.

The head receiving portion 160 includes a head-base seated air-gap 162 into which the head-seated portion 150 is fitted, and also includes first and second claw-abutment portions 164 and 166 acting as a pair of female engagement portions which are engaged with the first and second engagement claws 152 and 154 of the measurement head MH, respectively.

The first claw-abutment portion 164 is a fixed claw-abutment portion which is engaged with the corresponding first engagement claw 152, to inhibit the measurement head MH from being disengaged from the head base 130 in a direction perpendicular to the upper face thereof.

On the other hand, the second claw-abutment portion 166 is a movable claw-abutment portion which is displaceable between (a) an engagement position in which the second claw-abutment portion 166 is engaged with the corresponding second engagement claw 154, to inhibit the measurement head MH from being disengaged from the head base 130 in a direction perpendicular to the upper face thereof; and (b) a release position in which the second claw-abutment portion 166 is disengaged from the corresponding second engagement claw 154, to permit the measurement head MH to be disengaged from the head base 130 in a direction perpendicular to the upper face thereof.

An example of the second claw-abutment portion 166 includes a pivot member 170 pivotable about the pivot axis extending in the longitudinal direction of the head base 130 (a direction perpendicular to a plane of rotation in which the measurement head MS is rotated or tilted relative to the head base 130 for allowing engagement thereto and disengagement therefrom).

The pivot member 170 is pivotably mounted on the head base 130 via a joint 172 having an axis coaxial with the pivot axis of the pivot member 170. The pivot member 170 includes a movable engagement portion 174 which is mechanically engaged with the corresponding second engagement claw 154, to inhibit the second engagement claw 154 from being disengaged from the pivot member 170. The pivot member 170 is inevitably biased by a spring 176 acting as an elastic member, in a direction allowing the movable engagement portion 174 to become engaged with the second engagement claw 154 from thereabove.

In the present embodiment, the pivot member 170 further includes an operating member 178 which is to be depressed by the user for releasing the second engagement claw 154 for disengagement from the movable engagement portion 174, and a leverage (lever) 180 which multiplies the elastic force of the spring 176 and transmit the multiplied force to the movable engagement portion 174.

Next, a user action required for attaching/detaching the measurement head MH with respect to the head base 130 will be described by referring to FIG. 3.

The user, for attaching the measurement head MH to the head base 130, depresses the operating member 178 of the pivot member 170, against the elastic force of the spring 176, in a release direction allowing the movable engagement portion 174 to move from an engagement position to a release position.

With the operating member 178 being depressed, the user lowers the measurement head MH, together with a user action to rotate or tilt the measurement head MH generally in a vertical plane, so that the first engagement claw 152 can enter a recess defined by the first claw-abutment portion 164 into abutment thereon, while the head-seated portion 150 enters the head-base seated air-gap 162.

Thereafter, the user releases the operating member 178 from its depressed state, to thereby allow the pivotal movement of the pivot member 170 from the release position to the engagement position by virtue of the elastic restoring force of the spring 176, and then the movable engagement portion 174 moves toward the second engagement claw 154 from thereabove into engagement with and abutment on the second engagement claw 154.

As a result, the first engagement claw 152 is inhibited from moving upwardly for disengagement from the first claw-abutment portion 164, and additionally the second engagement claw 154 is inhibited from moving upwardly for disengagement from the second claw-abutment portion 166. Consequently, the measurement head MH is inhibited from being disengaged from the head base 130.

On the other hand, the user, for disengaging the measurement head MH from the head base 130, depresses the operating member 178 of the pivot member 170, against the elastic force of the spring 176, as with the case described above.

With the operating member 178 being depressed, the user raises the measurement head MH, together with a user action to rotate or tilt the measurement head MH generally in a vertical planer so that the first engagement claw 152 can escape from the first claw-abutment portion 164, while the head-seated portion 150 is moving for escape from the head-base seated air-gap 162, whereby allowing the disengagement of the measurement head MH from the head base 130.

Thereafter, the user releases the operating member 178 from its depressed state, to thereby allow the return of the pivot member 170 from the release position to the engagement position by virtue of the elastic restoring force of the spring 176.

Next, the turntable unit RT will be described in more detail by referring to FIG. 4.

This turntable unit RT includes a turntable 184 on which the subject S is to be placed, and a support frame 186 which rotatably supports the turntable 184. The support frame 186 is in the form of a thin hollow box defining its upper and lower plate portions 188 and 189, and at an opening of the upper plate portion 188, an upper face of the turntable 184 is exposed. In the present embodiment, the lower plate portion 189 of the support frame 186 acts also as the table base 132.

The upper face of the turntable 184 is a support surface 190 on which the subject S to be photographed is placed. On the other hand, a rotary shaft 191 coaxially extends from a lower face of the turntable 184, and is rotatably supported by the support frame 186 via a bearing 192. The bearing 192 is held by a bearing holder 193 formed in the support frame 186.

A table-mounted motor 194 for rotating the turntable 184 is mounted on the support frame 186. A motor box 195 accommodating the table-mounted motor 194 is formed in the support frame 186.

This motor box 195 is formed on the upper face of the upper plate portion 188 of the support frame 186, so as to protrude upwardly the upper face. This motor box 195 defines its upper face located above the upper face of the turntable 184.

The configuration allows the motor box 195 to define its section (i.e., local portion) located above the upper face of the turntable 184, which, when the subject S has a portion lying outside a silhouette of the turntable 184 obtained by hypothetically projecting the turntable 184 coaxially, abut the portion of the subject S as a result of rotational motion of the subject S together with the turntable 184, to thereby alter the orientation of the subject S.

Accordingly, the motor box 195 acts not only as a portion for housing the table-mounted motor 194 but also as a position guide 196 guiding the position at which the subject S is located on the turntable 184.

For transmission of the rotational motion of the table-mounted motor 194 to the turntable 184, a motor gear 197 is coaxially fixed to a rotary shaft of the table-mounted motor 194, and a table gear 198 mating with this motor gear 197 is coaxially fixed to the turntable 184. The selection of a smaller diameter of the motor gear 197 than that of the table gear 198, allows the rotational motion of the table gear 198 to be transmitted to the turntable 184 with the rotation speed being reduced.

In the alternative, the table-mounted motor 194 may be placed within the support frame 186 so as not to protrude from the upper face of the upper plate portion 188 of the support frame 186.

In the present embodiment, however, the table-mounted motor 194 is placed over an area of the upper face of the upper plate portion 188 which area is outside an exposed surface of the turntable 184, and the placement would not suffer from any disadvantages, rather be more advantageous in configuring the support frame 186 so as to have a low profile.

Therefore, in the present embodiment, the placement of the table-mounted motor 194 so as to protrude from the upper face of the upper plate portion 188, provides the ability of more easily configuring the support frame 186 so as to have a low profile, in addition to the function of the position guide 196 described above.

FIG. 5(a) is a perspective view illustrating the measurement head MH, the holder HD and the turntable unit RT, with the holder HD being folded so as to surround four faces of the measurement head MH comprised of the front and rear faces and the upper and lower faces, that is to say, with the holder AD being in a retracted position. The holder HD, when in the retracted position, takes an exterior shape generally in the form of a rectangular solid.

FIG. 5(b) is a perspective view illustrating how the holder 4D and the turntable unit RT are inserted into and accommodated in the outer case OC with the holder HD being in the retracted position. In the present embodiment, the measurement head MH, the holder HD and the turntable unit RT are inserted into the outer case OC after the measurement head MH is tilted laterally 90 degrees.

This 3-D input device 10 operates in accordance with a user-selected one of the plurality of different operational-modes. These modes include the SLOW mode, the FAST mode and the OFF mode.

The SLOW mode is a slow-speed image-capture mode in which the 3-D input device 10 captures an image of the subject S at a slow speed and with high accuracy, that is to say, an image-capture-accuracy-preferred mode.

The FAST mode is a fast-speed image-capture mode in which the 3-D input device 10 captures an image of the subject S at a fast speed and with low accuracy, that is to say, an image-capture-time-preferred mode.

The OFF mode is selected for the user to deactivate the operation of the 3-D input device 10.

The image-capturing section 14 is configured to photograph the subject S, and to read out from at least one resultant photograph of the subject S, a selected one of a pixel-decimated image obtained by decimating a plurality of pixels composing a full image of the subject S, and a non-pixel-decimated image obtained without decimating the plurality of pixels.

The image-capturing section 14 is further configured such that, upon completion of photographing of the subject S, the pixel-decimated image can be read out from at least one resultant photograph of the subject S within a time shorter than that required for reading out the non-pixel-decimated image.

In the applications of a photographing technique using a CCD (Charge Coupled Device), there are known an additive method and a selective method both of which are for use in reading out the pixel-decimated image from at least one resultant photograph of the subject S.

When the image decimation is performed in the additive method, a sum is calculated of detected illuminance values of target pixels belonging to each of pixel groups, which are obtained by grouping whole pixel composing a full image of the subject S, and, using the average of the calculated sum, a modification is made to the detected illuminance values of the target pixels belonging to each pixel group, for the target pixels to be assigned evenly distributed illuminance values over per each pixel group.

On the other hand, when the image decimation is performed in the selective method, one of target pixels belonging to each pixel group is selected as a representative pixel per each pixel group, and, using a detected illuminance value of the representative pixel, a modification is made to detected illuminance values of the target pixels belonging to each pixel group, for the target pixels to be assigned evenly distributed illuminance values over per each pixel group.

In the present embodiment, the image-capturing section 14 is designed to read out a pixel-decimated image from at least one resultant photograph of the subject S in a previously-selected one of the additive method and the selective method.

There are a pixel-decimated-image processing mode, in which the pixel-decimated image is read out from at least one resultant photograph of the subject S, and which is suitable for the high-speed image-capture mode which allows the subject S to be photographed at a fast speed and with low accuracy, and a non-pixel-decimated-image processing mode, in which the non-pixel-decimated image is read out from at least one resultant photograph of the subject S, and which is suitable for the slow-speed image-capture mode which allows the subject S to be photographed at a slow speed and with high accuracy.

In the present embodiment, the pixel-decimated-image processing mode is established upon a user selection of the FAST mode, while the non-pixel-decimated-image processing mode is established upon a user selection of the SLOW mode.

Figure 7:
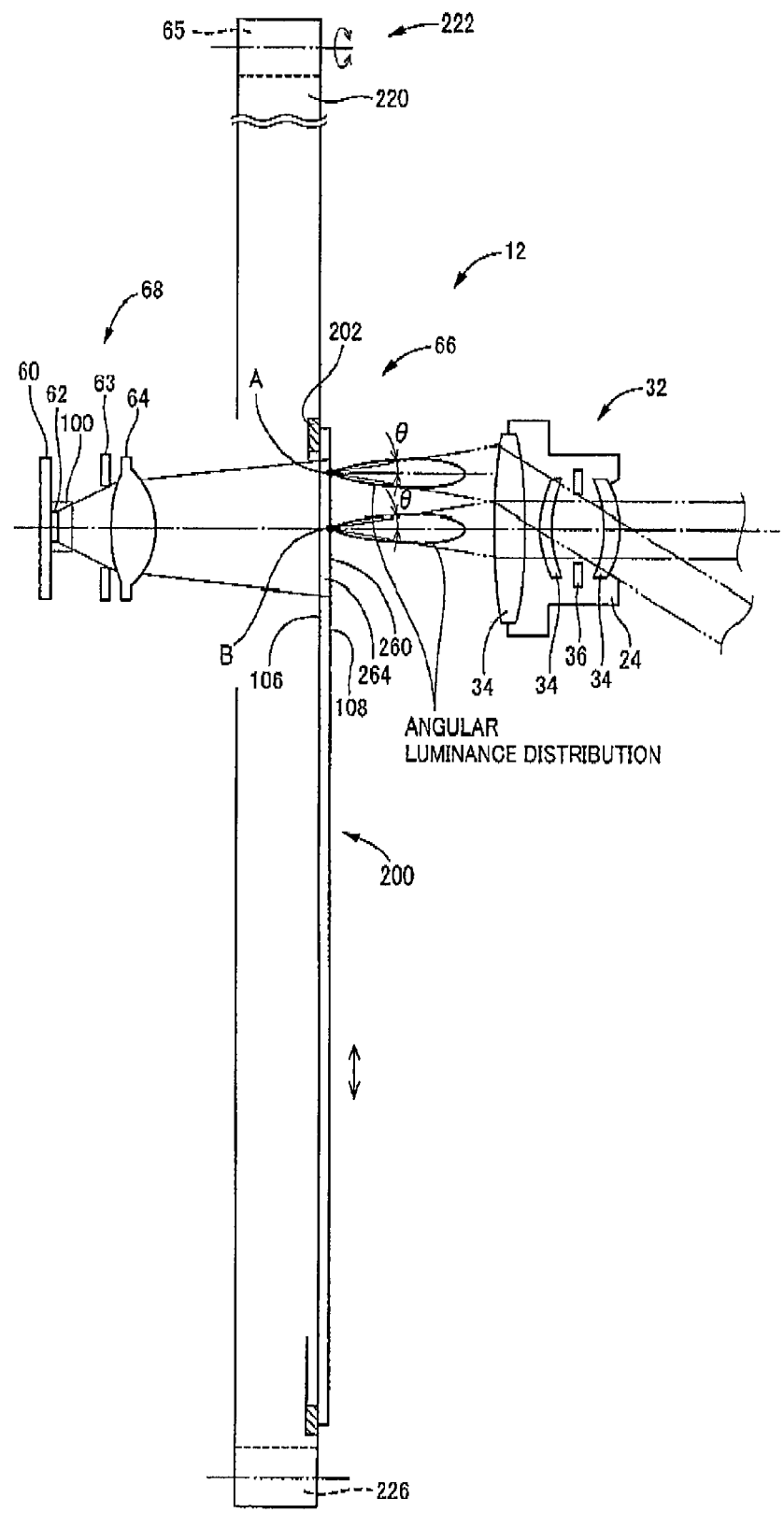
FIG. 7 is a plan view illustrating a projecting section 12 depicted in FIG. 1, in enlargement.

The projecting section 12 is a unit for projecting the patterned light onto the subject S. As illustrated in FIGS. 6 and 7, the projecting section 12 includes therein: a substrate 60; an LED (Light Emitting Diode) unit 62 (e.g., a high-luminance/high-heat-radiation LED in the form of a single LED element which is fixed to a metal substrate and which emits light from a relatively large emission surface); an illumination aperture stop 63; a light-source lens 64; a projection mechanism 66 for feeding plate-shaped modulating optics 200 using a feed motor (e.g., a pulse motor) 65 as a drive source; and the projection optical system 32, all of which are disposed in series along a projection direction.

Figure 8:
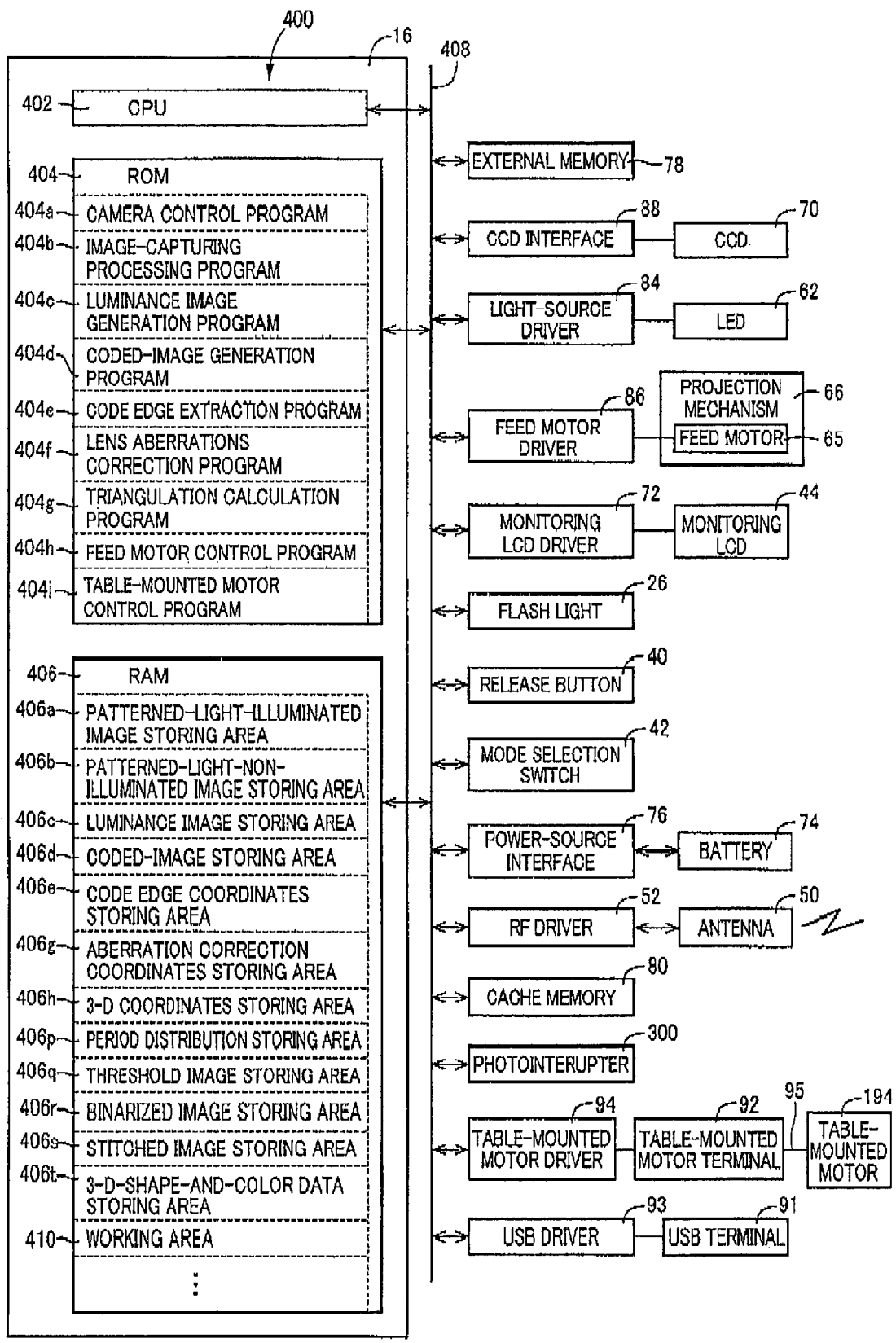
FIG. 8 is a block diagram conceptually illustrating the electrical configuration of the 3-D input device 10 depicted in FIG. 1.

FIG. 7 illustrates in greater detail the substrate 60, the LED unit 62, the illumination aperture stop 63, the light-source lens 64, the modulating optics 200, and the projection optical system 32, which are parts of the hardware configuration of the projecting section 12. FIG. 8 illustrates in greater detail the software and electrical configurations of the entire 3-D input device 10 including the projecting section 12.

Figure 9:
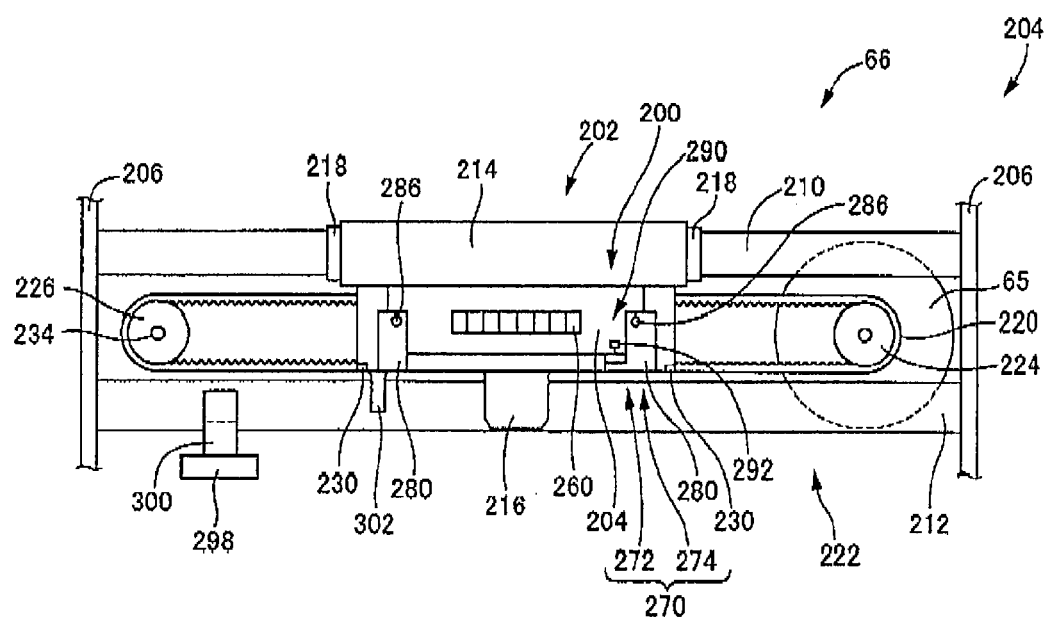
FIG. 9 is a front view illustrating a projection mechanism 66 depicted in FIG. 6.
Figure 10:
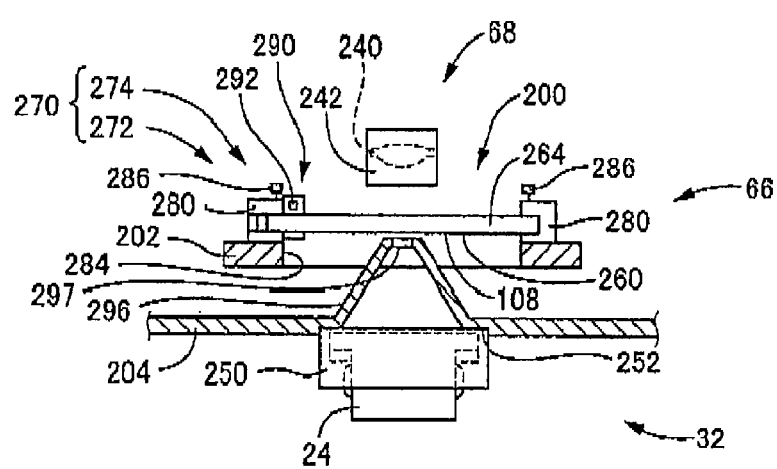
FIG. 10 is a partially sectional plan view illustrating a relevant portion of the projection mechanism 66 depicted in FIG. 9.
Figure 11:
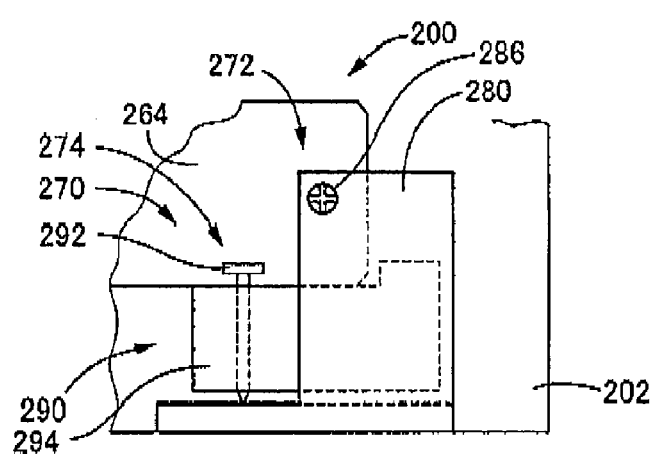
FIG. 11 is a front view in-part illustrating an angular-position adjustment mechanism 270 depicted in FIG. 9, in enlargement.
Figure 12:
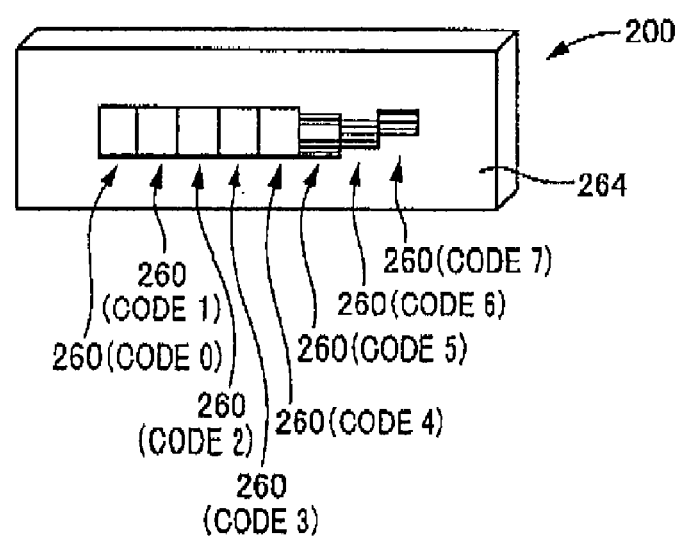
FIG. 12 is a perspective view illustrating modulating optics 200 depicted in FIG. 9, in enlargement.
Figure 13:
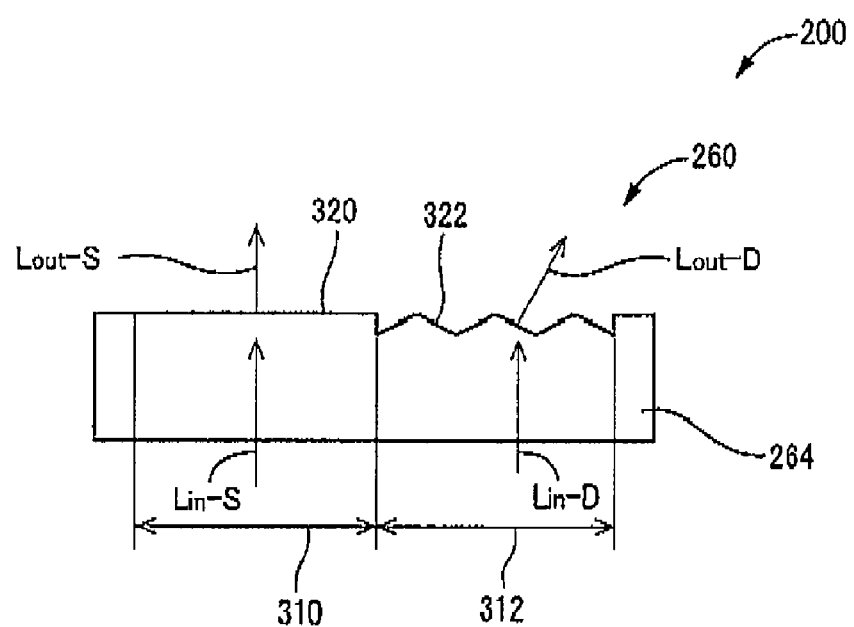
FIG. 13 is a sectional view illustrating a pair of a portion 310 allowing light to travel straight and a light deflecting portion 312, both depicted in FIG. 12, in further enlargement.
Figure 14:
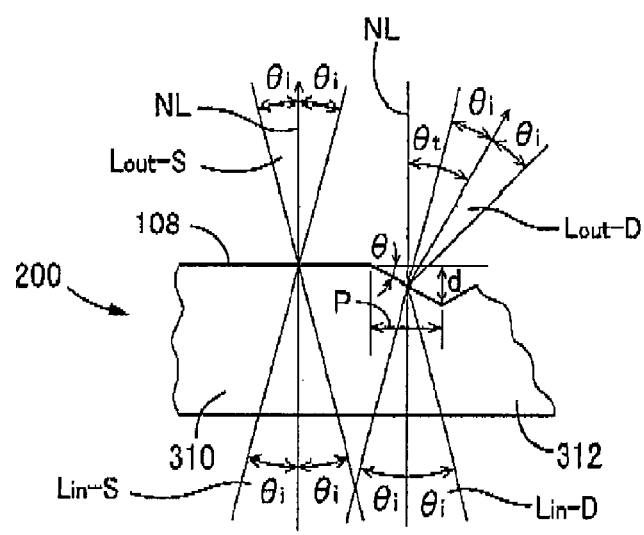
FIG. 14 is a sectional view for theoretical explanation of how the portion 310 allowing light to travel straight and the light deflecting portion 312, both depicted in FIG. 13, deflect light beams, respectively.

FIGS. 9-11 illustrate in greater detail the projection mechanism 66 which is a part of the hardware configuration of the projecting section 12, while FIGS. 12-14 illustrate the modulating optics 200 in enlargement.

The image-capturing section 14 is a unit for capturing an image of the subject S. As illustrated in FIG. 6, this image-capturing section 14 includes therein the image-capture optical system 30 and a CCD (Charge Coupled Device) 70 which are disposed in series in travel direction of incoming light representative of a real image of the subject S. The CCD 70 is configured to perform progressive scan using an interline transfer technology.

As illustrated in FIG. 6, the image-capture optical system 30 is constructed with a series of lenses. In operation, this image-capture optical system 30 adjusts the focal length, the aperture stop of the lenses, and the shutter open time automatically, using well-known features of auto-focus and auto-exposure, resulting in the imaging of the externally incoming light on the CCD 70.

The CCD 70 is configured with a matrix array of photoelectric elements such as photodiode elements. In operation, this CCD 70 generates pixel-by-pixel signals indicative of an image focused onto the surface of this CCD 70 via the image-capture optical system 30, wherein the signals are indicative of colors and intensities of light forming the focused image. The generated signals, after conversion into digital data, are outputted to the processing section 16.

As illustrated in FIG. 8 in a block diagram, the processing section 16 is connected electrically to the flash light 26, the release button 40 and the mode selection switch 42, respectively. This processing section 16 is further connected electrically to the monitoring LCD 44 via a monitoring LCD driver 72, to the antenna 50 via the RF driver 52, and to a battery 74 via a power-source interface 76, respectively. The above-listed connected-components beginning with the flash light 26 are controlled by the processing section 16.

The processing section 16 is additionally connected electrically to an external memory 78 and a cache memory 80, respectively. This processing section 16 is still additionally connected electrically to the LED unit 62 via a light-source driver 84, to the feed motor 65 of the projection mechanism 66 via a feed motor driver 86, and to the CCD 70 via a CCD interface 88, respectively. The above-listed connected-components beginning with the LED unit 62 are controlled by the processing section 16.

The external memory 78 is in the form of a removal flash-ROM which can store images captured in a stereoscopic-image mode, and 3-D information (including the above-described 3-D-shape-and-color data and its associated information). The external memory 78 may be prepared as a marketed device such as a SD card (registered trademark) or a Compact Flash (registered trademark) card.

The cache memory 80 is a memory device enabling high-speed read and write of data. In an exemplary application, the cache memory 80 is used for transferring images captured in the digital-camera mode to the cache memory 80 at a high speed, and storing the transferred images in the external memory 78, after implementing desired image-processing at the processing section 16. The cache memory 80 may be prepared as a conventional memory device such as a SDRAM or a DDRRAM.

The power-source interface 76, the light-source driver 84, the feed motor driver 86 and the CCD interface 88 are constructed as ICs (Integrated Circuits) which control the battery 74, the LED unit 62, the feed motor 65 of the projection mechanism 66, and the CCD 70.

As illustrated in FIG. 2(a), the measurement head MH is provided with an AC adapter terminal 90, a USB terminal 91 and a table-mounted motor terminal 92. As illustrated also in FIG. 6, the AC adapter terminal 90 is connected electrically to the battery 74, to thereby allow the 3-D input device 10 to use an external power source for supplying alternating current as a power source.

As illustrated in FIG. 6, the USB terminal 91 is connected to the processing section 16 via a USE driver 93. As illustrated in FIG. 6, the table-mounted motor terminal 92 is connected to the processing section 16 via a table motor driver 94.

As illustrated in FIG. 1, there is an electric line in the form of a harness 95 extending out from the table-mounted motor 194 of the turntable unit RT. The harness 95 passes through the second intervening base 136, the first intervening base 134 and the head base 130 in the description order, and, as illustrated in FIG. 2(a), the harness 95 has an L-shaped plug 96 connected to the leading edge of the harness 95 for connection with the table-mounted motor terminal 92.

The harness 95 acts as an electric line which allows a control signal and electric power to be supplied from the measurement head MH to the table-mounted motor 194. Accordingly, as illustrated in FIG. 8, the table-mounted motor 194 is brought into electrical connection with the processing section 16 via the table-mounted motor driver 94.

As illustrated in FIG. 1, a position of the harness 95 at which the harness 95 passes through the second intervening base 136 is defined by a harness clip 97, and a position of the harness 95 at which the harness 95 passes through the first intervening base 134 is defined by two harness clips 98 and 98.

It is added that the measurement head MH and the table-mounted motor 194 may be electrically connected to each other via alternative versions of electrical wirings, one of which allows the harness 95 to be buried in each base 130, 132, 134, 136.

As described above, the projecting section 12, as illustrated in FIG. 7, includes therein the substrate 60, the LED unit 62, the illumination aperture stop 63, the light-source lens 64, the projection mechanism 66 and the projection optical system 32, all of which are disposed in series in a projection direction of the patterned light. The substrate 60, the LED unit 62, the illumination aperture stop 63 and the light-source lens 64 together constitute the light source 68.

The substrate 60, owing to the attachment to the LED unit 62, provides electrical wirings between the substrate 60 and the LED unit 62.

The substrate 60 may be fabricated using, for example, an aluminum-made substrate to which an insulating synthetic resin is applied and thereafter a conductive pattern is formed by electroless plating, or a single- or multi-layered substrate having a core in the form of a glass-epoxy base material.

The LED unit 62 is a light source which emits umber-colored radiant light from a large area toward the projection mechanism 66, and which is accommodated in an LED casing 100 having an outer surface made of transparent resin.

As illustrated in FIG. 7, the illumination aperture stop 63 is provided for occluding an undesired portion of light emitted from the LED unit 62, to thereby direct only a desired portion of the light to the light-source lens 64. The light-source lens 64 is a lens which acts to converge radiant light emitted from the LED unit 62, and which is made up of optical plastics typified by acrylic plastics.

In the present embodiment, as illustrated in FIG. 7, the radiant light emitted from the LED unit 62 is efficiently converged or collected by the light-source lens 64. Then, the light emitted from the LED unit 62 enters a light-entrance surface 106 of the projection mechanism 66 such that an incident angle to the light-entrance surface 106 defines a predetermined cone angle, and such that an axis of the cone is generally at a right angle relative to the light-entrance surface 106. The light eventually goes out from a light-emitting surface 108 of the projection mechanism 66, in the form of radiant light with enhanced directivity.

In this regard, the light-source lens 64 acts as a collimator lens. FIG. 7 is a graph showing the angular illumination distribution (therein, "θ" means a half spread-angle at half maximum), for explanation of the directivity of light beam emitted from the light-emitting surface 108 at two selected points A and B spaced apart from each other on the light-emitting surface 108.

The projection optical system 32 includes a plurality of projection lenses 34 for directing or projecting incoming light from the projection mechanism 66, toward the subject S to be imaged. The plurality of projection lenses 34 are of a telecentric lens configuration having combining glass lens(es) and optical plastic lens(es).

Now, the term "telecentric" will be explained by way of example of a telecentric characteristic on the light entrance side as described above. The term "telecentric" is used to mean a configuration in which the principal rays passing through the projection optical system 32 are in parallel to the optical axis on the light entrance side, and in which the entrance pupil is at infinity.

As illustrated above, the projection optical system 32 has telecentricity defined by an entrance numerical aperture (NA) on the order of 0.1. An available optical path in the projection optical system 32, accordingly, is limited so as to allow light, only in the presence of an incident angle (acceptance angle θNA) within ±5 degrees from normal, which angle is given by an entrance numerical aperture (NA), to pass through an internal aperture stop 36 within the projection optical system 32

Therefore, in the present embodiment, the telecentric configuration of the projection optical system 32 allows easy improvement of the quality of projected images, in cooperation with an additional configuration which allows light passing through the projection mechanism 66, only in the presence of an incident angle of ±5 degrees from normal, to be projected onto an object using the projection optical system 32.

Describing the reasons why the above settings have been employed, it is more advantageous to limit which ones of angular components of light emitted from a light reception element for projection (although the modulating optics 200 is contemplated in the present embodiment, a slide or a transmissive liquid crystal is contemplated in general applications) to be ultimately used for imaging, when designing major optical system properties, such as resolution, spectrum, illumination distribution, or contrast.

Then, the projection mechanism 66 as a hardware constituent of the projecting section 12 will be described in more detail by referring to FIGS. 9-11.

This projection mechanism 66 is provided for transforming the incoming light emitted from the light source 68, into a successively-selected one of a plurality of various light patterns, to thereby change which one of the various light patterns to be projected onto the subject S, and project those various light patterns onto the subject S, in succession.

FIG. 9 is a front view illustrating this projection mechanism 66 (as viewed along an optical axis of the projection optical system 32, from the side of the projection optical system 32).

As illustrated in FIG. 9, this projection mechanism 66 is configured to include the modulating optics 200, which extends lengthwise in a plate-like shape, and which is positioned perpendicularly to an optical axis of the projection lens 34, to thereby transforming light incoming from the light source 68, into a successively-selected one of the plurality of various light patterns, for eventually change which one of the light patterns to be projected onto the subject S.

This projection mechanism 66, in configuration, includes a carriage 202 which is linearly and reciprocally moved by the feed motor 65. To the carriage 202, the modulating optics 200 is mounted so as to be adjustable in rotation angle, with the modulating optics 200 being confined in a plane parallel to a plane of the modulating optics 200. This projection mechanism 66, in operation, moves the modulating optics 200 lengthwise because of reciprocal rotation of the feed motor 65.

More specifically, as illustrated in FIG. 9, the projection mechanism 66 includes a housing 204 (acting also as the housing for the measurement head MH). To this housing 204, there is attached the feed motor 65. Between two opposing support portions 206 and 206 of the housing 204, there are disposed a primary guide 210 and a secondary guide 212 so as to be spaced radially apart from each other while extending parallel to each other.

The primary and secondary guides 210 and 212 are fixedly attached at their both ends to the two support portions 206 and 206, respectively.

The primary and secondary guides 210 and 212 are both formed so as to extend straight in a constant circular cross-section. The primary and secondary guides 210 and 212 are both made of material such as stainless-steel, and have the respective outer profiles which have been machined so precisely as to achieve, for example, a cylindricity tolerance on the order of 3 μm. The primary and secondary guides 210 and 212 each act as a feed guide which extends straight across light incoming from the LED unit 62 (not shown) disposed behind the modulating optics 200.

The primary and secondary guides 210 and 212 are adapted to guide the carriage 202 movably linearly and reciprocally. For achieving the guiding, the carriage 202 is configured to include, as illustrated in FIG. 9, an engagement portion 214 and a slider 216 which are spaced apart from each other in a direction perpendicular to a moving direction of the carriage 202.

For the carriage 202, the engagement portion 214 is supported by the primary guide 210, slidably about an axis of the primary guide 210. More specifically, for example, to the engagement portion 214, there is fixed slide bearings (made of oil-impregnated porous metal enabling slide movement relative to the primary guide 210, using an intervening liquid layer) 218 and 218, and the primary guide 210 is slidably fitted into the slide bearings 218 and 218 using an intervening lubricant (e.g., a grease, etc.) therebetween.

The primary guide 210 and the slide bearings 218 and 218 are manufactured with their shape accuracies being managed such that the fitting clearance between the primary guide 210 and the slide bearings 218 and 218 does not exceed 12 μm.

The above-described configuration allows the modulating optics 200 to be provided such that an actual clearance size between the primary guide 210 and the slide bearings 218 and 218 does not result in the misalignment or positional deviation of the modulating optics 200 exceeding 12 μm. As a result, light patterns can be projected onto the subject S so accurately that the positional deviation, if any, of the projected light-patterns from the desired positions is eliminated or reduced.

Assuming that the projection optical system 34 has a magnification of 40-fold, the positional deviation of the light patterns on the subject S would not exceed 0.48 mm, unless the positional deviation of the modulating optics 200 exceeds 12 μm. Thus, in the present embodiment, the linear motion mechanism with a smaller amount of play and high accuracy, and the modulating optics 200 acting as a moving body, are suitably combined to allow for easier improvement of the accuracy of 3-D input or reading of the subject S.

On the other hand, for the carriage 202, the slider 216 is caused to slide axially along and in contact with an outer surface of the secondary guide 212. The slider 216 is slidably pressed onto the outer surface of the secondary guide 212 via an intervening lubricant (i.e., a grease, etc.) therebetween. The pressing is achieved by a pre-tension applied to a feed belt 220 as will be described later on.

In the present embodiment, the carriage 202, although fitted with the primary guide 210 slidably and rotatably in opposite angular-directions around the primary guide 210, is physically inhibited from rotation in a selected one of the opposite angular-directions, owing to selective abutment between the slider 216 and the secondary guide 212.

On the other hand, the modulating optics 200, although will be described in more detail later on, includes a plurality of planar optical elements 260 (see FIG. 12) corresponding to the plurality of various light-patterns which are to be successively selectively achieved, respectively. The plurality of planar optical elements 260 corresponding to the respective various light-patterns are arrayed in series on the same plane.

In the present embodiment, the carriage 202 is disposed in the projection mechanism 66 such that a direction along which the incoming light emitted from the light source 68 advances to enter the plurality or planar optical elements 260 becomes substantially perpendicular with respect to the plurality of planar optical elements 260 with the carriage 202 being in contact with the secondary guide 212.

It is added that, although in the present embodiment, the primary and secondary guides 210 and 212 are each configured as a rod with a cylindrical outer circumferential surface, the secondary guide 212, at least, is not essential to employ such configuration. For example, the secondary guide 212 may be configured so as to have a flat portion extending in parallel to its axis, to thereby allow the slider 216 to be received two-dimensionally by the flat portion.

As illustrated in FIG. 9, the projection mechanism 66 further includes a drive mechanism 222 adapted to drive the carriage 202 along the primary and secondary guides 210 and 212. The drive mechanism 222 includes the feed motor 65, and the feed belt 220 (i.e., an exemplary force-transmission element defining a closed or endless curved line).

As illustrated in FIG. 9, the feed belt 220 is disposed in an elongated space left between the primary and secondary guides 210 and 212. In that space, a driving gear (i.e., an exemplary driving rotary-body) 224 and a driven gear (i.e., an exemplary driven rotary-body) 226 are spaced apart from each other in a moving direction of the carriage 202.

The feed belt 220 is wound around the driving gear 224 and the driven gear 226. The feed belt 220 has an infer circumferential surface on which a plurality of teeth are formed which are meshed with a plurality of teeth formed on an outer circumferential surface of the driving gear 224, and a plurality of teeth formed on an outer circumferential surface of the driven gear 226.

As a result of the feed belt 220 being wound around the driving and driven gears 224 and 226, two straight portions are formed at the feed belt 220, to one of which the carriage 202 is fixed.

More specifically, the feed belt 220 is fixed at one end to one of two coupling portions 230 and 230 of the carriage 202 which are spaced apart from each other in a moving direction of the carriage 202, while the feed belt 220 is fixed at the other end to the remaining one of the two coupling portions 230 and 230.

The driving gear 224 is driven by the feed motor 65, to thereby achieve reciprocal linear movement of the feed belt 220. On the other hand, the driven gear 226 is rotatably supported by a support shaft 234 fixed to the housing 204.

FIG. 10 illustrates the modulating optics 200 and the carriage 202 of the projection mechanism 66 together with the light source 68 and the projection optical system 32 in a top view, that is to say, as viewed in a direction perpendicular to a common optical axis to the light source 68 and the projection optical system 32.

As illustrated in FIG. 10, the light source 68 is configured such that a collimator lens 240 is held by a collimator lens barrel 242. The collimator lens 240 is configured to include the illumination aperture stop 63 and the light-source lens 64, both illustrated in FIG. 6.

As illustrated in FIG. 10, the projection optical system 32 is configured by threading the lens barrel 24 into the lens barrel holder 250. In the lens barrel 24, the plurality of projection lenses 34 and the aperture stop 36 are arranged, as illustrated in FIG. 6. The lens barrel holder 250 is attached to the housing 204 with the lens barrel holder 250 being threaded into a recess 252 formed in the housing 204 and located in position.

As illustrated in FIGS. 9 and 10, the modulating optics 200 is formed such that the plurality of planar optical elements 260 are in a planar and serial array on a substrate 264.

Now, a production process of the modulating optics 200 will be described. An imprint process is performed by pressing onto the surface (which constitutes the light-emitting surface 108) of the substrate 264, a metal mold (not shown) having a pre-formed precise inverse impression (inverse shape) to the target shape of the plurality of planar optical elements 260, to thereby precisely imprint the impression of the metal mold onto the surface of the substrate 264. As a result of this imprinting, the plurality of planar optical elements 260 are formed on the substrate 264. Those planar optical elements 260 will be described with respect to shape or profile, how to optically act and how to fabricate, in more detail later on.

As illustrated in FIGS. 3-11, the projection mechanism 66 further includes a angular-position adjustment mechanism 270 for use in adjusting an angular position (i.e., a tilt angle in a plane parallel to the modulating optics 200) of the modulating optics 200 in a plane (i.e., a move flat plane along which the modulating optics 200 is moved) parallel to the modulating optics 200.

The angular-position adjustment mechanism 270 is configured to include a support mechanism 272 adapted to cause the carriage 202 to rotatably support the substrate 264, with the substrate 264 being confined in the aforementioned move flat plane, and a rotation mechanism 274 adapted to rotate the substrate 264 relative to the carriage 202, with the substrate 264 being confined in the aforementioned move flat plane. In the present embodiment, the substrate 264 of the modulating optics 200 acts as a linearly movable member which supports the plurality of planar optical elements 260.

As illustrated in FIGS. 9 and 10, the support mechanism 272 includes a pair of holders 280 and 280 for holding the substrate 264 at its opposite side positions spaced apart from each other in a moving direction of the substrate 264, respectively. FIG. 11 representatively illustrates in a front view only one of the holders 280 and 280 which is located on the right-hand side of FIG. 9, together with its peripheral elements, in enlargement.

As illustrated in FIG. 10, each holder 280 holds a corresponding portion of the substrate 264 at its opposite sides as viewed in a thickness direction of the substrate 264, while leaving a slight clearance between the holder 280 and the substrate 264. The modulating optics 200, although located behind the carriage 202 using the pair of holders 280 and 280, emits light into the projection mechanism 32 via a through hole 284 formed through the carriage 202.

The substrate 264, although allowed for relative movement (including relative rotational movement) in each holder 280, with the substrate 264 being confined in a plane parallel to the substrate 264, is physically fixed in position, once a fixture in the form of a fixing screw 286 has been threaded toward the substrate 264.

As illustrated in FIG. 11, the rotation mechanism 274 is configured to include an adjuster 290 as a principle component. The adjuster 290 is configured to include an adjusting screw 292, and a main-body portion 294 into which the adjusting screw 292 is threaded. The adjusting screw 292 is in the form of a male screw to be threaded into a female screw formed in the main-body portion 294. The adjusting screw 292 has a centerline of rotation which is parallel to the aforementioned moving flat plane.

As illustrated in FIG. 11, the main-body portion 294 is fixed to the substrate 264. The adjusting screw 292 partially protrudes at its top end from the main-body portion 294, and the protrusion is engaged with the carriage 202.

The adjusting screw 292 is manually rotated by an operator's action onto a head of the adjusting screw 292. Depending on an amount of operator's action for rotation, the protrusion of the adjusting screw 292 from the main-body portion 294 varies in length, and therefore, a distance between the main-body portion 294 and the carriage 202 varies in a plane parallel to the modulating optics 200.

Therefore, the adjuster 290 enables fine adjustment of an angular position, that is to say, an in-plane rotation angle of the modulating optics 200, so as to reflect an amount of operator's action. A maximum amount of the fine adjustment is set so as to fall within a tolerance of parallelism on the order of 12 μm with respect to a straight line along which a linear motion device (i.e., the carriage 202) is moved, for example. This results in easier improvement of the accuracy of 3-D input or reading of the subject S.

It is added that, although not illustrated, the fixing screw 286 and the adjusting screw 292 are each prevented from unexpected looseness, by application of an adhesive (for fixing screws) to areas between the fixing screw 286 and the adjusting screw 292, and portions into which the fixing screw 286 and the adjusting screw 292 are to be threaded.

As illustrated in FIG. 10, the housing 204 locally protrudes behind the projection optical system 32, toward the carriage 202. More specifically, the housing 204 includes, behind the projection optical system 32, a directing section 296 which extends through the carriage 202 up to the vicinity of the light-emitting surface 108 of the modulating optics 200. This directing section 296 is light occlusive, and is of a thin pyramid-like shape.

The directing section 296 includes at its tip end a window section 297, and, through the window section 297, the directing section 296 optically communicates with only a selected one of the plurality of planar optical elements 260. The directing section 296 and the window section 297 are integrally formed together with the housing 204, using material typified by glass fiber reinforced polycarbonate achieving high molding accuracy.

Only a light pattern which has been emitted from a selected one of the planar optical elements 260 enters a space inside the directing section 296 through the light transmissive window section 297. Then, the entering light pattern enters the projection optical system 32 without leak to outside the directing section 296. The directing section 296 prevents disturbance light from being introduced from the outside to the inside of the directing section 296 and then reaching the projection optical system 32.

As illustrated in FIG. 9, a positioning post 298 is fixed to the housing 204, and a photointerupter 300 acting as a position sensor is attached to the positioning post 298. The photointerupter 300 optically detects a position detecting claw (i.e., an element to be detected) 302 which makes an integral movement with the carriage 202, to thereby detect that the carriage 202 has been placed in a specific position.

As illustrated in FIG. 8, the photointerupter 300 is electrically coupled to the processing portion 16. The photointerupter 300 is adapted to output to the processing portion 16 a PI signal which is designed to vary in a manner that the PI signal is low in level, if, in the absence of the position detecting claw 302 from the photointerupter 300, light is allowed to enter the photointerupter 300, and that the PI signal is high in level, if, in the presence of the position detecting claw 302 in the photointerupter 300, light is not allowed to enter the photointerrupter 300.

Then, the modulating optics 200 will be described in more detail by referring to FIGS. 12-14.

FIG. 12 is a front view illustrating the modulating optics 200 in enlargement. In the modulating optics 200, the plurality of planar optical elements 260, which correspond to the aforementioned plurality of various light patterns, respectively, are formed in a planar and linear array in a longitudinal direction of the modulating optics 200. The plurality of planar optical elements 260 are selectively positioned in direct front of the window section 297 illustrated in FIG. 10.

In the present embodiment, for capturing the subject S, eight various light patterns are projected onto the subject S, in succession. Those eight various light patterns are eight various light patterns to be projected onto the subject S during image-capturing of the subject S for measuring the 3-D shape of the subject S using a space-encoding technique which will be described later on.

For performing the projection, the modulating optics 200 includes, as illustrated in FIG. 12, eight planar optical elements 260 corresponding to the eight various light patterns, respectively. In FIG. 12, pattern numbers "PN0" to "PN7" of the eight planar optical elements are denoted as "Code 0" to "Code 7," respectively.

The modulating optics 200 is a plate-shaped molded product made of transparent material which allows for easier formation or molding. Examples of such transparent material include: polymethylmethacrylate (PMMA), as acrylic-based optical plastics which is the most typically used; amorphous polyolefine, as optical plastics which is restrained from expanding due to moisture absorption; low melting point glass for molding which is suitable for molding; etc.

The modulating optics 200 is fabricated by the same process as a conventional lens-molding process (e.g., an optical plastic lens molding process). The process is performed using a metal mold which is shaped to the inverse of a target surface shape of the modulating optics 200 (i.e., the eight planar optical elements 260), using a precise machining technique.

Once, using the thus-machined metal mold, a mass-production-type molding process, such as injection molding or casting molding has been applied to the material which has been selected and prepared in the manner described above, a fine pattern having alternating raised and recessed portions is imprinted onto the surface of the substrate 264 made of the material mentioned above. This technique is referred, in view of its typical ability of imprinting such a pattern with nanometer precision, to as a nanoimprint technique.

Therefore, the fabrication of the modulating optics 200 using such a high-precision imprint process allows for the improvement of the accuracy of the surface shape of the resulting modulating optics 200, and therefore, the improvement of the accuracy of 3-D input or reading by the 3-D input device 10.

Further, this process, because of its high suitability for mass production of the modulating optics 200, is distinguishably advantageous in that the shape accuracy of the modulating optics 200 can be maximized and fabrication cost of the modulating optics 200 can be minimized.

Next, the modulating optics 200 will be described with respect to its shape and optical actions, with special reference to one of the planar optical elements 260.

First, described schematically, the modulating optics 200 receives light emitted from the light source 68, as incoming light, and emits the light, after spatially-periodical and angular modulation, as outgoing light.

The modulating optics 200, which is disposed to extend across the path of the aforementioned incoming light, operates, upon reception of the incoming light, to optically modulate, that is to say, periodically angularly modulate the incoming light, by relying on the surface shape of the modulating optics 200. In the present embodiment, the "modulation" means deflection.

In addition, as illustrated in FIG. 7, the lens barrel 24 (including the projection lens 34 and the aperture stop 36) of the projection optical system 32 allows selected ones of a plurality of angular components of light outgoing from the modulating optics 200 to pass through the lens barrel 24. The selected angular components each have a radiant angle characteristic that achieves a predetermined entrance numerical aperture (NA), that is to say, a predetermined acceptance angle ($\theta$NA).

Each light pattern is generated so as to have alternating bright and dark portions, as a result of projection. For forming this array, the modulating optics 200 includes two portions which are different in surface shape from each other. That is to say, in the present embodiment, as illustrated in FIG. 13 in a cross section, the modulating optics 200 is shaped to include at least one pair of a portion 310 for allowing light to travel straight and a light deflecting portion 312 which are alternately arrayed along the modulating optics 200.

From the portion 310 for allowing light to travel straight, ones of the angular components of the incoming light which each have a radiant angle characteristic that achieves the aforementioned entrance numeral aperture go out as a passed-through optical component which will pass through the projection optical system 32. Therefore, light which is emitted from the portion 310 for allowing light to travel straight and which is then passed through the projection optical system 32 generates each bright portion in each light pattern.

On other hand, from the light deflecting portion 312, ones of the angular components of the incoming light which each have a radiant angle characteristic that does not achieve the aforementioned entrance numerical aperture go out as a non-passed-through optical component which will not pass through the projection optical system 32.

Therefore, the presence of light which is emitted from the light deflecting portion 312 but which does not pass through the projection optical system 32 generates each dark portion in each light pattern. In this manner, a geometric pattern having bright and dark portions is generated in each light pattern to be projected onto the subject S.

In the present embodiment, the modulating optics 200 is of a light transmissive type which spatially-unselectively transmits the aforementioned incoming light through the modulating optics 200. That is to say, almost all of light incident on the modulating optics 200 is allowed to pass through the modulating optics 200, irrespective of its entrance position on the modulating optics 200.

As discussed above, the portion 310 for allowing light to travel straight and the light deflecting portion 312, which are alternately arrayed in the modulating optics 200, are identical to each other in that they are optical systems which transmit the aforementioned incoming light.

It is, however, that the portion 310 for allowing light to travel straight, as illustrated in FIG. 13, includes a partial light-emitting surface 320 which is perpendicular to the aforementioned incoming light, and which allows the aforementioned incoming light to go out without modulation, while the light deflecting portion 312 includes a partial light-emitting surface 322 which is in the form of a group of surfaces each inclined with respect to the aforementioned incoming light, and which allows the aforementioned incoming light to go out after modulation.

In FIG. 13, incident light on the portion 310 for allowing light to travel straight is denoted as "Lin-S," while outgoing light from the portion 310 for allowing light to travel straight along a path parallel to the incident light "Lin-S" is denoted as "Lout-S."

Further, incident light on the light deflection portion 312 is denoted as "Lin-D," while outgoing light from the light deflecting portion 312 and which has been deflected a predetermined angle from the incident light "Lin-D" is denoted as "Lout-D."

To summarizer the portion 310 for allowing light to travel straight does not achieve angular modulation (deflection) for modulating an angle at which light travels, while the light deflecting portion 312 achieves such angular modulation, meaning that the portion 310 for allowing light to travel straight and the light deflecting portion 312 are different from each other in terms of the presence/absence of angular modulation, that is to say, an angle at which light exits.

The surface shape of the light-emitting surface 108 of the modulating optics 200 will be described below in more detail. The partial light-emitting surface 320 of the portion 310 for allowing light to travel straight is in a planer shape, while the partial light-emitting surface 322 of the light deflecting portion 312 is in the form of a roof prism made of a group of inclined faces.

FIG. 14 is a cross section illustrating the surface shape of the light-emitting surface 108 of the modulating optics 200, in further enlargement. The optical deflection occurring in the modulating optics 200 as optical modulation will be described below in more detail by referring to FIG. 14.

Prior to the description, various notations are defined as follows:

θ: tilt angle of the roof prism,

θt: light deflection angle (angle at which outgoing light from the modulating optics 200 travels with respect to a normal "NL" to the light-emitting surface 108, that is to say, the path of incident light on the modulating optics 200), θi: half-angle of incidence, p: width of the roof prism, and d: depth of the roof prism.

It is added that the depth "d" is defined by the following expression:

$$d = p \cdot \tan \theta.$$

Therefore, in applications where the tilt angle "θ" is 5 degrees, and the width "p" is 0.036 mm, the depth "d" would be 3.15

When denoting the refractive index of the modulating optics 200 as "n," the light deflection angle "it" can be calculated according to the Snell's law, by the following expression:

$$n \cdot \sin \theta = \sin(\theta t - \theta).$$

In applications where the refractive index "n" is 1.49 and the tilt angle "θ" is 5 degrees, the light deflection angle "θt" would be 12.46 degrees. Assuming that the half-angle "θi" of the light incident on the modulation optics 200 is 5 degrees, the light which has been passed through the light deflecting portion 312 will go out from the modulating optics 200 as the outgoing light "Lout-D," at an angle not less than 7.46 degrees with respect to the normal "NL" to the light-emitting surface 108.

As discussed above, the lens barrel 24 of the projection optical system 32 is designed to have telecentricity defined by an entrance numerical aperture NA of 0.1, that is to say, a maximum acceptance angle θNA of 5 degrees, allowing light, only in the presence of an incident angle within ±5 degrees from the optical axis, to pass through the internal aperture stop 36.

Accordingly, the aforementioned outgoing light "Lout-D" generates an area (i.e., dark or non-illuminated area) which light does not reach, despite of the entrance of light into the projection optical system 32. The area is located on an image plane (e.g., the surface of the subject S) which has an optically conjugate relationship with a patterned surface of the modulating optics 200, that is to say, the light-emitting surface 108.

Therefore, this, in cooperation with an additional fact that all the light which has been passed through the portion 310 for allowing light to travel straight passes through the aperture stop 36, and is eventually projected onto an area (i.e., bright or illuminated area) which light reaches, on the aforementioned image plane. This enables the projection of light onto the image plane in a desired geometric pattern.

In an example illustrated in FIG. 14, the light deflecting portion 312 is structured by forming a roof prism on the surface of the substrate 264 so as to be in the form of a recessed portion located on the surface of the substrate 264, and so as to cause the roof prism to deflect light in unequal directions. The light deflecting portion 312, however, may employ alternative configurations.

Figure 15:
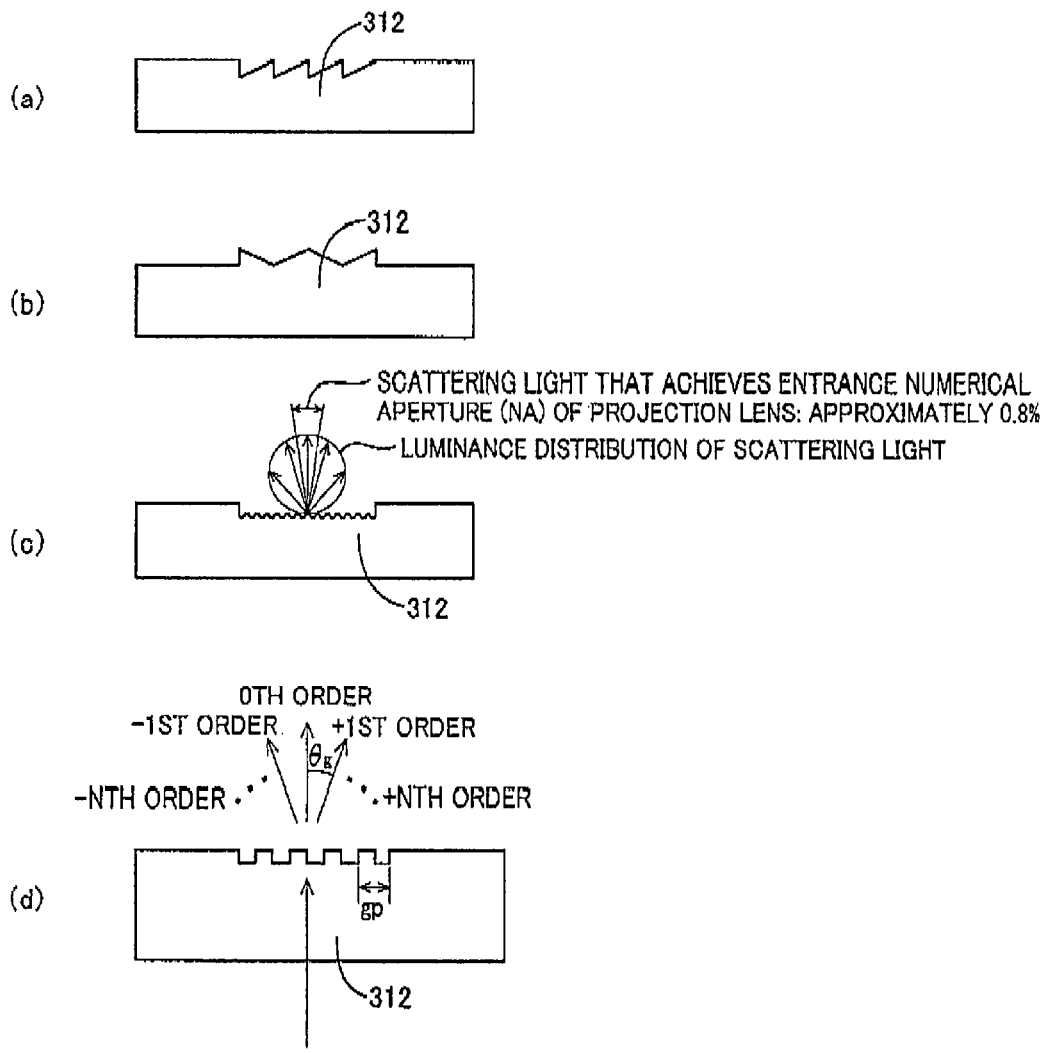
FIGS. 15(a)-15(d) are sectional views illustrating different modified versions of the light deflecting portion 312 depicted in FIG. 13, respectively.

For example, as illustrated in FIG. 15(a), the light deflecting portion 312 may be structured by forming a roof prism on the surface of the substrate 264 so as to be in the form of a recessed portion located on the surface of the substrate 264, and so as to cause the roof prism to deflect light in equal directions.

Further, as illustrated in FIG. 15(b), the light deflecting portion 312 may be structured by forming a roof prism on the surface of the substrate 264 so as to be in the form of a raised portion located on the surface of the substrate 264, and so as to cause the roof prism to deflect light in directions, irrespective of whether equal or unequal.

Still further, as illustrated in FIG. 15(c), the light deflecting portion 312 may be structured by imparting to the surface of the substrate 264 a surface shape (mechanically randomly scattering surface-shape) physically causing random scattering (e.g., texture often used in surface-shape treatment for molded products).

In an example, the mechanically randomly scattering surface-shape is formed on the surface of the substrate 264, by forming a random rough pattern on the surface of the substrate 264, using cutting and chemical treatment, in a manner that an Rz value indicating the surface roughness of the substrate 264 is on the order of 1 μm. In this example, light incident on the light deflecting portion 312 is deflected in random directions by the randomly scattering surface of the substrate 264.

When denoting the luminance distribution of scattering light outgoing from the randomly scattering surface as "I," and denoting a scattering angle of each angular component of the scattering light relative to light incoming into the light deflecting portion 312 as "C," the luminance distribution "I" is generally defined as a function of the scattering angle "θ." More specifically, the luminance distribution "I" can be defined by the following expression:

$$I(\theta) = A \cdot \cos^n \theta \, [cd],$$

where "A" is a constant and "n" is a scattering coefficient.

In an application where the scattering coefficient "n" for the randomly scattering surface of the light deflecting portion 312 is "1" (referred to as "Lambertian scattering properties"), if the numerical aperture of the projection optical system 32 is 0.1, then a light transmission rate of an optical system constructed by the light deflecting portion 312 and the projection optical system 32 will be approximately 0.8%.

Therefore, in this application, a desired geometrical light pattern can be projected onto the subject S with a sufficient contrast ratio of not less than 100:1 existing between outgoing light from the portion 310 for allowing light to travel straight and outgoing light from the light deflecting portion 312.

Even if the contrast ratio existing between outgoing light from the portion 310 for allowing light to travel straight and outgoing light from the light deflecting portion 312 is not adequately high, if, because each light pattern to be projected onto the subject S has its precise border shapes, an accurate detection of borders between bright and dark portions (also referred to as "stripe borders") of each light pattern is only made, then an accurate calculation can be made of coordinate values indicative of the 3-D shape of the subject S.

For accurately making a border-position determination to determine the position of each stripe border, there is preferably employed a threshold value "TH" which has been set in a manner discussed later to determine whether each part of an image captured per each light pattern is a bright portion or a dark portion, and which has been suitably set in view of luminance components of the captured image.

As illustrated in FIG. 15(d), the light deflecting portion 312 can be structured by defining a diffraction grating on the surface of the substrate 264. An example of the diffraction grating is a set of grooves of binary grating having no inclined surfaces.

When denoting the grating pitch as "gp," the wavelength of light incident on the light deflecting portion 312 as "λ," and the angle of diffraction of the diffraction grating as "θg," the relationship between the grating pitch "gp," the wavelength "λ," and the angle of diffraction "θg" is generally represented by the following expression:

$gp \cdot \sin \theta g = \lambda$.

The diffraction grating, upon reception of light, emits different n-th order diffracted beams (n=0, ±1, . . . ) in different directions defined by angles represented by "n·θg," respectively. Those different n-th order diffracted beams correspond to different light beams which are obtained by causing light incident on the diffraction grating to be deflected by different angles, respectively.

In an example where the wavelength "λ" is set to 617 nm, and the angle of diffraction "θg" is set to 12.5 degrees, the grating pitch "gp" is 2.85 µm. A set of grooves of binary grating arrayed in equal intervals coincident with the grating pitch gp of 2.85 µm, upon reception of light, emits different n-th order diffracted beams.

In the use of such a diffraction grating, only the grating pitch "gp" determines the angle of diffraction "θg" of each n-th order diffracted beam, and the shape (e.g., the shape of each of the raised and recessed portions adjacent to each other) of individual one-pitch portions of the diffraction grating determines power separation ratios in which the total power of light incident on the diffraction grating is separated into different n-th order diffracted beams, respectively.

Therefore, the aforementioned border-position determination can be made with high accuracy, if the grating pitch "gp" is set to a value for preventing, to the maximum extent, a zeroth-order diffracted beam or n-th order diffracted beams (|n|≧1) (i.e., higher order diffracted beams, which are also deflected beams relative to the incoming beam) from entering an entrance aperture of the projection optical system 32, and if the power Separation ratio of a power of a zeroth-order diffracted beam (i.e., a light beam traveling straight) to the total power of light incident on the diffraction grating is set to a value not exceeding 50% of the total (i.e., the ratio to the power of all the light incident on the light deflecting portion 312, which is 50%).

Similarly with the examples discussed above with reference to FIGS. 15(a) to 15(c), the above-described setting allows desired light patterns to be generated with high accuracy, resulting in the accurate entry of the 3-D information of the subject S.

In an example illustrated in FIG. 15(d), it is of course that the diffraction grating can be designed such that the power separation ratio in which the power of light incident on the diffraction grating is separated into a zeroth-order diffracted beam (i.e., a light beam traveling straight) is set to a value in the neighborhood of 0%.

This design would maximize the contrast ratio between outgoing light from the portion 310 for allowing light to travel straight and outgoing light from the light deflecting portion 312 (diffraction grating), and also maximize the contrast ratio between the bright and dark portions of each light pattern.

There is known a diffraction grating which uses inclined surfaces referred to as blazed surfaces, as an example of a diffraction grating which has a power separation ratio in the neighborhood of 0%. The power separation ratio is a ratio of a power of a zeroth-order diffracted beam to the total power of light incident on the diffraction grating.

Such a diffraction grating, which has a similar shape to that of the root prism illustrated in FIG. 15(a), can be fabricated by directly machining material into a target shape of the diffraction grating by a cutting process using diamond turning, or can be fabricated by machining material into the target shape of the diffraction grating, using a metal mold which has been previously manufactured to have the inverse of the target shape of the diffraction grating.

Referring next to FIG. 8, the electric configuration of the 3-D input device 10 is illustrated in a block diagram.

The processing section 16 is configured to include as a major component a computer 400 which is constructed to incorporate therein a CPU (Central Processing Unit) 402, a ROM (Read Only Memory) 404, a RAM (Random Access Memory) 406 and a bus 408.

The CPU 402 executes programs stored in the ROM 404 while using the RAM 406, thereby performing various sets of processing such as the detection of the status of the release button 40, the retrieval of image data from the CCD 70, the transfer and storage of the retrieved image-data, the detection of the status of the mode selection switch 42, etc.

The ROM 404 has stored therein a camera control program 404a, an image-capturing processing program 404b, a luminance image generation program 404c, a coded-image generation program 404d, a code edge extraction program 404e, a lens aberrations correction program 404f, a triangulation calculation program 404g, and a table-mounted motor Control program 404i.

Figure 16:
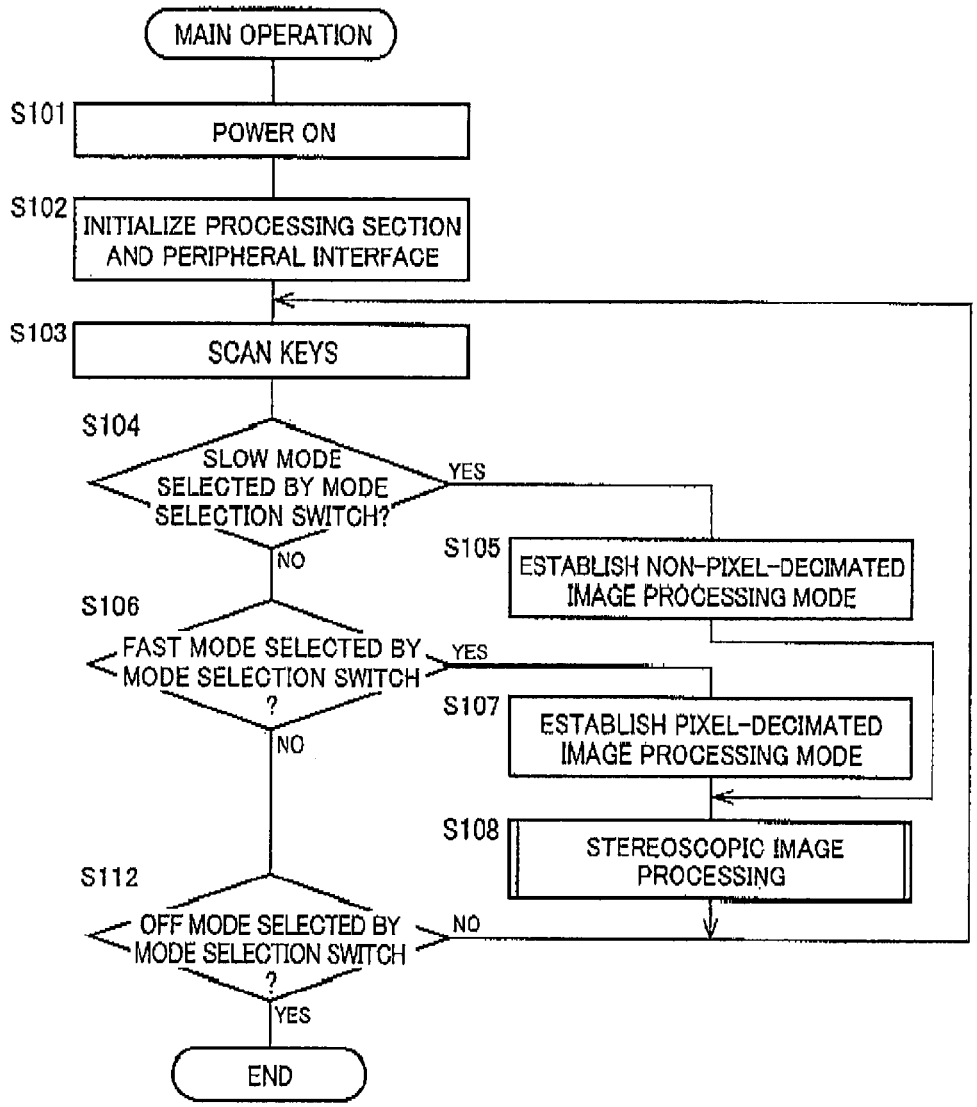
FIG. 16 is a flow chart conceptually illustrating a main operation implemented in a camera control program depicted in FIG. 8.

The camera control program 404a is executed to perform the total control of the 3-D input device 10, wherein the total control includes a main operation conceptually illustrated in a flow chart in FIG. 16.

The image-capturing processing program 404b is executed to photograph the subject S, with illumination by a light pattern (i.e., projection pattern), for detection of the 3-D shape of the subject S, thereby acquiring a corresponding patterned-light-illuminated image, and also photograph the same subject S, without illumination by a light pattern, thereby acquiring a corresponding patterned-light-non-illuminated image.

The luminance image generation program 404c is executed to generate a plurality of luminance images corresponding to a plurality of patterned-light-illuminated images, respectively, based on RGB values of individual pixels acquired for the same subject S by execution of the image-capturing processing program 404b.

In the present embodiment, a plurality of different light-patterns are successively projected onto the same subject S, and the subject S is imaged or digitally photographed each time each light pattern is projected onto the subject S, thereby acquiring the RGB values of individual pixels for each of the thus-obtained patterned-light-illuminated images, eventually resulting in the generation of a plurality of luminance images having the same total-number as that of the light patterns.

The coded-image generation program 404d is executed to generate from binarized images, a coded image having space codes allocated to respective pixels of the coded image. The binarized images are generated as a result of the thresholding of individual luminance-images which are generated as a result of the execution of the luminance image generation program 404c.

Described schematically, upon initiation of thin coded-image generation program 404d, a representative one of the plurality of luminance images is selected which was obtained when the subject S was illuminated by one of the plurality of light patterns that has the smallest pitch distance between adjacent pattered lines (i.e., stripes) among those of the plurality of light patterns.

Further, variable distances between adjacent twos of the patterned lines in the representative luminance-image are calculated as spacings or periods (i.e., cycle times), and the distribution of the calculated periods over the entire representative luminance-image is calculated as a period distribution.

Upon initiation of this coded-image generation program 404d, additionally, a local variable-size window is provided in common to the luminance images associated with different light-patterns, so as to have a size variable along the profile of the calculated period-distribution of the representative luminance-image, thereby filtering the entire representative luminance-image using the thus-provided variable-size window.

The filtering is performed for calculating and determining local thresholds over the entire representative luminance-image, thereby generating a threshold image indicative of the distribution of the thus-determined thresholds.

From the relation between the thus-generated threshold image and each of the different luminance-images, binarized images are generated on a light-pattern-by-light-pattern basis.

A technique of filtering the entire representative luminance-image using the thus-provided variable-size window for calculating local thresholds over the entire luminance-image, is disclosed in more detail in Japanese Patent Application No. 2004-285736 that was filed by the same applicant as that of the present application, the disclosure of which is herein incorporated by reference in its entirety.

The code edge extraction program 404e is executed to calculate code edge coordinates (coordinates of edges separating uniform coded-areas) with sub-pixel accuracy, by the use of both a coded image generated by the execution of the coded-image generation program 404d and the luminance images generated by the execution of the luminance image generation program 404c.

The lens aberrations correction program 404f is executed to process the code edge coordinates generated with sub-pixel accuracy by the execution of the code edge extraction program 404e, for correction for aberrations or distortion due to the image-capture optical system 30.

The triangulation calculation program 404g is executed to calculate from the code edge coordinates which have been aberrations-corrected by the execution of the lens aberrations correction program 404f, 3-D coordinates defined in a real space which correspond to the aberrations-corrected code edge coordinates.

The feed motor control program 404h is executed to control the feed motor 65 for successively projecting a plurality of different light-patterns onto the subject S. The feed motor control program 404h is conceptually illustrated along with other processing, in a flow chart in FIG. 19.

The table-mounted motor control program 404i is executed to control the table motor 194 for allowing indexing rotation of the turntable 184 together with the subject S. This table-mounted motor control program 404i is conceptually illustrated along with other processing, in a flow chart in FIG. 18.

In the present embodiment, sequential projection of a series of the aforementioned light patterns onto the subject S and sequential image-capture operations of the subject S are performed in combination each time the subject S is angularly indexed at equal intervals.

More specifically, the subject S is angularly and intermittently indexed 90 degrees, and, at each indexing position, the sequential projection of a series of light patterns and the sequential image-capture operations are performed for the subject S.

As a result, the overall area of the exterior surface of the subject S is divided into four sub-areas, and stereoscopic images (i.e., 3-D shape information) are acquired for the four sub-areas, respectively. The thus-acquired stereoscopic-images, after are processed removal of overlapped portions therebetween, combined together, whereby a single full image corresponding to the subject S is generated as a stitched image.

Additionally, in the present embodiment, as a result of mapping of the surface color information previously measured for the same subject S onto the generated stitched image, the aforementioned 3-D-shape-and-color data is generated. Then, a series of 3-D input operations for the subject S is terminated.

As illustrated in FIG. 8, the RAM 406 has memory areas assigned to the following:
a patterned-light-illuminated image storing area 406a;
a patterned-light-non-illuminated image storing area 406b;
a luminance image storing area 406c;
a coded-image storing area 406d;
a code edge coordinates storing area 406e;
an aberration correction coordinates storing area 406g;
a 3-D coordinates storing area 40h;
a period distribution storing area 406p;
a threshold image storing area 406q;
a binarized image storing area 406r;
a stitched image storing area 406s;
a 3-D-shape-and-color data storing area 406t; and
a working area 410.

The patterned-light-illuminated image storing area 406a is used for storage of data indicative of a patterned-light-illuminated image captured as a result of the execution of the image-capturing processing program 404b. The patterned-light-non-illuminated image storing area 406b is used for storage of data indicative of a patterned-light-non-illuminated image captured as a result of the execution of the image-capturing processing program 404b.

The luminance image storing area 406c is used for storage of data indicative of luminance images resulting from the execution of the luminance image generation program 404c. The coded-image storing area 406d is used for storage of data indicative of a coded image resulting from the execution of the coded-image generation program 404d. The code edge coordinates storing area 406e is for use in storing data indicative of code edge coordinates extracted with sub-pixel accuracy by the execution of the code edge extraction program 404e.

The aberration correction coordinates storing area 406g is used for storage of data indicative of the code edge coordinates processed for the aberrations correction by the execution of the lens aberrations correction program 404f. The 3-D coordinates storing area 406h is used for storage of data indicative of 3-D coordinates in the real space calculated by the execution of the triangulation calculation program 404g.

The period distribution storing area 406p, the threshold image storing area 406q and the binarized image storing area 406r are used for storage of data indicative of the period distribution, data indicative of the threshold image, and data indicative of the binarized images, respectively, all acquired by the execution of the coded-image generation program 404d.

The stitched image storing area 406s is used for storage of the aforementioned stitched image. The 3-D-shape-and-color data storing area 406t is used for storage of the aforementioned 3-D-shape-and-color data. The working area 410 is used for storage of data which is temporarily used for the operation of the CPU 402.

Referring next to FIG. 16, the camera control program 404a will be described below. As a result of the execution of this program 404a by the computer 400, the aforementioned main operation is performed.

The main operation starts with step S100 to power on a power source including the battery 74, which is followed by step S102 to initialize the processing section 16, a peripheral interface, etc.

Subsequently, at step S103, a key scan is performed for monitoring the status of the mode selection switch 42, and then, at step S104, a determination is made as to whether or not the SLOW mode has been selected by the user through the mode selection switch 42.

If so, then the determination of step S104 becomes "YES" and operations progress to step S105 to establish the aforementioned non-pixel-decimated-image processing mode. Upon completion of this step S105, operations progress to step S108 described later in more detail, and subsequently, returns to step S103.

If, however, the SLOW mode has not been selected by the user through the mode selection switch 42, then the determination of step S104 becomes "NO," and operations progress to step S106 to make a determination as to whether or not the FAST mode has been selected by the user through the mode selection switch 42.

If so, then the determination of step S106 becomes "YES," and operations progress to step S107 to establish the aforementioned pixel-decimated-image processing mode. Upon completion of step S107, operations progress to step S108 described later in more detail, and subsequently, returns to step S103.

If, however, the FAST mode has not been selected by the user through the mode selection switch 42, then the determination of step S106 becomes "NO," and operations progress to step S112 to make a determination as to whether or not the OFF mode has been selected by the user through the mode selection switch 42.

If so, then the determination of step S112 becomes "YES" with immediate termination of this main operation, and otherwise the determination of step S112 becomes "NO" with return to step S103.

Figure 17:
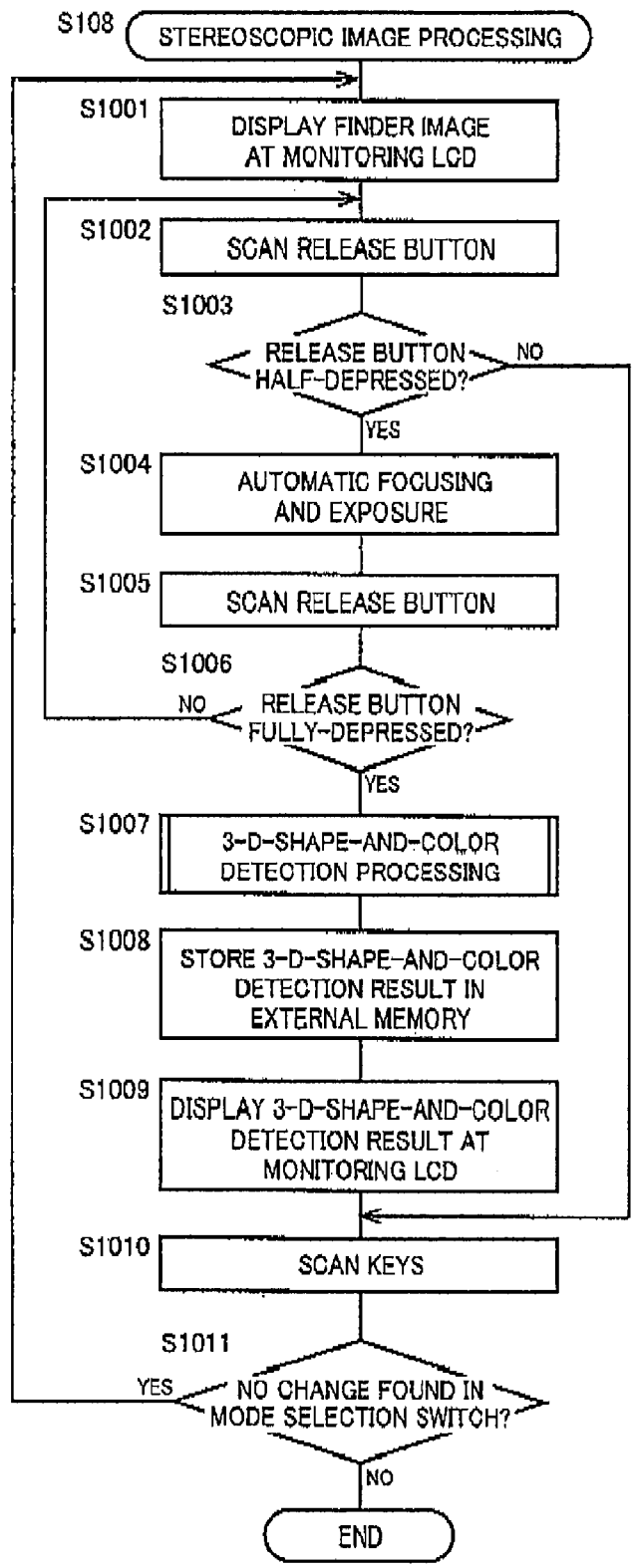
FIG. 17 is a flow chart conceptually illustrating stereoscopic image processing implemented in a step S108 depicted in FIG. 16.

Referring next to FIG. 17, step 5108 depicted in FIG. 1s is conceptually illustrated in a flow chart as a stereoscopic-image processing routine. As a result of the execution of this routine, stereoscopic-image processing is performed to detect the 3-D shape of the subject S as the stereoscopic image, and to display the thus-detected stereoscopic image.

This stereoscopic-image processing is further performed to detect the surface color of the same subject S. A combination of the detected stereoscopic image and the detected surface color with their positions being in alignment with each other refers to a 3-D-shape-and-color detection result.

This stereoscopic-image processing starts with step S1001 to display a finder image on the monitor LCD 44 exactly as an image which the user can view through the image-capture optical system 30. This enables the user to verity a captured image (i.e., an image capture field) prior to a substantial image-capture stage, provided that the user views an image displayed on the monitoring LCD 44.

Next, at step S1002, the status of the release button 40 is scanned or monitored, and then, at step S1003, based on the result from the scan, a determination is made as to whether or not the release button has been half-depressed.

If so, then the determination of step S1003 becomes "YES," and operations progress to step S1004 to invoke the auto-focus function (AF) and the automated exposure function (AE), thereby adjusting the lens focus and aperture and the shutter speed. If, at step S1003, it is determined that the release button 40 has not been brought into the half-depressed state, then the determination of step S1003 becomes "NO," and operations progress to step S1010.

Upon completion of step S1004, at step S1005, the status of the release button 40 is scanned again, and then, at step S1006, based on the result from the scan, a determination is made as to whether or not the release button 40 has been fully-depressed. If not, the determination of step S1006 becomes "NO," and operations return to step S1002.

If, however, the release button 40 has changed from the half-depressed state into the fully-depressed state, then the determination of step S1006 becomes "YES," and operations progress to step S1007 to perform 3-D-shape-and-color detection processing described later, thereby detecting the 3-D-shape-and-color of the subject S.

Described schematically, a 3-D-shape-and-color detection result is generated as a result of the execution of the 3-D-shape-and-color detection processing.

In this regard, the term "3-D-shape-and-color detection result" is used herein to mean a set of vertex coordinates obtained by converting a plurality of space-code edge images extracted from a space-coded image as described later on, into 3-D coordinates, wherein shape-and-color information and polygon information are in association with each other per each vertex.

The shape-and-color information is indicative of a combination of real space coordinates and RGB values. The polygon information is indicative of a combination of ones of a total number of vertexes which are to be coupled to one another for constructing a solid representative of the subject S in a three-dimensional manner.

Thereafter, at step S1008, the 3-D-shape-and-color detection result is stored in the external memory 78, and then, at step S1009, the 3-D shape detection result is displayed on the monitoring LCD 44 as a 3-D computer-graphics image.

Next, at step S1010, the key scan is performed in a similar manner to step S103 in FIG. 16. Subsequently, at step S1011, a determination is made as to whether or not no change has been found in the status of the mode selection switch 42. If so, then the determination of step S1011 becomes "YES" and operations return to step S1001, and otherwise this stereo-scopic-image processing terminates.

The 3-D-shape-and-color detection processing is performed at step S1007 shown in FIG. 17 to detect the 3-D shape of the subject S using a space-encoding technique.

Figure 18:
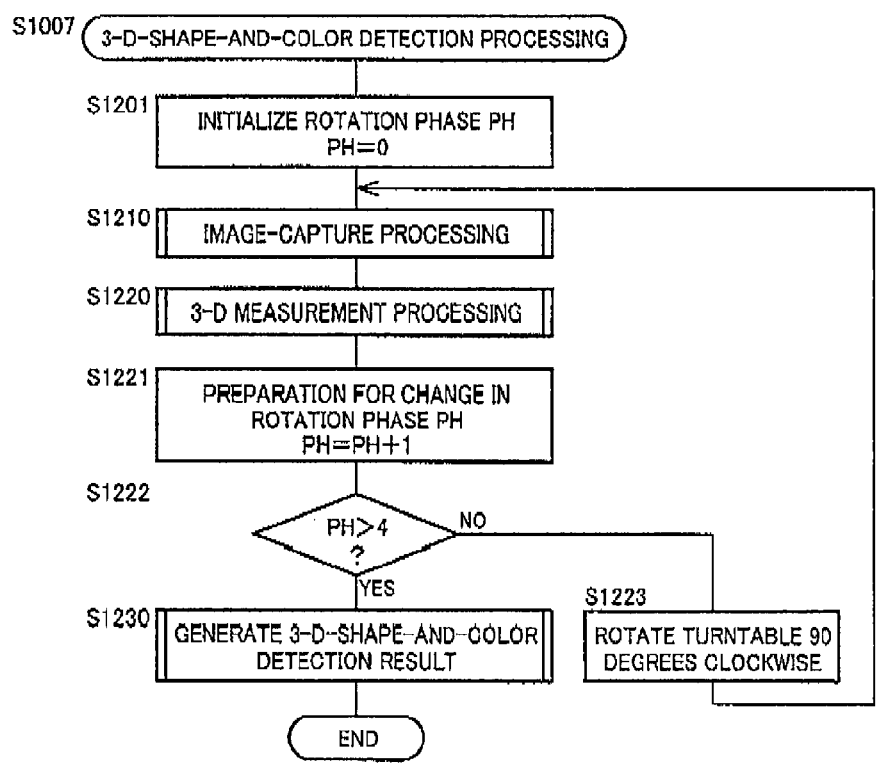
FIG. 18 is a flow chart conceptually illustrating 3-D-shape-and-color detection processing implemented in a step S1007 depicted in FIG. 17, in the name of a 3-D-shape-and-color detection processing routine.

FIG. 18 is a flow chart conceptually illustrating step S1007 depicted in FIG. 17, in the name of a 3-D-shape-and-color detection processing routine. The 3-D-shape-and-color detection processing routine incorporates there in a table-mounted motor control program 404i which is designed to incorporate steps S1201 and S1221-S1223 depicted in FIG. 18.

The 3-D-shape-and-color detection processing routine starts with step S1201 to make a zero initialization of a rotation phase PH of the turntable 184.

In the present embodiment, the turntable 184 stops four times per each rotation, and therefore, four discrete rotation phases PH are assigned to the turntable 184. More specifically, as the turntable 184 rotates, the value of the rotation phase PH of the turntable 184 varies discretely from "0" indicative of the initial rotation phase PH, "1" indicative of the next rotation phase PH, "2" indicative of the rotation phase PH followed by the rotation phase PH "1," to "3" indicative of the final rotation phase PH.

Next, at step S1210, an image-capture process is implemented for the current rotation phase PH as a result of the execution of the image-capturing processing program 404b.

In the image-capture process, the projecting section 12 successively projects a plurality of striped patterns of light onto the subject S. Further, different patterned-light-illuminated images are captured by digitally photographing the subject S with the different light patterns being projected onto the subject S, respectively, and one patterned-light-non-illuminated image is captured by digitally photographing the same subject S with no light pattern being projected onto the subject S. This step S1210 will be described later in more detail by referring to FIG. 19.

Upon termination of the image-capture process, at step S1220, 3-D measurement processing is performed for the current rotation phase PH. Upon initiation of this 3-D measurement processing, the patterned-light-illuminated images and the one patterned-light-non-illuminated image each captured by the preceding image-capture process are utilized to actually measure the 3-D shape of the subject S. This step S1220 will be described later in more detail by referring to FIG. 22.

Upon termination of the 3-D measurement processing, at step S1221, the rotation phase PH is incremented one in preparation for a next image-capture operation. Subsequently, at step S1222, a determination is made as to whether or not the current value of the rotation phase PH is greater than "4," that is to say, all the sequential image-capture operations have been already completed for the subject S.

If the current value of the rotation phase PH is not greater than "4," then the determination of step S1222 becomes "NO," and operations progress to step S1223 to transmit a drive signal required for rotating the turntable 184 90 degrees in a clockwise direction, to the table-mounted motor 194.

As a result, the turntable 184 is rotated 90 degrees in a clockwise direction, thereby turning the subject S to a position in which one of the sub-areas of the subject S that has not been previously photographed faces the measurement head MH. Thereafter, steps S1210 and S1220 are executed, whereby the aforementioned sequential image-capture operations and the 3-D measurement processing are performed for the subsequent rotation phase PH.

If, as a result of the execution of the loop of steps S1210 to S1223 a required number of times, the determination of step S1222 becomes "YES," then operations progress to step S1230 to generate the 3-D-shape-and-color detection result by combining the 3-D shape and the surface-color both of which have been measured for the subject S. This step S1230 will be described in more detail later by referring to FIG. 24.

Upon generation of the 3-D-shape-and-color detection result, the current cycle of the 3-D-shape-and-color detection processing is terminated.

Figure 19:
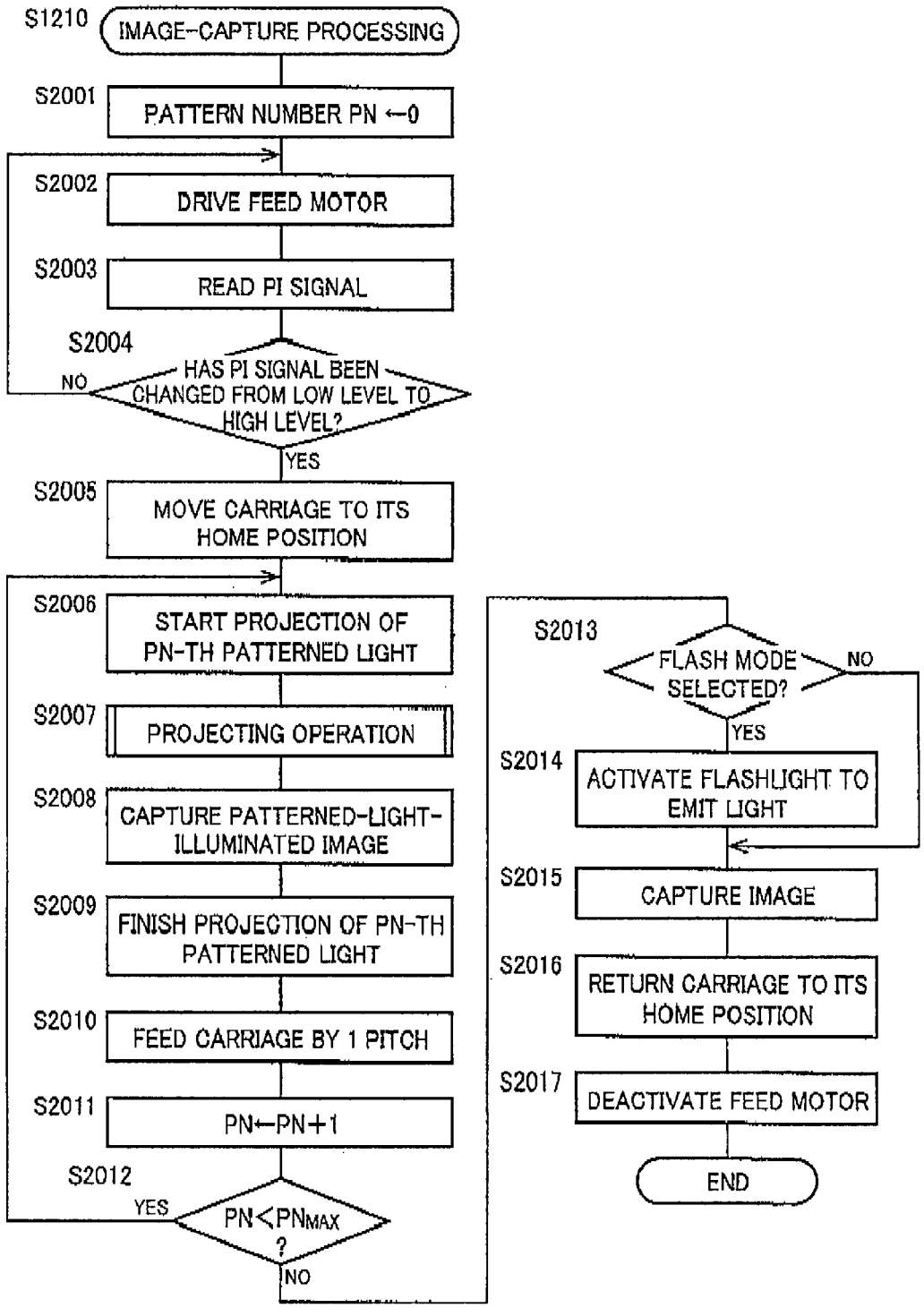
FIG. 19 is a flow chart conceptually illustrating a step S1210 depicted in FIG. 18, in the name of an image-capturing processing program 404b.

Referring next to FIG. 19, step S1210 in FIG. 18 is illustrated in greater detail. FIG. 19 conceptually illustrates in a flow chart step S1210 as the image-capturing processing program 404b.

The image-capturing processing program 404b has incorporated therein the feed motor control program 404h which is designed to include steps S2002-S2005, S2010, S2016 and S2017 depicted in FIG. 29.

The image-capturing processing program 404b starts with step S2001 to set to zero for initialization, a pattern number PN indicative of the number of patterned light to be currently generated.

The pattern number PN corresponds to the number of a selected one of the optical elements 260 which is to be located at the window section 297 for projecting a current one of the light patterns onto the subject S. In FIG. 12, the number of each optical element 260 is denoted as the corresponding one of "code Nos."

Next, at step S2002, the feed motor 65 is driven in a predetermined direction. Subsequently, at step S2003, the aforementioned PI signal is retrieved from the photointerupter 300.

Thereafter, at step S2004, a determination is made as to whether or not the retrieved PI signal has just changed from low to high in level. In other words, a determination is made as to whether or not the photointerupter 300 has just detected the carriage 202, that is to say, whether or not the carriage 202 has just reached the aforementioned specific position.

If the retrieved PI signal has not just changed from low to high in level, then the determination of step S2004 becomes "NO," and the loop of steps S2002 to S2004 restarts. If, after the loop of steps S2002 to S2004 has been repeated some number of times, the PI signal has changed from low to high in level, then the determination of step S2004 becomes "YES," and operations progress to step S2005.

At step S2005, a predetermined drive signal (e.g., in the form of a drive pulse) is supplied to the feed motor 65 for further movement of the carriage 202 from the aforementioned specific position to a home position.

If the carriage 202 has been located at its home position, the modulating optics 200 is brought into direct facing relationship with one of the planar optical elements 260 (i.e., the aforementioned selected optical element) at the window section 297. The one planar optical element 260 is used for generating a light pattern assigned the current value of the pattern number "PN."

Thereafter, at step S2006, projection starts of PN-th light pattern (i.e., patterned light) assigned a pattern number equal to the current value of the pattern number "PN."

Figure 20:
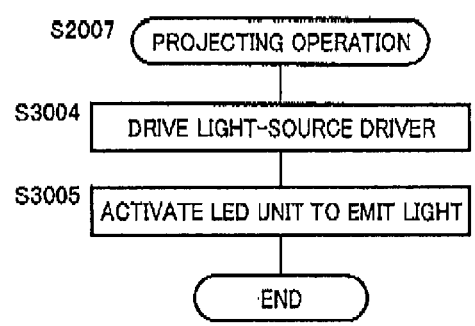
FIG. 20 is a flow chart conceptually illustrating a projection operation implemented in a step S2007 depicted in FIG. 19, in the name of a projecting operation subroutine.

Subsequently, at step S2007, the projecting operation is performed for projecting the PN-th patterned light onto the subject S. FIG. 20 conceptually illustrates in a flow chart the detail of step S2007 as a projecting operation subroutine. As a result of the execution of this projecting operation subroutine, the projecting operation is performed to project the PN-th patterned light emitted from the projecting section 12 onto the subject S, in cooperation with the projection mechanism 66.

The projecting operation starts with step S3004 to drive the light-source driver 64, and step S3005 follows to cause the LED unit 62 to emit light in response to an electrical signal from the light-source driver 84. Then, this projecting operation terminates.

Light emitted from the LED unit 62 reaches the projection mechanism 66 through the light-source lens 64.

In the projection mechanism 66, the spatial modulation is applied in conformity with the surface shape of the selected optical element 260 of the modulating optics 200, thereby converting light (original light) coming into the projection mechanism 66 into the patterned light. The patterned light is outputted from the projection mechanism 66 and then reaches the subject S by way of the projection optical system 32, to form a projection image on the subject S by light projection.

Once the PN-th light pattern is projected onto the subject S in the manner described above, and then, at step S2008 in FIG. 19, the image-capturing section 14 is activated to photograph the subject S with the PN-th light pattern being projected onto the subject S.

This photographing operation results in the capture of a PN-th patterned-light-illuminated image which represents the subject S onto which the PN-th light pattern has been projected. The captured patterned-light-illuminated image is stored in the patterned-light-illuminated image storing area 406*a* in association with the corresponding value of the pattern number PN.

Upon termination of this photographing operation, at step S2009, the projection of the PN-th light pattern terminates, and then, at step S2010, a drive signal is supplied to the feed motor 65 for advancing the carriage 202 by one pitch in preparation for the projection of the next light pattern. Thereafter, at step S2011, the pattern number PN is incremented one in preparation for the projection of the next light pattern.

Subsequently, at step S2012, a determination is made as to whether or not a current value of the pattern number PN is smaller than a maximum value PNmax. The maximum value PNmax is pre-determined so as to reflect the total number of the mask patterns to be used. For example, when eight light patterns are to be used in total, the maximum value PNmax is set to eight.

If the current value of the pattern number PN is smaller than the maximum value PNmax, then the determination of step S2012 becomes "YES," and the loop of steps S2006 to S2012 restarts for projection of a light pattern assigned the current pattern number "PN".

If the current value of the pattern number PN, as a result of the repetition of steps S2006 to S2012 a number of times equal to the total number of the light patterns, becomes not smaller than the maximum value PNmax, then the determination of step S2012 becomes "NO," and this image-capture process terminates.

As will be evident prom the above, one cycle of implementation of the image-capture process allows the acquisition of patterned-light-illuminated images whose number is equal to the maximum value PNmax.

Subsequently, at step S2013, a determination is made as to whether or not a flash mode has been selected.

If so, then the determination of step S2013 becomes "YES," and operations progress to step S2014 to activate the flash light 26 to emit light.

If, however, a flash mode has not been selected, then the determination of step S2013 becomes "NO," and step S2014 is skipped. In any event, step S2015 follows to photograph the subject S.

The photographing operation is performed for the purpose of measuring the surface color of the subject S without projecting onto the subject S any light pattern coming from the projecting section 12. As a result, a single patterned-light-non-illuminated image is acquired for the subject S. The acquired patterned-light-non-illuminated image is stored in the patterned-light-non-illuminated image storing area 406*b*.

Subsequently, at step S2016, the feed motor 65 is driven to return the carriage 202 to the aforementioned home position. Thereafter, at step S2017, the feed motor 65 is deactivated and enters a wait state.

Then, one cycle of execution of this image-capturing processing program 404*b* terminates.

Figure 21:
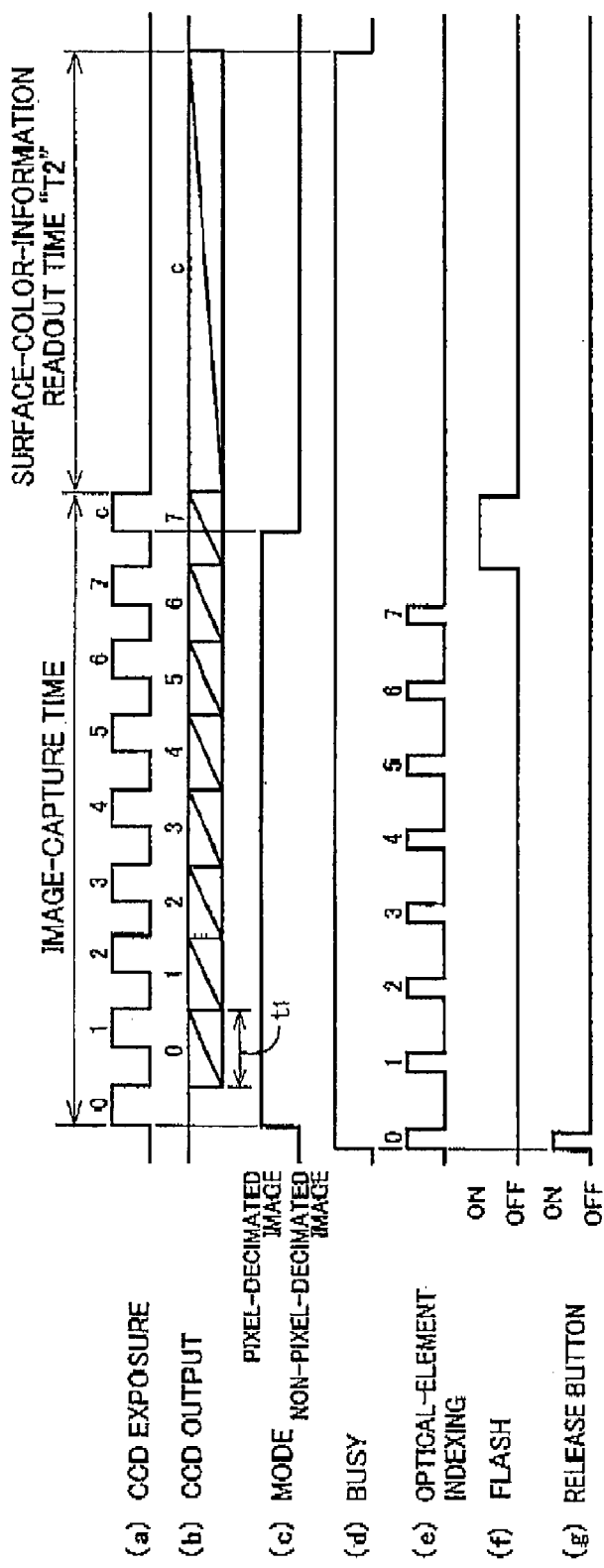
FIG. 21 is a timing chart for explanation of an exemplified version of operation of the 3-D input device 10 depicted in FIG. 1.

FIG. 21 is a timing chart for explanation of an exemplary operation of the 3-D input device 10 which is performed as a result of one cycle of execution of the image-capturing processing program 404*b*. This exemplary operation is executed by the 3-D input device 10 in response to a user action to fully depress the release button 40, with the FAST mode being selected by the user.

FIG. 21(*a*) illustrates how the CCD 70 undergoes a predetermined number of consecutive exposure cycles with the incoming light from the subject S.

FIG. 21(*b*) is a timing chart showing timings in which, for each exposure cycle, light is converted into an electrical signal using the CCD 70 per each pixel of a full image formed by incoming light from the subject S and then the electrical signal is outputted from the CCD 70.

FIG. 21(*c*) is a timing chart showing timing in which the image processing mode of the image-capturing section 14 is switched between the aforementioned pixel-decimated image processing mode and non-pixel-decimated image processing mode, over time.

FIG. 21(*d*) is a timing chart showing timing in which the status of the image-capturing section 14 is switched between a wait state, and an active state for enabling an image-capture process (exposure cycle) and a signal-readout cycle, over time.

FIG. 21(*e*) is a timing chart showing timing in which the modulating optics 200 is indexed to locate each planar optical element 260 in position for forming the corresponding light pattern.

FIG. 21(*f*) is a timing chart showing timing in which the flash light 26 is switched between an OFF-state and an ON-state, over time.

FIG. 21(*g*) is a timing chart showing timing in which the release button 40 is switched between a non-operating state (OFF-state) and an operating state (ON-state), over time.

In the present embodiment, the CCD 70 undergoes exposure to the incoming light from the subject S, and then a signal that reflects the exposure is read out from the CCD 70. One signal-readout cycle corresponds to one exposure cycle, and the exposure cycle and the signal-readout cycle cooperate to constitute one of image-capture sub-processes.

In the present embodiment, the acquisition of the 3-D shape information and the surface-color information is consecutively performed for the same subject S in the description order.

As described above, for acquiring the 3-D shape information of the subject S, the eight light patterns (pattern numbers PN=0 to 7) are successively projected onto the subject S, and, each time each light pattern is projected onto the subject S, the exposure cycle of the CCD 70 and the signal-readout cycle in which a signal is read out from the CCD 70 are executed.

That is to say, for acquiring the 3-D shape information of the subject S, eight image-capture sub-processes in total are sequentially performed for the subject S. In FIG. 21, the pattern number "PN" corresponding to each image-capture sub-process for acquiring the 3-D shape information is labeled a corresponding one of numerals "0" to "7."

For acquiring the surface-color information of the subject S, the CCD 70 undergoes one exposure cycle with the incoming light from the subject S, and the signal-readout cycle follows. That is to say, for acquiring the surface-color information of the subject S, one image-capture sub-process is performed for the subject S. In FIG. 21, the image-capture sub-process for acquiring the surface-color information of the subject S is labeled symbol "c."

In the image-capture sub-process for acquiring the 3-D shape information, the patterned light acting as illumination light is essentially projected onto the subject S, while, in the image-capture sub-process for acquiring the surface-color information, the illumination light is optionally projected onto the subject S.

More specifically, in the image-capture sub-process for acquiring the surface-color information, the flash light 26 is automatically activated to emit light, in case of shortage of light from the subject S, whereby the illumination light is projected onto the subject S.

Therefore, in the present embodiment, nine image-capture sub-processes in total, eight of them for acquiring the 3-D shape information, and one of them for acquiring the surface-color information, are successively performed. In the present embodiment, the nine image-capture sub-processes corporate together to define one image-capture process.

In the nine image-capture sub-processes, nine exposure cycles are successively executed for the same subject S at the same rate as a video rate, for example, and in the same cyclical period.

A total duration during which a series of the nine exposure cycles is executed is so long that an undesirable relative displacement between the subject S and the 3-D input device 10 adversely affects images to be captured by the CCD 70. The total duration is indicative of an image-capture time for the 3-D input device 10 (as shown in FIG. 20, hereinafter, referred to as "total image-capture time.") It is meant that the shorter the image-capture time, the higher the ability of the 3-D input device 10 to capture the image of subjects in motion.

In the exemplary operation illustrated in FIG. 21, the signal-readout cycles in the eight image-capture sub-processes for acquiring the 3-D shape information are each executed in the form of the pixel-decimated image processing.

Therefore, in each image-capture sub-process for acquiring the 3-D shape information, an electrical signal is outputted from the CCD 70, subsequent to the corresponding exposure cycle of the CCD 70, and after elapse of a signal-readout time "t1" required The signal-readout time "t1" is referred to also as a single-frame readout-time indicative of a 3-D-shape-information readout-time which is required for a single frame is worth of the 3-D shape information to be read out from the CCD 70, after the completion of the corresponding exposure cycle of the CCD 70, per each projection cycle of each patterned light.

On the other hand, in the example illustrated in FIG. 21, the signal-readout cycle in one image-capture sub-process for acquiring the surface-color information is executed in the form of the non-pixel-decimated image processing.

Therefore, in one image-capture sub-process for acquiring the surface-color information, an electrical signal is outputted from the CCD 70, subsequent to the corresponding exposure cycle of the CCD 70, and after elapse of a signal-readout time "t2" required.

The signal-readout time "t2" is referred to also as a single-frame readout-time indicative of a surface-color-information readout-time which is required for a single frame's worth of the surface-color information to be read out from the CCD 70, after the completion of the corresponding exposure cycle of the CCD 70.

The signal-readout time "t1" required for the pixel-decimated image processing is shorter than the signal-readout time "t2" required for the non-pixel-decimated image processing. In an example, the duration of the signal-readout time "t1" is about 33 ms, while the duration of the signal-readout time "t2" is about 0.5 s.

As illustrated in FIGS. 21(*a*) and 21(*b*), in each one of the image-capture sub-processes, the corresponding signal-readout cycle is initiated upon completion of the corresponding exposure cycle, while the subsequent exposure cycle performed in the subsequent image-capture sub-process is initiated before completion of the signal-readout cycle performed in the previous image-capture sub-process.

That is to say, the signal-readout cycle in an arbitrary one of the image-capture sub-processes and the exposure cycle in the subsequent image-capture sub-process are executed so as to partially overlap with each other over time. It is noted that the signal-readout cycle in an arbitrary one of the image-capture sub-processes is terminated before the exposure cycle in the subsequent image-capture sub-process is terminated.

Therefore, in the present embodiment, as illustrated in FIG. 21(*b*), eight signal-readout cycles for acquiring the 3-D shape information are successively performed without interruption.

The time required to complete each signal-readout cycle, when executed with the pixel-decimated image processing, is only about 33 ms, with the result that the time required to complete the eight signal-readout cycles is as short as about 0.26 s.

A total image-capture time illustrated in FIG. 21 has a portion referred to as "partial image-capture time." The total image-capture time is a duration from the first one to the last one of successive exposure cycles for acquiring both the 3-D shape information and the surface-color information of the subject S, while the partial image-capture time is required to capture images of the subject S (by a plurality of successive exposure cycles) for acquiring the 3-D shape information of the subject S. The partial image-capture time has a duration of about 0.26 s at the maximum, because the partial image-capture time is dominantly occupied by the total of eight signal-readout times as described above and because the time required to complete the eight signal-readout cycles is about 0.26 s.

In contrast, the time required to complete each signal-readout cycle, when executed with the non-pixel-decimated image processing, is as long as about 0.5 s. For this reason, the length of time required to execute the eight signal-readout cycles is as long as about 4 s, with the result that the partial image-capture time which corresponds to the eight signal-readout cycles is required to be about 4 s.

As described above, when signal-readout from the CCD 70 is executed with the pixel-decimated image processing, the total image-capture time is reduced, resulting in the capability of measuring the 3-D shape of the subject S with high accuracy, irrespective of unexpected movement of the subject S or unexpected shake of the 3-D input device 10 during handheld shooting.

Additionally, as illustrated in FIG. 21, in the present embodiment, the second through eighth exposure cycles for acquiring the 3-D shape information and the following exposure cycle for acquiring the surface-color information are each initiated without waiting for completion of a signal-readout cycle corresponding to the exposure cycle which is immediately previous to the current exposure cycle. The signal-readout cycle corresponding to the previous exposure cycle is executed in parallel to the subsequent exposure cycle, allowing the nine signal-readout cycles to be successively executed without interruption.

As a result, the total image-capture time as indicated in FIG. 20, that is to say, the time for successively executing the image-capture sub-processes (i.e., a plurality of exposure cycles) for acquiring the 3-D shape information and the image-capture sub-process (i.e., one exposure cycle) for acquiring the surface-color information is reduced.

More specifically, because the time required to complete each signal-readout cycle, when executed with the pixel-decimated image processing, is only about 33 ms, the time required to complete the nine signal-readout cycles is about 0.3 s, with the result that the total image-capture time corresponding to the nine signal-readout cycles is also about 0.3 s at the maximum.

If, in a comparative case, one image-capture sub-process for acquiring the surface-color information, namely, an image-capture process for measuring the surface-color of the subject S (the signal-readout cycle is executed with the non-pixel image processing), is followed by the eight image-capture sub-processes for acquiring the 3-D shape information, namely, an image-capture process for measuring the 3-D shape of the subject S (the signal-readout cycles are each executed with the pixel-decimated image processing). A leading one of successive exposure cycles for acquiring the 3-D shape information has to be delayed until the signal-readout cycle occurring in the image-capture process for measuring the surface-color of the subject S, which is previous to the leading exposure cycle, is almost completed. The delay time, which is almost equal in length to the signal-readout time "t2," is about 0.5 s.

In this comparative case, there exists a slightly long time interval between the exposure cycle for acquiring the surface-color information and the leading one of exposure cycles for acquiring the 3-D information, resulting in prolonged length of the total image-capture time shown in FIG. 21.

On the other hand, the prolonged length of the total image-capture time does not create any problem in the absence of an unwanted relative displacement between the measurement head MH and the subject S, or in the presence of such a relative displacement with an adequately small amount.

In contrast, where an unwanted relative displacement between the measurement head MH and the subject S is large, a prolonged length of the total image-capture time would disable the surface-color information and the 3-D shape information correctly matching with each other pixel-by-pixel. That is to say, the accuracy of texture mapping is degraded.

On the other hand, in the present embodiment, as illustrated in FIG. 21, the eight image-capture sub-processes for acquiring the 3-D shape information is previous to one image-capture sub-process for acquiring the surface-color information.

As a result, the eight exposure cycles for acquiring the 3-D shape information and the subsequent exposure cycle for acquiring the surface-color information can be successively executed with equal periods. Accordingly, in the present embodiment, the total image-capture time can be shortened to the extent of about 0.3 s.

Therefore, the present embodiment allows the exposure cycles for acquiring the 3-D shape information and the exposure cycle for acquiring the surface-color information to be successively executed at adequately short time intervals. As a result, high accuracy of texture mapping is achieved, irrespective of the presence/absence or the amount of an unwanted relative displacement between the measurement head NH and the subject S.

Therefore, where signals are read out from the CCD 70 for acquiring the 3-D shape information by executing the pixel-decimated image processing mode (i.e., where the user has selected the FAST mode), the present embodiment provides the 3-D input device 10 better adapted for capturing images of moving subjects with high accuracy of texture mapping, while securing high texture resolution, namely, high accuracy with which the surface-color information is measured.

Additionally, in the present embodiment, the user can change the image processing mode for acquiring the 3-D shape information between the pixel-decimated image processing mode, namely, the FAST mode, and the non-pixel-decimated image processing mode, namely, the SLOW mode, where appropriate.

In environments in which there is a risk of a degradation of the accuracy of texture mapping, a user action to select the FAST mode would prevent the accuracy of texture mapping from being degraded, even in such environments mentioned above.

On the other hand, in environments in which there is no risk of a degradation of the accuracy of texture mapping, a user action to select the SLOW mode would achieve not only high accuracy of texture mapping but also high accuracy with which the 3-D shape information is measured.

As described above, the present embodiment allows the user to optionally change the settings of the 3-D input device 10 in accordance with an environment in which the 3-D input device 10 is used and the user's needs of the measuring accuracy of the 3-D shape information and the accuracy of texture mapping, resulting in improvement in the ease-to-use of the 3-D input device 10.

Figure 22:
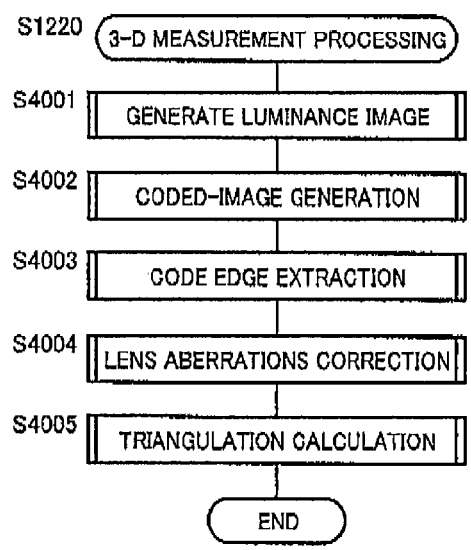
FIG. 22 is a flow chart conceptually illustrating a step S1220 depicted in FIG. 18, in the name of a 3-D measurement processing subroutine.

Then, by referring to FIG. 22, step S1220 depicted in FIG. 18 is described in greater detail. FIG. 22 conceptually illustrates in a flowchart, step S1220 as a 3-D measurement processing subroutine.

This 3-D measurement processing subroutine starts with step 5001 to generate luminance images by the execution of the luminance image generation program 404c.

At step S4001, a luminance value, which is defined as a Y value in a YCbCr color space, is calculated from the R, G and B values of individual pixels, based on the following exemplary formula:

$$Y=0.2989 \times R+0.5866 \times G+0.1145 \times B$$

The calculation of the Y value per pixel enables the generation of a plurality of luminance images each corresponding to the patterned-light-illuminated images. The generated plurality of luminance images are stored in the luminance image storing area 406c in association with the corresponding respective pattern numbers PN.

The formula employed to calculate the luminance images or values is not limited to the above formula, and may be alternative formulas, where appropriate.

Next, at step S4002, the coded-image generation program 404d is executed. Upon initiation of this program 404d, the generated luminance images are combined using the aforementioned space-encoding technique, thereby generating a coded image having pixels to which space codes are assigned pixel-by-pixel.

The coded image is generated through a binarizing operation in which a comparison is made between the luminance images for the patterned-light-illuminated image which have been stored in the luminance image storing area 406c, and a threshold image having pixels to which light-intensity thresholds or luminance thresholds are assigned pixel-by-pixel. The generated coded image is stored in the coded-image storing area 406d.

Referring next to FIG. 22, the detail of this coded-image generation program 404d is conceptually illustrated in a flow chart.

The technique employed in the coded-image generation program 404d is disclosed in more detail in Japanese Patent Application 2004-285736 that was filed by the same applicant as that of the present application, the disclosure of which is herein incorporated by reference in its entirety.

The coded-image generation program 404d will be described step-by-step below, the underlying principle of which will be described beforehand.

In the present embodiment, a plurality of luminance images are generated for the same subject S (i.e., a three-dimensional object) under the effect of a plurality of projected different light patterns, respectively. The different light patterns are each structured so as to have bright portions (i.e., bright patterned lines each having a width) and dark portions (i.e., dark patterned lines each having a width) which alternate in a uniform patterned-lines repetition-period or at equal intervals.

The different light patterns, each of which is referred to as a light pattern having a pattern number PN, are different from each other in terms of a repetition period of the patterned lines in each light pattern. One of the light patterns which has the shortest patterned-lines repetition-period among them is a light pattern having a pattern number PN of "0," while one of the light patterns which has the longest patterned-Lines repetition-period among them is a light pattern having a pattern number PN of "PNmax−1."

Each and every luminance image, because of its acquisition with the projection of a corresponding light pattern, is formed as a light-pattern image in which bright patterned lines as bright portions and dark patterned lines as dark portions alternate in a linear array.

The distances or spacings between adjacent patterned lines, because of their dependency upon the relative geometry (the relations on position and orientation) between the 3-D input device 10 and the subject S, are not always uniform throughout each luminance image.

In addition, different luminance images acquired with the effect of the respective projected different-light-patterns are identified by the pattern numbers PN of the corresponding respective light patterns.

In the present embodiment, one of the different luminance images is selected as a representative light-pattern image. The typical example of such a representative light-pattern image is a luminance image corresponding to one of the different light patterns which has the shortest patterned-lines repetition-period among them, that is to say, a luminance image having a pattern number PN of "0."

In the luminance image acquired by digitally photographing the subject S onto which a light pattern has been projected, a luminance value changes periodically and spatially as a function of a pixel position along a linear array of pixels. There exists an envelope curve tangent to a graph indicating the periodical change of the luminance value, at lower peak points (i.e., minimum luminance points) of the graph.

This envelope curve indicates spatial change in the luminance value of a luminance image acquired by digitally photographing the same subject S without illumination, that is to say, spatial change in the luminance value of the background light of the subject S.

For a pixel-by-pixel luminance-value of a luminance image featured by such an envelope curve to be accurately binarized through thresholding, a threshold used therein is preferably caused to vary as a function of a pixel position. That is to say, the threshold is preferably caused to adaptively vary to follow an actual change in the luminance value in a luminance image through tracking.

Based on the above findings, in the present embodiment, a filtering-window is locally applied to a target luminance-image for local filtering or windowing of the target luminance-image for local-threshold calculation, and the filtering or windowing process allows local thresholds to be properly set for successive local sub-areas of the target luminance-image.

More specifically, once a window is applied to a particular one of the sub-areas of a target luminance-image, selection is made of ones of a plurality of patterned lines collectively making up the target luminance-image, which ones are found through the window, and selection is made of ones of all pixels collectively forming the selected patterned lines, which ones are present within the window. The luminance values of the selected pixels are extracted from the target luminance-image for determining a local threshold in association with the particular local position on the target luminance-image.

The window used in the present embodiment is in the form of a rectangular window. When using this rectangular window, patterned lines are selected which are found through the rectangular window, pixels are selected which are present within the rectangular window, and the luminance values of the selected pixels are extracted from the target luminance-image. Common weighting-factor(s) is applied to the extracted pixels for threshold calculation. The weighting factor(s) defines a window function of the rectangular window.

Additionally, when using this rectangular window, which has a line-direction-size measured in a line direction in which each of arrayed patterned-lines of a target luminance-image elongates, and a array-direction-size measured in an array direction in which the patterned lines are arrayed, the number of pixels present within the rectangular window can vary as a function of the line-direction-size of the rectangular window.

In addition, the number of laterally-arrayed patterned lines and the number of pixels both present within the rectangular window can vary as a function of the array-direction-size of the rectangular window.

As a result, when using the rectangular window, a local threshold calculated from a target luminance-image by locally applying the rectangular window thereto can vary as a function of the array-direction-size of the rectangular windows. Therefore, adaptive change in the value of local threshold, if required, can be adequately achieved by adaptive change in the array-direction-size of the rectangular window.

In the present embodiment, the size of the window formed as a rectangular window is preferably set so as to be equal to any one of the integer multiples of the spacing or period of the patterned lines (e.g., the period in which bright patterned lines repeat) within the window.

In other words, the window size is preferably set to allow bright patterned lines and dark patterned lines to be present in the window in equal numbers. The thus-setting of the window-size, as a result of the calculation of the average of luminance values of patterned lines within the window, allows the accurate determination of proper thresholds.

A possibility, however, exists that the repetition period of patterned lines can vary with location, even on the same luminance image. For this reason, a fixed-size window can cause the number of patterned lines within the window, to vary with location, resulting in degraded thresholds in accuracy.

In the present embodiment, one of a plurality of luminance images is selected as a representative light-pattern image, which was obtained with the effect of projection of a light pattern of lines arrayed in the shortest repetition period among those of all light patterns. That is to say, the representative light-pattern image is a luminance image assigned a pattern number PN of "0."

Further, in the present embodiment, a window which is locally applied to the representative light-pattern image, is in the form of the variable-size window VW. Owing to this, the variable-size window VW is caused to adaptively change in size in response to the repetition period of actual patterned lines in the representative light-pattern image.

In the present embodiment, even though the repetition period of patterned lines in the representative light-pattern image changes as a function of the position in the array direction of the representative light-pattern image, the size of the variable-size window VW changes so as to follow the change in the repetition period, with the result that the total number of bright and dark patterned-lines within the variable-size window VW remains constant, irrespective of changes in the repetition period of patterned lines.

In the present embodiment, a threshold TH is determined each time the variable-size window VW is locally applied to the representative light-pattern image on a local-position-by-local-position basis. The local-position-by-local-position threshold TH is accurately obtained based on the variable-size window VW optimized in size on a local-position-by-local-position basis.

In addition, the variable-size window VW, which allows the total number of bright and dark patterned-lines within the variable-size window VW to remain constant, is minimized in size when those patterned-lines appear on a luminance image having a pattern number PN of "0."

For this reason, the selection of the luminance image having a pattern number PN of "0" as the representative light-pattern image allows the variable-size window VW to be minimized in size, and eventually allows a reduction in computational load for filtering after using the variable-size window VW.

In the present embodiment, the variable-size window VW is in the form of a rectangular-window having a variable size. More specifically, this variable-size window VW is configured so as to be variable in size in the array direction of the representative light-pattern image, and so as to be fixed in the line direction of the representative light-pattern image.

In the present embodiment, the size of the variable-size window VW, that is to say, the extent of the variable-size window VW measured in the array direction of the representative light-pattern image, is adaptively set so as to reflect the spacings between the real patterned lines of the representative light-pattern image. This adaptive setting of the size of the variable-size window VW requires prior knowledge of the distribution of the spacings between the real patterned lines of the representative light-pattern image.

For these reasons, in the present embodiment, prior to the adaptive setting of the size of the variable-size window NW, a fixed-size window is locally applied to the representative light-pattern image. A plurality of adjacent pixels captured at a time by application of the fixed-size window are selected as a plurality of target pixels, and based on the luminance values of the selected target pixels, the patterned-lines spacing distribution of the representative light-pattern image is determined.

In the present embodiment, additionally, Fast Fourier Transform (FFT) is performed on the luminance values of a plurality of target pixels in the representative light-pattern image, thereby measuring intensities (e.g., a power spectrum) of frequency components of a series of luminance values found in the representative light-pattern image, resulting from variations in the luminance value in the array direction of the representative light-pattern image.

In this regard, the frequency of each of the "frequency components" is defined to mean a repetition number in which uniform luminance values repeat in a linear array of the target-pixels captured at a time by the fixed-size window at a given time, wherein the target pixels are sequenced in the array direction of the representative light-pattern image.

In the present embodiment, each one of the plurality of adjacent pixels which is successively and laterally arrayed in the representative light-pattern image is sequentially selected as a target pixel, and, based on a luminance value distribution of the representative light-pattern image, the patterned-lines spicing distribution is acquired per each of the thus-selected target pixels.

Figure 23:
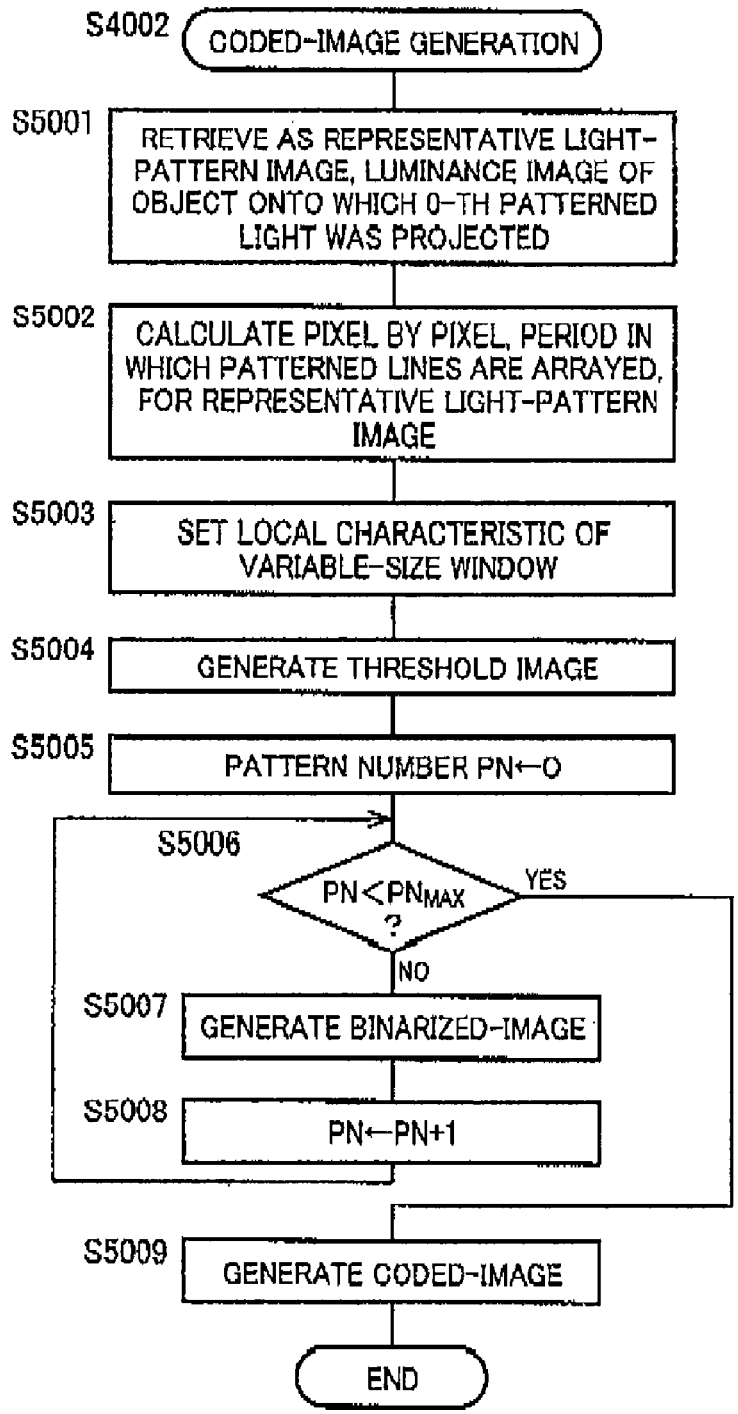
FIG. 23 is a flow chart conceptually illustrating a coded-image generation program 404d executed in a step S4002 depicted in FIG. 22.

This coded-image generation program 404d, although has been described above in terms of its basic idea, will be described below step-by-step by referring to FIG. 23.

This coded-image generation program 404d starts with step S5001 to retrieve from the luminance image storing area 406c, the luminance image of the subject S which was captured with the light pattern whose pattern number PN is "0" being projected onto the subject S, as the representative light-pattern image.

Next, at step S5002, a pixel-by-pixel calculation is made of a patterned-lines repetition-period in association with each of adjacent pixels consecutively sequenced within the representative light-pattern image in the array direction thereof, based on the retrieved luminance image, by an approach of the aforementioned FFT conversion. A plurality of ultimate calculations of patterned-lines-repetition-periods are stored in the period distribution storing area 406p, in association with the respective pixels (i.e., respective pixel-positions in the array direction).

Subsequently, at step S5003, the characteristic of the aforementioned variable-size window VW is locally configured in succession in the array direction, based on the plurality of ultimate calculations of patterned-lines-repetition-periods. In other words, a plurality of sets of characteristic data of the variable-size window VW are generated locally and sequentially for the representative light-pattern image.

In the present embodiment, the variable-size window VW is configured such that its line-direction-size is kept unchanged irrespective of the position of a moving local-region on the representative light-pattern image to which the variable-size window VW is locally applied, while the array-direction-size is variable to be kept equal to an integer multiple of a variable value of a successively-selected one of the patterned-lines repetition-periods calculated in association with the respective positions arrayed in the array direction of the representative light-pattern image.

Thereafter, at step S5004, the variable-size window VW is locally applied to the representative light-pattern image in a two-dimensional sliding manner (i.e., sliding in both the line direction and the array direction) in association with a sequentially-selected one of a plurality of pixels arrayed two-dimensionally on the representative light-pattern image.

In the two-dimensional sliding manner, the variable-size window VW first moves sequentially in the line direction, through a successively-selected one of pixel positions arrayed in the array direction, while making a pixel-by-pixel calculation of the luminance-value average of pixels present within the variable-size window VW at each point of time, as a local threshold.

The variable-size window VW, upon termination of one movement in the line direction, shifts to the next pixel position in the array direction for a next movement in the line direction for calculation of successive local thresholds.

At step S5004, by its further implementation, a threshold image is generated by allocating the thus-calculated local thresholds to the corresponding respective pixels of the representative light-pattern image. The generated threshold image is stored in the threshold image storing area 406q.

Subsequently, at step S5005, the pattern number PN is initialized to "0," and then, at step S5006, a determination is made as to whether or not a current value of the pattern number PN is smaller than the maximum value PNmax. In this instance, the current value of the pattern number PN is "0," and therefore, the determination of step S5006 becomes "YES" and operations progress to step S5007.

At step S5007, a pixel-by-pixel comparison is made between the luminance values of the luminance image whose assigned pattern number PN is equal to the current value of the pattern number PN, and the local thresholds of the generated threshold image. A binarized image is formed pixel-by-pixel so as to reflect the result of the pixel-by-pixel comparison.

More specifically, for a pixel position at which the current luminance image has its luminance value greater than the corresponding local threshold, data indicative of a binary "1" is assigned to the corresponding binarized image at its corresponding pixel position and is stored in the binarized image storing area 406r in association with the corresponding pixel position of the corresponding binarized image.

On the other hand, for a pixel position at which the current luminance image has its luminance value not greater than the corresponding local threshold, data indicative of a binary "0" is assigned to the corresponding binarized image at its corresponding pixel position and is stored in the binarized image storing area 406r in association with the corresponding pixel position of the corresponding binarized image.

Thereafter, at step S5008, the pattern number FN is incremented one and then operations return to step S5006 to make a determination as to whether or not a current value of the pattern number PN is smaller than the maximum value PNmax, If so, then the determination of step S5006 becomes "YES," and operations progress to step S5007.

If the current value of pattern number PN, as a result of the repetition of steps S5006-S5008 a number of times equal to the total number of the light patterns, becomes not smaller than the maximum value PNmax, then the determination of step S5006 becomes "NO," and operations progress step S5009.

At step S5009, pixel-by-pixel pixel extraction is performed of pixel values (either a binary "1" or "0") from a set of binarized images whose number is equal to the maximum value PNmax, in the sequence from a binarized image corresponding to a luminance image whose pattern number PN is "0" to a binarized image corresponding to a luminance image whose pattern number PN is "PNmax−1," resulting in the generation of a space code made up of bits arrayed from a least significant bit LSM to a most significant bit MSB.

The number of bits collectively making up a pixel-by-pixel space-code is equal to the maximum value PNmax. The pixel-by-pixel generation of space codes results in the generation of a space coded image corresponding to the subject S.

The generated space codes are stored in the coded-image storing area 406d, in association with the corresponding respective pixel positions. In an example where the maximum value PNmax is equal to eight, the resulting space codes have values ranging from 0 to 255.

Then, one cycle of execution of this coded-image generation program 404d terminates.

Upon termination of the coded-image generation program 404d, at step S4003 depicted in FIG. 22, code-edge-coordinates detection processing is performed by the execution of the code edge extraction program 404e.

In the present embodiment, encoding is carried out using the aforementioned space-encoding technique on a per-pixel basis, resulting in the occurrence of a difference on a sub-pixel order between an edge or border line separating adjacent bright and dark portions in an actual light-pattern, and an edge or border line separating adjacent different space-codes in the generated coded-image. In the coded image, the edge or border line separates a region assigned a space code and another region assigned another space code.

In view of the above, the code-edge-coordinates detection processing is performed for the purpose of detecting code edge coordinates of space codes with sub-pixel accuracy.

In an example, where 255 lines of discrete reference lines each of which intersects with the line direction of each patterned light are defined in a CCD coordinate system, if the maximum value PNmax is equal to eight (256 space codes, therefore 255 edges or border lines exist), about 65 thousand code edge coordinate values are detected at the maximum, as a result of the implementation of step S4003 (i.e., the implementation of the code edge extraction program 404e) depicted in FIG. 22.

The detected code edge coordinates are stored in the code edge coordinates storing area 406e. The code edge coordinates are defined in a CCD coordinate system ccdx-ccdy which is a two-dimensional coordinate system fixed with respect to the image plane of the CCD 70.

Following step S4003, at step S4004, lens aberrations correction processing is performed by the execution of the lens aberrations correction program 404f.

A light beam, after passing through the image-capture optical system 30, is focused at an actual position deviated from an ideal position due to aberrations or distortion in the image-capture optical system 30, if any. If the image-capture optical system 30 is of optically ideal lens, the light beam is focused at the ideal position.

In view of this, the lens aberrations correction processing is performed for correcting the actual position such that it becomes closer to the ideal position.

Owing to this lens aberrations correction processing, the code edge coordinates detected at step S4003 are corrected so as to eliminate errors due to such as distortion in the image-capture optical system 30. The thus-corrected code-edge-coordinates are stored in the aberration correction coordinates storing area 406g.

None of the above-described code-edge-coordinates detection processing and lens aberrations correction processing is essential in understanding the present invention, and both of them are disclosed in more detail in Japanese Patent Application No. 2004-105426 that was filed by the same applicant as that of the present application, the disclosure of which is herein incorporated by reference in its entirety, and therefore, the detailed description of which is omitted.

Following step S4004, at step S4005, real-space conversion processing is performed through triangulation by the execution of the triangulation calculation program 404g.

Once this real-space conversion processing starts, the aforementioned aberrations-corrected code edge coordinates in the CCD coordinate system ccdx-ccdy is converted through triangulation into 3-D coordinates defined in a real space coordinate system X-Y-Z fixed with respect to a real space. As a result, 3-D coordinate values representative of the 3-D-shape-and-color detection result are acquired.

The acquired 3-D coordinate values are stored in the 3-D coordinates storing area 406h, in association with the rotation phases PH of the corresponding respective sub-areas of the subject S.

At step S4005, because the 3-D shape of the subject S is measured in a spatially discreting manner as a set of a plurality of 3-D vertexes, the two-dimensional coded images are referenced in a spatially discreting manner with respect to a plurality of discrete reference lines which intersect with the line direction of each patterned light.

As a result, an acquisition is made as to not only a plurality of the 3-D vertexes each corresponding to a plurality of discrete points on an outer boundary of the coded image, but also a plurality of the 3-D vertexes each corresponding to a plurality of discrete points within the coded image (i.e., coordinate points on boundaries between the spatial codes detected at step S4003).

Figure 24:
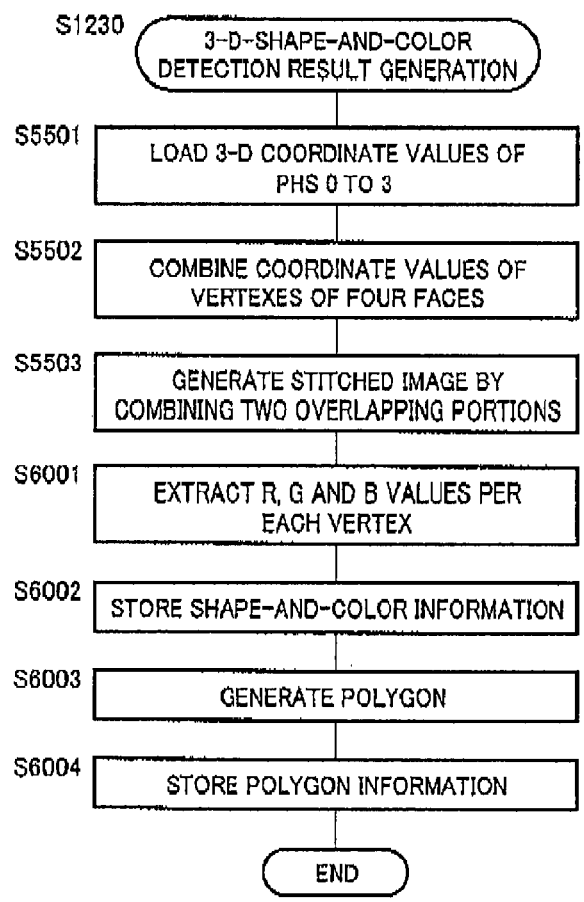
FIG. 24 is a flow chart conceptually illustrating a step S1230 depicted in FIG. 18, in the name of a 3-D-shape- and color-detection-result generation subroutine.

Then, by referring to FIG. 24, step S1230 depicted in FIG. 18 will be described in more detail, FIG. 24 is a flow chart conceptually illustrating step S1230 in the name of a 3-D-shape-and-color-detection-result generation subroutine.

The 3-D-shape-and-color-detection-result generation subroutine starts with step S5501 to load a plurality of 3-D coordinate values from the 3-D coordinates storing area 406h in association with each one of the rotation phases PH=0 to 3.

In the present embodiment, the entire outer face of the subject S is divided into four partial faces (i.e., a front face, a right-side face, a left-side face, and a back face), and a stereoscopic image is generated per each partial face. At step S5501, for all of the four faces, a plurality of 3-D coordinates belonging to each of the four partial faces are loaded from the 3-D coordinates storing area 406h.

Subsequently, at step S5502, a rotational transform is performed for the loaded 3-D coordinate values (i.e., coordinate values of vertexes) in a manner conforming with the kind of the rotation phase PH of the partial face to which each 3-D coordinate value belongs, whereby the 3-D coordinate values belonging to the four partial faces are combined with one another by allowing for the rotation phase PH of each partial face.

As a result, the four partial faces, which are three-dimensionally represented by the plurality of 3-D coordinate values, are combined together, to thereby reconstruct a composite image indicative of the entire outer face of the subject S. At this stage, however, the composite image includes spatially-overlapping portions which are created due to the employment of a so-called fragmented or multiple photography using the measurement head MR.

Subsequently, at step S5503, sets of paired spatially-overlapped portions are extracted from the generated composite image. Each set of paired overlapping portions overlap with each other over lengthwise-arrayed adjacent segments of the composite image. Further, each set of paired overlapping portions are combined together by an approach such as the averaging of a plurality of 3-D coordinate values belonging to each set of paired overlapping portions.

As a result, the spatial overlaps are removed from the composite image, whereby a stitched image is generated. Data indicative of the stitched image is stored in the stitched image storing area 406s.

Thereafter, at step S6001, the RG B values (i.e., an R luminance value, a G luminance value, and a B luminance value) are extracted from an image (hereinafter, referred to as "surface-color image") indicative of the aforementioned surface-color information, the RGB values corresponding to each coordinate value in a real coordinate space of a set of 3-D vertexes which have undergone coordinate-transformation into the 3-D coordinate system defined in the real space as described above.

The real space coordinate system, and a plane coordinate system which defines the surface-color image art geometrically related with each other by the triangulation calculation mentioned above.

In other words, when there exists a function used for mapping, by calculation, the coded image, that is to say, the plane coordinate system defining a shape image which is a two-dimensional image for measuring the 3-D shape of the subject S, onto the 3-D coordinate system in the real space, the use of the inverse function of the aforementioned function enables the 3-D coordinate system in the real space to be mapped, by calculation, onto the plane coordinate system which defines the surface-color image.

Therefore, step S6001 enables the surface-color values, namely, the RGB values corresponding to the 3-D vertexes, from the two-dimensional surface-color image, per each vertex.

Next, at step S6002, per each vertex, the corresponding real space coordinate values and the corresponding RGB values are combined into the shape-and-color information. Further, the generated shape-and-color information is locally stored in the working area 410 in direct or indirect association with the corresponding vertex.

Subsequently, at step S6003, in order to approximately represent the shape of the surface of the subject S by dividing the shape of the surface of the subject S into a plurality of triangles each of which is an example of a polygon, adjacent ones of the plurality of vertexes which have been previously acquired for the subject S are grouped in threes. Per each group, the corresponding three vertexes are connected together into one polygon.

Thereafter, at step S6004, per each polygon, the combination of the three vertexes to be connected together for forming each polygon is locally stored in the working area 410 as polygon information in direct or indirect association with each polygon. Additionally, the polygon information is stored in the 3-D-shape-and-color data storing area 406t as information indicative of the 3-D-shape-and-color of the subject S.

Then, one cycle of execution of the 3-D-shape-and-color-detection-result generation subroutine terminates, resulting in the termination of one cycle of execution of the 3-D-shape-and-color detection processing routine illustrated in FIG. 18.

In the present embodiment, once the holder HD has been transformed from the retracted position into the unfolded position in which the head base 130 and the table base 132 are coplanar with each other, the relative position of the turntable 184 to the measurement head MH is determined automatically and stably. In an example, the relative position of the turntable 184 is defined by the distance from the measurement head MH, and the angle with respect to the optical axis of the measurement head MH.

In the present embodiment, none of the distances and the angles between four plate-like members constituting the holder HD does not depend on any change in the shape of the holder HD.

Accordingly, the present embodiment allows the turntable 184 which is automatically located upon being unfolded from the retracted position, to be positioned at a repeatable and stable position relative to the measurement head HD.

For this reason, the present embodiment allows the subject S to be automatically positioned at a desired position relative to the measurement head MH, in response to a mere user-action to place the subject S onto the turntable 184 which can be transformed into a repeatable and stable unfolded-position in a manner described above.

As a result, the present embodiment allows the subject S, upon a user placement of the subject S onto the turntable 184, to be located relative to the measurement head MH with a reduced maximum-range of possible position-variation, resulting in a reduced size of a photographing field (i.e., image capture area) within which the measurement head MH is required to photograph the subject S and which is predetermined by allowing for a maximum range of possible position-variation.

Accordingly, the present embodiment makes it easier to reduce the burden on the measurement head MH for photographing and measuring the subject S, than the above-described exemplified version of conventional techniques in which the user can locate the subject S with higher flexibility in selecting the ultimate location of the subject S.

In the present embodiment, there exist some other reasons why the burden on the measurement head MH for photographing and measuring the subject S can be reduced.

More specifically, one of these reasons is that the present embodiment enables the coordinates of the center line of rotation of the turntable 184 to be estimated with enhanced efficiency, during the measurement of the 3-D shape of the subject S from the directions of the four faces (i.e., the rotation phases PH=0 to 3) of the subject S, using the turntable 184.

Still more specifically, in the present embodiment, there are known and stabilized spatial coordinate values relative to the measurement head MH, of the center line of rotation of the turntable 184 on which the subject S is to be placed.

Accordingly, for each 3-D coordinate value (calculated at step S4005 depicted in FIG. 22) indicative of the 3-D-shape measurement result for each one of four phases, a spatial rotational calculation operation is performed around the center line of rotation of the turntable 184, to thereby perform a stitching operation (i.e., a combining operation) for a polygon surface and a texture which represent the shape and the colors of the subject S, respectively, eventually resulting in the generation of the 3-D-shape-and-color detection result for the entire circumference of the subject S, as an ultimate output (step S1230 depicted in FIG. 18).

As a result, the shape and the colors of the entire circumference of the subject S are so accurately combined together as not to cause any noticeable mismatch or misregistration.

In the 3-D input device 10, upon transformation of the holder HD from the retracted position into the unfolded position, the turntable 184 is automatically located, and, per each user action to unfold the turntable 184, the turntable 184 is located at a stable and repeatable position relative to the measurement head MH.

Therefore, the 3-D input device 10 also allows the center line of rotation of the turntable 184 to be located at a stable and repeatable position relative to the measurement head MH, each time the turntable 14 is automatically located.

Accordingly, the 3-D input device 10 enables the detection or estimation of the center line of rotation of the turntable 184 to be completely or partly omitted, while maintaining the capability of measuring the 3-D shape of the subject S.

Further, in the present embodiment, even when there is a need for estimating the geometry of the center line of rotation of the turntable 184, what is required is to estimate the geometry within a spatial region, after determining the size of the spatial region by allowing for only possible position-variation of the center line of rotation of the turntable 184 occurring due to clearance (i.e., play) which is present at each joint (i.e., hinge) 140, 142, 144 of the holder HD when in the unfolded position. As a result, the spatial region is not required to have a larger size.

In any case, the present embodiment makes it easier to reduce the burden on the above-described center-line-of-rotation estimation processing which is performed for accurately combining a plurality of shapes and colors of the subject S which have been measured separately on a face-by-face basis.

In this regard, an example of the "center-line-of-rotation estimation processing" may be a technique of estimating the coordinate values of the center line of rotation so that there may be substantially minimized misregistration between a plurality of shape-and-colors (i.e., a plurality of successive image segments) which have been measured discretely along the entire circumference of the subject S.

Another reason why the burden to be imposed on the measurement head MH for photographing and measuring the subject S can be reduced is that, the present embodiment allows the turntable 184 to be automatically located at a desired position (geometrically defined by the distance from the measurement head MH and the angle relative to the measurement head MH) in a stable and repeatable fashion, each time the user unfolds the holder HD, with the advantage that the subject S is guaranteed to be centered of a camera field of view, the advantage that the focus adjustment can be simplified, etc.

These advantages allow relaxation of the burden to be imposed on the measurement head MH for photographing and measuring the subject S.

Further, the present embodiment allows the turntable 184 to be automatically located at a desired position (geometrically defined by the distance from the measurement head MH and the angle relative to the measurement head MH) in a stable and repeatable fashion, each time the user unfolds the holder HD, with the advantage that the subject S, when placed on the turntable 184 so as to fully occupy the image capture area of the measurement head MH, can be photographed such that the subject S appears so as to fully occupy an image plane within the camera field of view.

As a result, accuracy of 3-D input or reading of the subject S can be improved with ease, which also provides the capability of reducing the burden to be imposed on the measurement head MH for photographing and measuring the subject S.

Further, in the present embodiment, the holder HD, which is physically transformable with geometrical self-repeatability, provides a physical link between the turntable unit RT and the measurement head MH.

Therefore, the present embodiment can simplify a user action required to retract the turntable unit RT into the measurement head MH by transforming the holder HD, and enables the user to compact the turntable unit RT in the measurement head MH, without undue care.

As will be evident from the above description, in the present embodiment, the projecting section 12 constitutes an example of the "projecting apparatus" according to the above mode (1), the light source 68 constitutes an example of the "light source" set forth in the same mode, the modulating optics 200 constitutes an example of the "modulating optics" set forth in the same mode, and the projection optical system 32 constitutes the "optical system" set forth in the same mode.

Further, in the present embodiment, the modulating optics 200 constitutes an example of the "modulating optics of a transmissive type" set forth in the above mode (3), the portion 310 for allowing light to travel straight constitutes an example of the "portion for allowing light to travel straight" set forth in the above mode (5), and the light deflecting portion 312 constitutes an example of the "modulating portion" set forth in the same mode.

Still further, in the present embodiment, the projecting section 12 constitutes an example of the "projecting apparatus" set forth in the above mode (12), the light source 68 constitutes an example of the "electromagnetic-wave source" set forth in the same mode, the modulating optics 200 constitutes an example of the "electromagnetic-wave modulating element" set forth in the same mode, and the projection optical system 32 constitutes an example of the "selector" set forth in the same mode.

It is added that, in the present embodiment, the modulating optics 200 is of a type allowing light to be transmissive spatially-non-selectively, the present invention, however, may be alternatively carried out by replacing the modulating optics 200 with exemplary modulating optics of a type allowing light to be reflective spatially-non-selectively.

It is further added that, in the present embodiment, the modulating optics 200 is configured to include the portion 310 for allowing light to travel straight without light deflection of the incoming light, and the light deflecting portion 312 for optically deflecting the incoming light. The present invention, however, may be alternatively carried out by replacing the modulating optics 200 with exemplary modulating optics having a strong deflection portion for deflecting light by a larger angle, and a weak deflection portion for deflecting light by a smaller angle.

It is yet further added that, in the present embodiment, a variable light-pattern (including a plurality of various light patterns which are successively selected) is projected onto an object, the present invention, however, in an alternative, may be applied to 3-D input devices in which an invariable light-pattern is projected onto an object, to thereby enter the 3-D shape of the object.

In the alternative, modulating optics, which is used so as to be fixedly disposed in position relative to the incoming light, has a predetermined portion for dividing the incoming light into a passed-through optical component and a non-passed-through optical component, both described above. As a result, similarly with the aforementioned embodiment, the 3-D input device can be easily manufactured at reduced cost, with ensured input-accuracy.

As will be evident from the above description, in the present embodiment, the projecting section 12 constitutes an example of the "projecting device" according to the above mode (13), the image-capturing section 14 constitutes an example of the "image-capturing device" set forth in the same mode, the light source 68 constitutes an example of the "light source" set forth in the same mode, the projection mechanism if constitutes an example of the "projection mechanism" set forth in the same mode, and the projection optical system 32 constitutes an example of the "projection optical system" set forth in the same mode.

Further, in the present embodiment, the housing 204 constitutes an example of the "housing" set forth in the above mode (13), the primary and secondary guides 210 and 212 together constitute an example of the "feed guide" set forth in the same mode, and the carriage 202 constitutes an example of the "carriage" set forth in the same mode.

Still further, in the present embodiment, the substrate 264 constitutes an example of the "movable member" set forth in the above mode (13), the eight planar optical elements 260 together constitute an example of the "optical element" and an example of the "component-selector optical system" set forth in the same mode, and the drive mechanism 222 constitutes an example of the "drive mechanism" set forth in the same mode.

Yet further, in the present embodiment, the angular-position adjustment mechanism 270 constitutes an example of the "angular-position adjustment mechanism" set forth in the above mode (14), and the eight planar optical elements 260 constitute an example of the "plurality of portions" sot forth in the same mode.

Additionally, in the present embodiment, the support mechanism 272 constitutes an example of the "support mechanism" set forth in the above mode (15), and the rotation mechanism 274 constitutes an example of the "rotation mechanism" set forth in the same mode.

Still additionally, in the present embodiment, the directing section 296 constitutes an example of the "directing section" set forth in the above mode (15), and the window section 297 constitutes an example of the "window section" set forth in the same mode.

It is added that, in the present embodiment, the directing section 296 is disposed between the modulating optics 200 and the projection optical system 32, and is configured to direct to the projection optical system 32, in a generally dark box, light emitted from a successively-selected one of the plurality of optical elements 260 (i.e., an example of the "to-be-selected portion" set forth in the above mode (19)).

The present invention, however, may be alternatively carried out in a mode in which a second directing section is employed instead of or in addition to the directing section 296. The second directing section, disposed between the light source 69 and the modulating optics 200, is configured to direct light emitted from the light source 68 to the successively-selected optical element, in a generally dark box.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A projecting apparatus for use in projecting patterned light onto an object, wherein the patterned light is generated to define a stripe configuration made up of alternating bright portions and dark portions, the projecting apparatus comprising:

a light source;

modulating optics allowing at least part of incoming light from the light source to be optically modulated, by angular modulation, and to go out; and an optical system adapted to allow a selected one of a plurality of angular components of light outgoing from the modulating optics, to pass through the optical system, the selected angular component having a radiant angle characteristic that achieves a predetermined entrance numerical aperture, wherein the modulating optics includes:

a substrate; and at least one pair of two portions having different surface shapes, wherein the portions are formed on the substrate, such that the portions are alternately arrayed on the substrate, one of the two portions is a portion for allowing light to travel straight, which portion has a surface perpendicular to the incoming light, to thereby allow the incoming light to go out without undergoing modulation by the surface, the other of the two portions is a portion for allowing light to be modulated, which portion has an oblique surface with respect to the incoming light, to thereby allow the incoming light to go out after undergoing modulation by the surface, and outgoing light from one of the portion for allowing light to travel straight and the portion for allowing light to be modulated is a passed-through optical component which will pass through the optical system, and which forms at least one of the bright portions, while outgoing light from the other is a non-passed-through optical component which will not pass through the optical system, and which forms at least one of the dark portions.

2. The projecting apparatus according to claim 1, wherein the modulating optics is disposed to extend across the incoming light.

3. The projecting apparatus according to claim 1, wherein the modulating optics is of a transmissive type allowing the incoming light to transmit through the modulating optics.

4. The projecting apparatus according to claim 1, wherein the modulating optics is of a reflective type allowing the incoming light to reflect away from the modulating optics.

5. The projecting apparatus according to claim 1, wherein at least one of the two portions is in the form of a roof prism.

6. The projecting apparatus according to claim 1, wherein at least one of the two portions is formed to have a surface shape physically causing random scattering.

7. The projecting apparatus according to claim 1, wherein at least one of the two portions is in the form of a diffraction grating.

8. The projecting apparatus according to claim 1, wherein the light pattern includes at least two different light patterns, and
the modulating optics is moved relative to the incoming light, to thereby project a successively-selected one of the at least two light patterns onto the object.

9. The projecting apparatus according to claim 1, wherein the two portions define a stripe pattern.

10. The projecting apparatus according to claim 1, wherein the substrate is shaped to have a length and a flat face, and the two portions are formed on the substrate, such that the two portions are alternately arrayed in line in a direction in which the substrate extends.

11. A three-dimensional input apparatus for use in entering three-dimensional information of a subject, comprising:
a projecting device adapted to project a plurality of different light patterns onto the subject, in succession; and
an image-capturing device adapted to capture images of the subject as the projecting device projects the plurality of light patterns onto the subject, in succession, wherein
the projecting device is configured to include:
a light source;
a projection mechanism adapted to transform light incoming from the light source into a successively-selected one of the plurality of light patterns; and
a projection optical system adapted to project the successively-selected light pattern which has outgone from the projection mechanism, onto the subject, wherein
the projection mechanism is configured to include:
a housing;
a feed guide attached to the housing and extending across the light incoming from the light source;
a carriage guided movably by the feed guide;
a movable member held by the carriage and having an optical element allowing the plurality of light patterns to be generated using the incoming light from the light source; and
a drive mechanism adapted to drive the carriage along the feed guide, wherein
the optical element is configured to include modulating optics allowing at least part of incoming light from the light source to be modulated, by angular modulation or change of luminance distribution, and to go out,
the projection optical system is configured to include a component-selector optical system adapted to allow a selected one of a plurality of angular components of light outgoing from the modulating optics, to pass through the component-selector optical system, the selected angular component having a radiant angle characteristic that achieves a predetermined entrance numerical aperture,
the modulating optics is configured to optically modulate the incoming light, by relying on a surface shape of the modulating optics,
the modulating optics is shaped to include at least one pair of two portions having different surface shapes, which portions are alternately arrayed in a direction in which the modulating optics extends, and
one of the two portions allows one of the plurality of angular components which has a radiant angle characteristic that achieves the entrance numerical aperture, to go out as a passed-through optical component which will pass through the component-selector optical system, while the other allows one of the plurality of angular components which has a radiant angle characteristic that does not achieve the entrance numerical aperture, to go out as a non-passed-through optical component which will not pass through the component-selector optical system.

12. The three-dimensional input apparatus according to claim 11, wherein the optical element is configured to include a plurality of portions arrayed along the movable member and generating the plurality of light patterns, respectively, and
the carriage is adapted to allow the optical element to move along a move plane disposed across the incoming light from the light source,
the three-dimensional input apparatus further comprising an angular-position adjustment mechanism for use in adjusting an angular position of the optical element on the move plane.

13. The three-dimensional input apparatus according to claim 12, wherein the angular-position adjustment mechanism is configured to include:
a support mechanism adapted to cause the carriage to support the movable member rotatably, with the movable member being confined to the move plane; and
a rotation mechanism adapted to rotate the movable member relative to the carriage, with the movable member being confined to the move plane.

14. The three-dimensional input apparatus according to claim 13, wherein the rotation mechanism is configured to include a screw mechanism configured to include a male screw having a centerline of rotation not normal to the move plane and a female screw threaded into the male screw, wherein a relative axial-position between the male screw and the female screw changes depending on an amount of relative rotation between the male screw and the female screw.

15. The three-dimensional input apparatus according to claim 12, further comprising:
a directing section disposed between the optical element and the projection optical system and adapted to direct outgoing light from a to-be-selected one of the plurality of portions of the optical element, to the projection optical system, in a dark box; and
a window section disposed at the directing section so as to face directly the to-be-selected portion of the optical element and adapted to introduce outgoing light from the to-be-selected portion of the optical element into the directing section.

16. The three-dimensional input apparatus according to claim 15, wherein the directing section extends from the projection optical system to near one of different faces of the optical element which is proximal to the projection optical system, and
the window section is disposed at an area of the directing section which is proximal to the to-be-selected portion of the optical element.

17. The three-dimensional input apparatus according to claim 12, further comprising:
- a directing section disposed between the light source and the optical element and adapted to direct outgoing light from the light source to a to-be-selected one of the plurality of portions of the optical element, in a dark box; and
- a window section disposed at the directing section so as to face directly the to-be-selected portion of the optical element and adapted to introduce outgoing light from the directing section into the to-be-selected portion of the optical element.

18. The three-dimensional input apparatus according to claim 17, wherein the directing section extends from the light source to near one of different faces of the to-be-selected portion which is proximal to the light source, and
- the window section is disposed at an area of the directing section which is proximal to the to-be-selected portion of the optical element.

19. The three-dimensional input apparatus according to claim 13, wherein the feed guide is configured to include a primary guide attached to the housing and elongated to define an outer circumferential surface generally in the form of a cylindrical surface, and
- the carriage is slidably fitted onto the outer circumferential surface of the primary guide.

20. The three-dimensional input apparatus according to claim 19, wherein the carriage is fitted with the primary guide slidably and rotatably in opposite angular-directions around the primary guide,
- the feed guide further includes a secondary guide extending generally in parallel to the primary guide,
- the carriage is mechanically inhibited from rotating in a pre-selected one of the opposite angular-directions by selective engagement of the carriage with the secondary guide, and
- the optical element is disposed at the carriage in such a position relative to the carriage that allows the optical element to be oriented generally perpendicular to the incoming light from the light source, with the carriage being engaged with the secondary guide.

21. A projecting apparatus for use in projecting patterned light onto an object, wherein the patterned light is generated to define a stripe configuration made up of alternating bright portions and dark portions, the projecting apparatus comprising:
- a light source;
- modulating optics allowing at least part of incoming light from the light source to be optically modulated, by angular modulation, and to go out; and
- an optical system adapted to allow a selected one of a plurality of angular components of light outgoing from the modulating optics, to pass through the optical system, the selected angular component having a radiant angle characteristic that achieves a predetermined entrance numerical aperture, wherein
- the modulating optics includes:
- a substrate; and
- at least one pair of two portions having different surface shapes, wherein the portions are formed on the substrate, such that the portions are alternately arrayed on the substrate,
- the two portions are two modulating areas which have surfaces oriented obliquely with respect to the incoming light, respectively, to thereby allow the incoming light to be modulated and go out,
- the two modulating areas have oblique surfaces having different orientation angles with respect to the incoming light, respectively, and have different radiant-angle-characteristics of outgoing light from the two modulating areas, respectively, and
- outgoing light from one of the two modulating areas is a passed-through optical component which will pass through the optical system, and which forms at least one of the bright portions, while outgoing light from the other is a non-passed-through optical component which will not pass through the optical system, and which forms at least one of the dark portions.

* * * * *